United States Patent
Nam et al.

(10) Patent No.: US 11,332,834 B2
(45) Date of Patent: May 17, 2022

(54) CATALYST AND MANUFACTURING METHOD THEREOF

(71) Applicants: SEOUL NATIONAL UNIVERSITY R&DB FOUNDATION, Seoul (KR); GLOBAL FRONTIER CENTER FOR MULTISCALE ENERGY SYSTEMS, Seoul (KR)

(72) Inventors: Ki-Tae Nam, Seoul (KR); Kyoung-Suk Jin, Gyeonggi-do (KR); Dong-Hyuk Jeong, Chungcheongbuk-do (KR); Sung-Eun Jerng, Seoul (KR)

(73) Assignees: SEOUL NATIONAL UNIVERSITY R&DB FOUNDATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/493,288

(22) Filed: Apr. 21, 2017

(65) Prior Publication Data

US 2017/0283965 A1  Oct. 5, 2017

Related U.S. Application Data

(63) Continuation-in-part of application No. PCT/KR2015/009349, filed on Sep. 4, 2015, and a (Continued)

(30) Foreign Application Priority Data

Oct. 21, 2014 (KR) .................. 10-2014-0142622
Oct. 26, 2015 (KR) .................. 10-2015-0148851
(Continued)

(51) Int. Cl.
C25B 11/04 (2021.01)
H01M 4/86 (2006.01)
(Continued)

(52) U.S. Cl.
CPC .............. C25B 11/091 (2021.01); C25B 1/04 (2013.01); H01M 4/8652 (2013.01);
(Continued)

(58) Field of Classification Search
CPC .... C25B 1/04; C25B 11/0478; H01M 4/8652; H01M 4/9025; H01M 4/9075;
(Continued)

(56) References Cited

U.S. PATENT DOCUMENTS

2003/0075193 A1* 4/2003 Li .................. A24B 15/28
                                                       131/364
2006/0093892 A1   5/2006 Min et al.
(Continued)

FOREIGN PATENT DOCUMENTS

CN   102815753 A   12/2012
JP   2003511435 A   3/2003
(Continued)

OTHER PUBLICATIONS

Kunkalekar etc., Activity of Pd doped and supported Mn2O3 nanomaterials for CO oxidation, Reac. Kinet. Mech. Cat (2012), 106, p. 395-405).*
(Continued)

*Primary Examiner* — Jun Li
(74) *Attorney, Agent, or Firm* — Stuart H. Mayer; Mayer & Williams PC

(57) ABSTRACT

The present invention relates to a catalyst and a manufacturing method thereof, the catalyst is characterized that a distance between a transition metal of a transition metal oxide nanoparticle and oxygen is controlled by substituting at least a part of surface of the transition metal oxide nanoparticle with an inclusion.

11 Claims, 57 Drawing Sheets

Related U.S. Application Data continuation-in-part of application No. PCT/KR2016/012003, filed on Oct. 25, 2016.

(30) Foreign Application Priority Data

| Oct. 24, 2016 | (KR) | ........................ | 10-2016-0138616 |
| Nov. 23, 2016 | (KR) | ........................ | 10-2016-0156837 |
| Feb. 27, 2017 | (KR) | ........................ | 10-2017-0025665 |
| Apr. 7, 2017 | (KR) | ........................ | 10-2017-0045300 |

(51) Int. Cl.
*C25B 11/091* (2021.01)
*C25B 1/04* (2021.01)
*H01M 4/90* (2006.01)
*H01M 8/12* (2016.01)

(52) U.S. Cl.
CPC ....... *H01M 4/9025* (2013.01); *H01M 4/9075* (2013.01); *H01M 2008/1293* (2013.01); *Y02E 60/36* (2013.01)

(58) Field of Classification Search
CPC ................ B01J 23/8892; B01J 35/0033; B01J 37/0215; B01J 37/082
See application file for complete search history.

(56) References Cited

U.S. PATENT DOCUMENTS

| 2010/0216049 | A1 | 8/2010 | Hibino et al. | |
| 2011/0151356 | A1 | 6/2011 | Adzic et al. | |
| 2012/0103913 | A1 | 5/2012 | Kiyoto | |
| 2012/0183869 | A1 | 7/2012 | Jin et al. | |
| 2012/0328505 | A1 | 12/2012 | Frei et al. | |
| 2014/0271384 | A1* | 9/2014 | Nazarpoor | B01J 21/066 422/168 |
| 2015/0231610 | A1* | 8/2015 | Sakurai | B01J 23/683 502/184 |

FOREIGN PATENT DOCUMENTS

| JP | 2005-238128 | | 9/2005 |
| KR | 100713745 | B1 | 5/2007 |
| WO | 2013/127920 | A1 | 9/2013 |
| WO | 2013/175327 | A1 | 11/2013 |

OTHER PUBLICATIONS

Gorlin et a, Understanding Interactions between Manganese Oxide and Gold that Lead to Enhanced Activity for Electrocatalytic Water Oxidation, Journal of the American Chemical Society, 2014, vol. (136), p. 4920-4926.*

Chen ( Nonstoichiometric Oxides as Low-Cost and Highly-Efficient Oxygen Reduction/Evolution Catalysts for Low-Temperature Electrochemical Devices, Chemical Reviews 2015, vol. 115 pp. 9869-9921), Sep. 14, 2015.*

Zhang et al., An overview of metal oxide materials as electrocatalysts and supports for polymer electrolyte fuel cells, Energy Environ. Sci., 2014,7, 2535-2558, published Apr. 28, 2014.*

Baldereschi et al., (transition from Mn4+ to Mn3+ induced by surface reconstructions at lamba-MnO2, The journal of Chemical Physics 133, 204701 (2010).*

El-Nowihy et al., Development of Nickel oxide and Manganese oxide nanostructured binary modified anodes for methoanol electrooxidation, Int. J. Electrochem. Sci., 9 (2014)5177-5186.*

Jafta et al., "Manganese oxide/graphene oxide composites for high-energyaqueous asymmetric electrochemical capacitors". Electrochimica Acta 110 (2013) 228-233.

Narubayashi, et al., "50-100 mm-thick pseudocapacitive electrodes of MnO2 nanoparticles uniformly electrodeposited in carbon nanotube papers" RSC Adv., 2016, 6, 41496.

Kyoungsuk Jin, "Study on the Manganese based Water Oxidation Catalyst" Aug. 2016, 292 pages, Department of Materials Science and Engineering The Graduate School Seoul National University.

Linda de la Garza, "Surface States of Titanium Dioxide Nanoparticles Modified with Enediol Ligands", J. Phys. Chem. B 2006, 110, 680-686.

Jafri et al., "Au-Mn02/MWNT and Au-ZnO/MWNT as oxygen reduction reaction electrocatalyst for polymer electrolyte membrane fuel cell" International Journal of Hydrogen Energy 34 (2009) 6371-6376.

Chang, et al., "Nanoscale structural disorder in manganese oxide particles embedded in Nafion" J. Mater. Chem. A, 2014, 2, 3730.

Singh, et al., "Water Oxidation Catalysis by Nanoparticulate Manganese Oxide Thin Films: Probing the Effect of the Manganese Precursors" Chem. Mater. 2013, 25, 1098-1108.

Ramírez, et al., "Evaluation of MnOx, Mn2O3, and Mn3O4 Electrodeposited Films for the Oxygen Evolution Reaction of Water" J. Phys. Chem. C 2014, 118, 14073-14081.

Hiramoto, et al. "Control of nonstoichiometric defects in manganese oxides by self-propagating high-temperature synthesis" Materials Chemistry and Physics 134 (2012) 98-102.

Busch, et al., "Water Oxidation on MnOx and IrOx: Why Similar Performance?" J. Phys. Chem. C 2013, 117, 288-292.

Chen et al. "Preparation and characterization of water-soluble monodisperse magnetic iron oxide nanoparticles via surface doubleexchange with DMSA" Colloids and Surfaces A: Physicochem. Eng. Aspects 316 (2008) 210-216.

* cited by examiner

[FIG. 1]
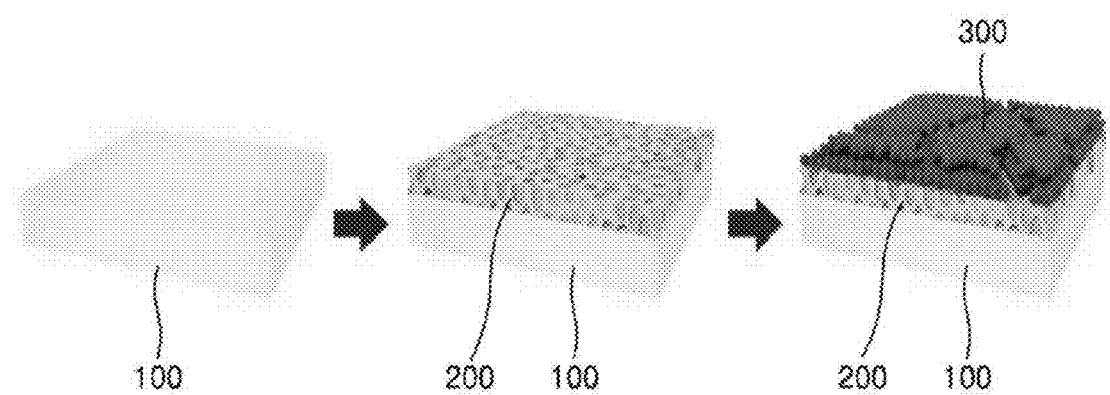

[FIG. 2a]
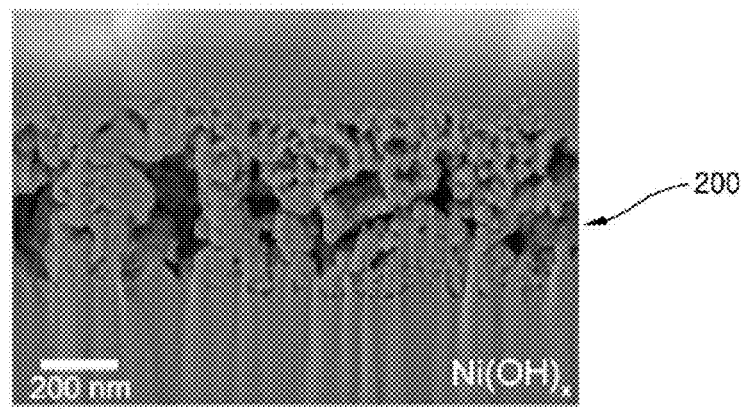
[FIG. 2b]
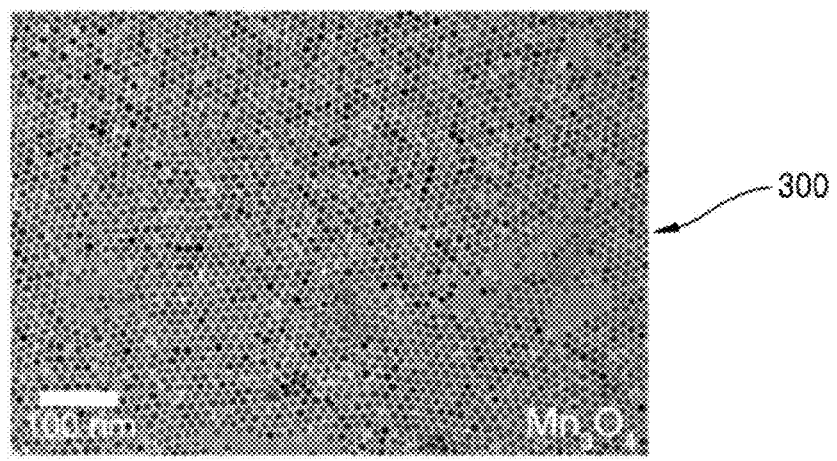

[FIG. 3b]
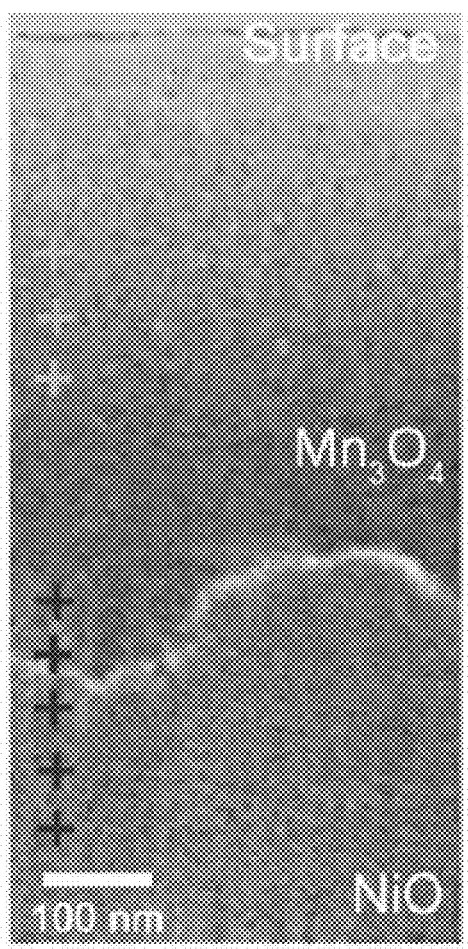

[FIG. 4a]
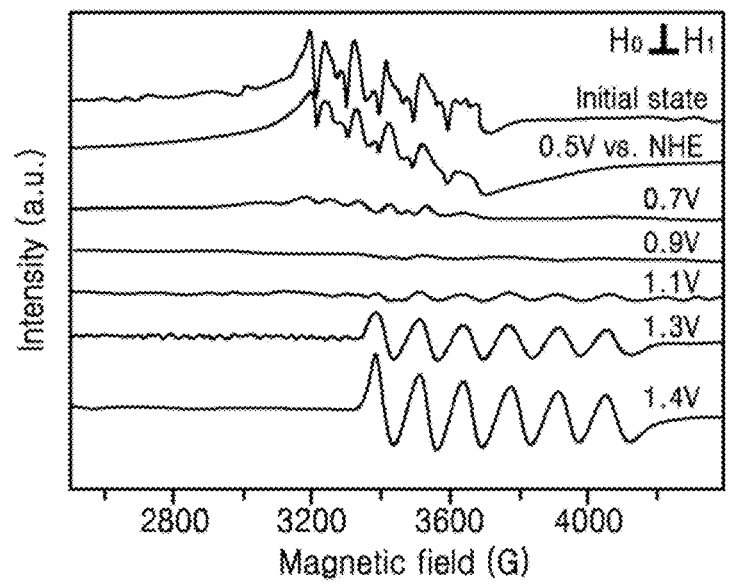
[FIG. 4b]
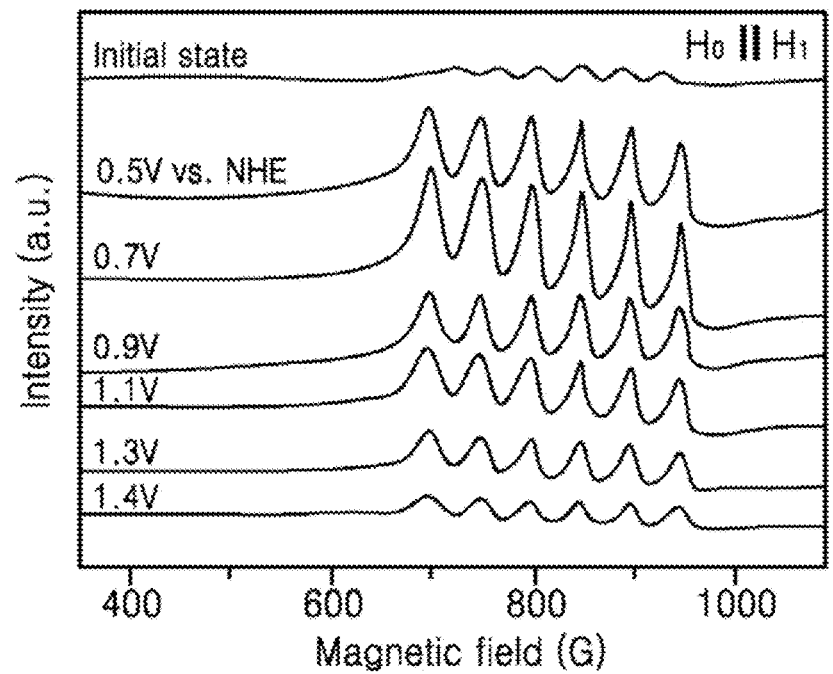

【FIG. 4c】
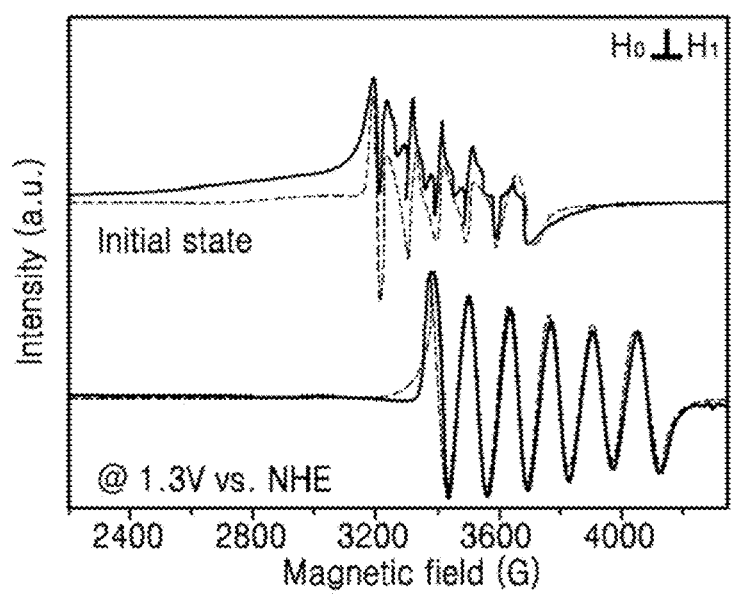
【FIG. 4d】
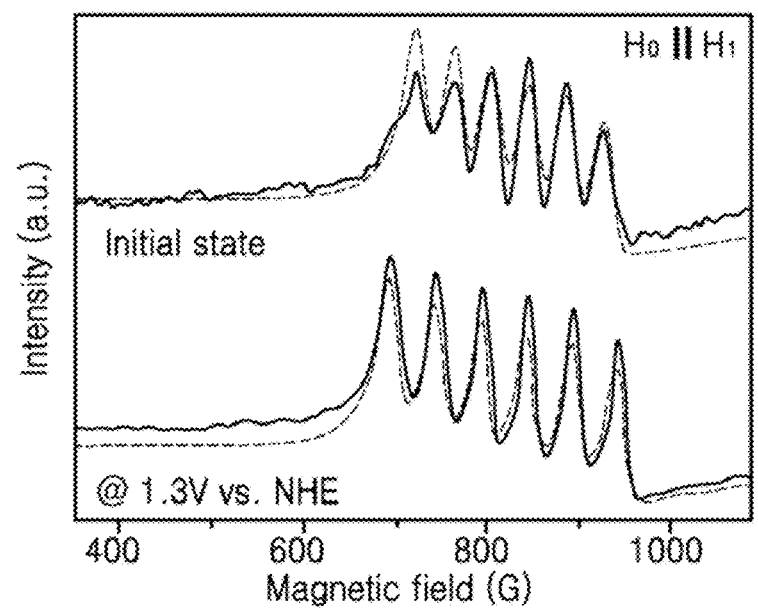

[FIG. 5]
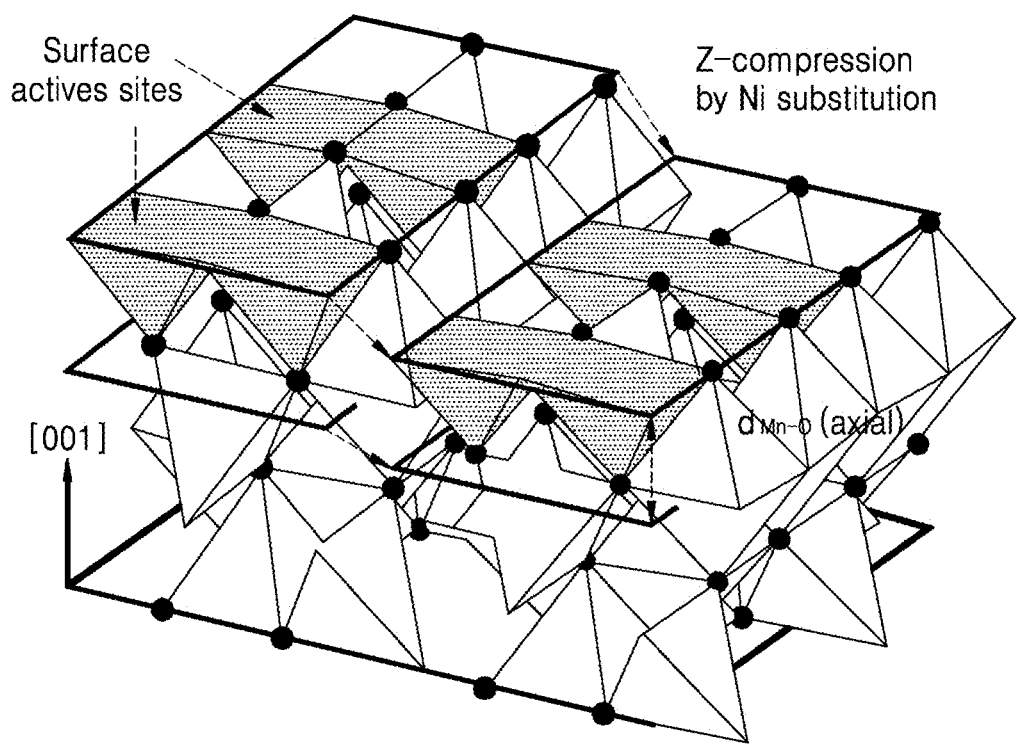

[FIG. 6]
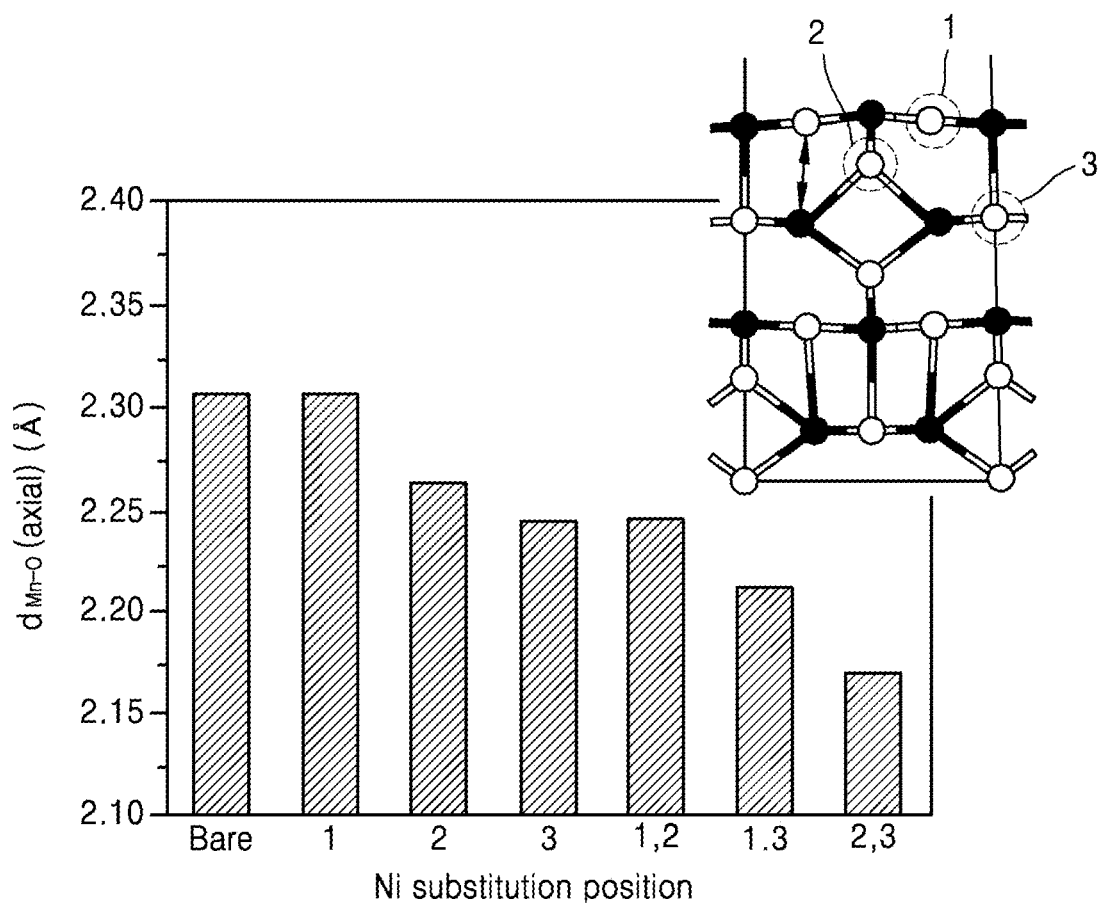

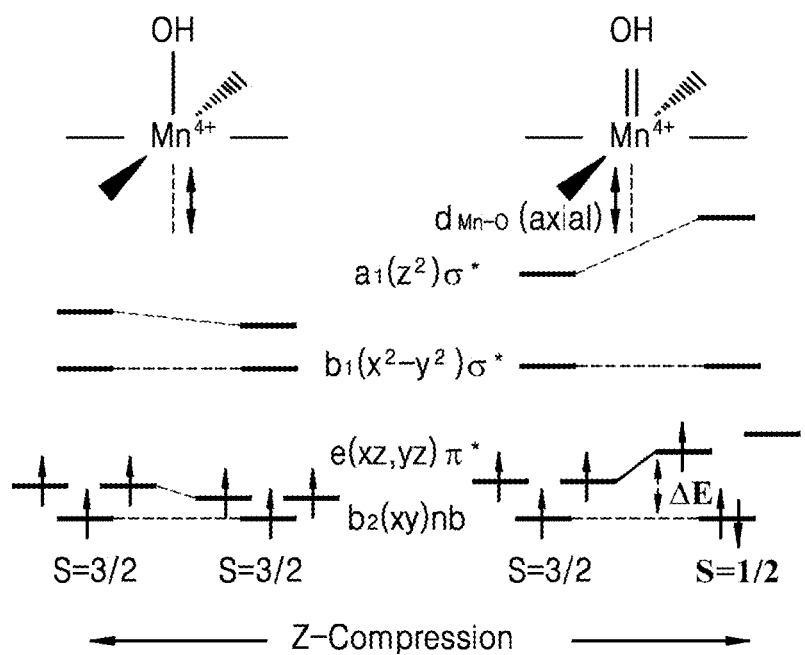
[FIG. 7]

[FIG. 8]
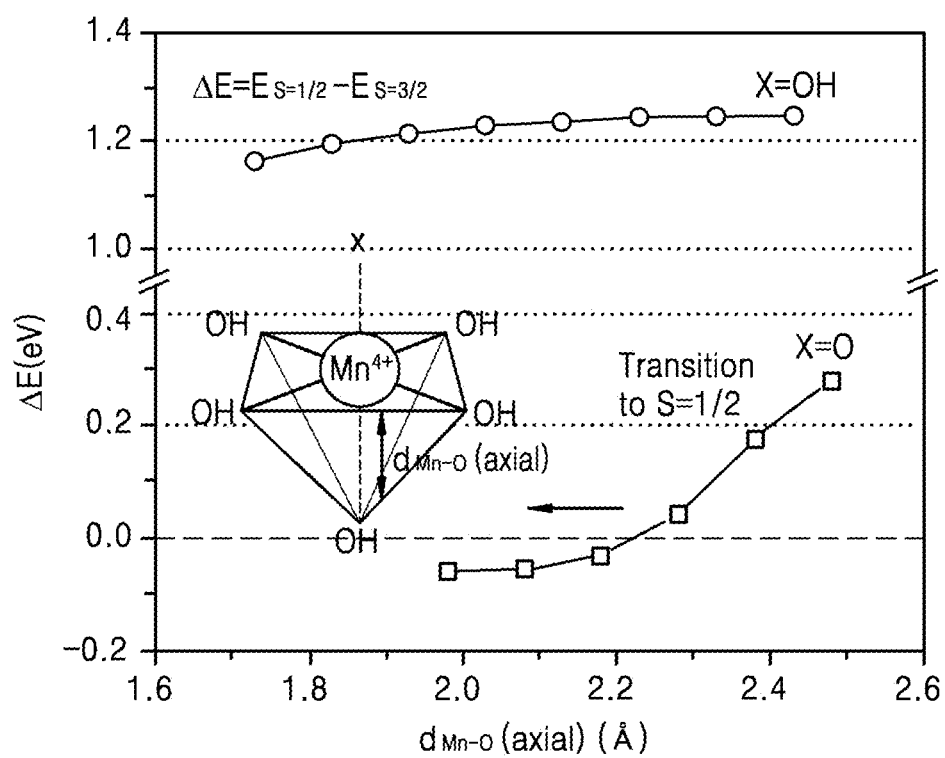

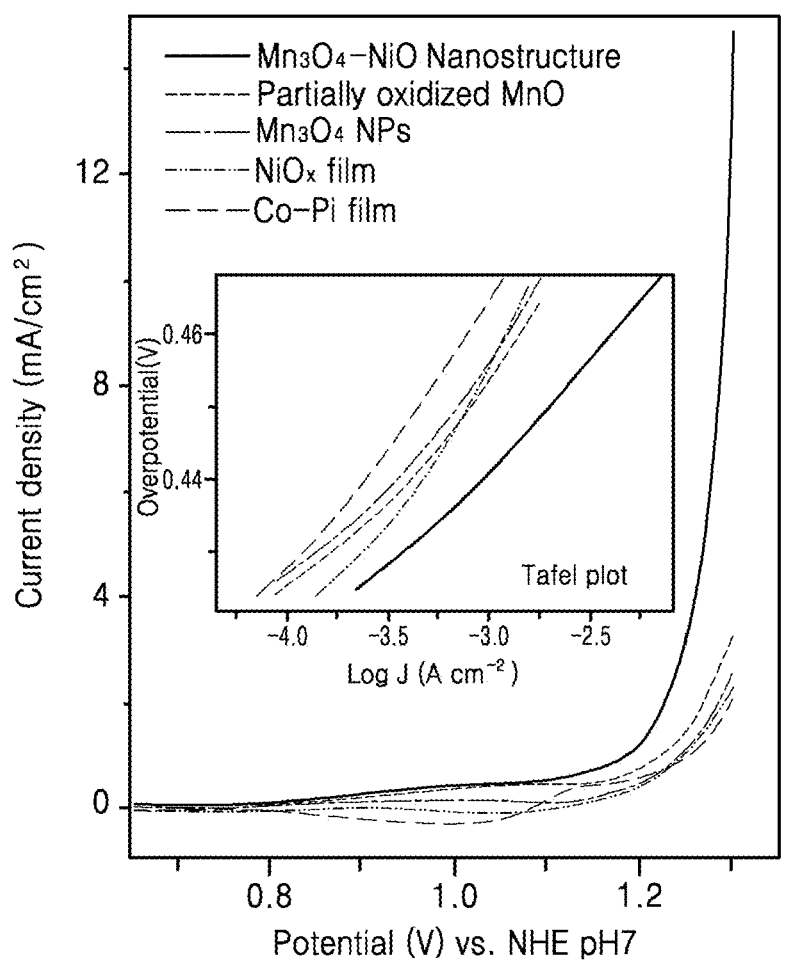
[FIG. 9]

[FIG. 10]
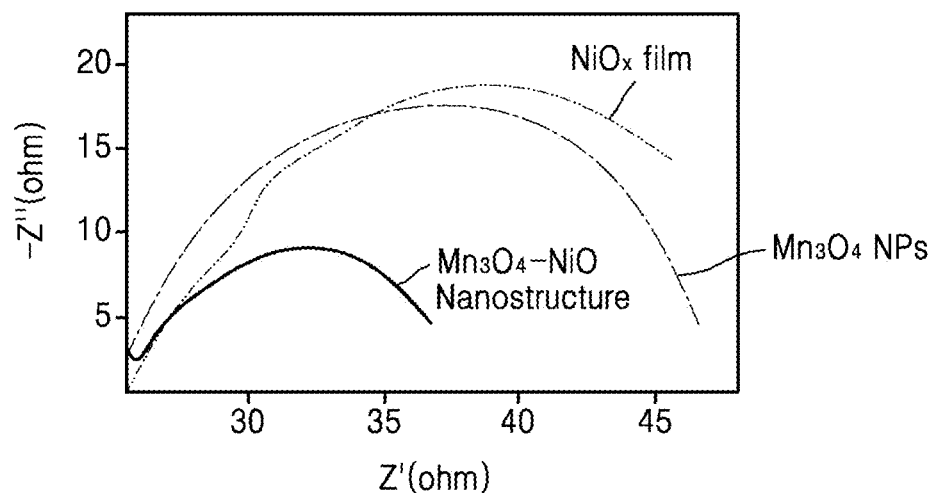

[FIG. 12a]
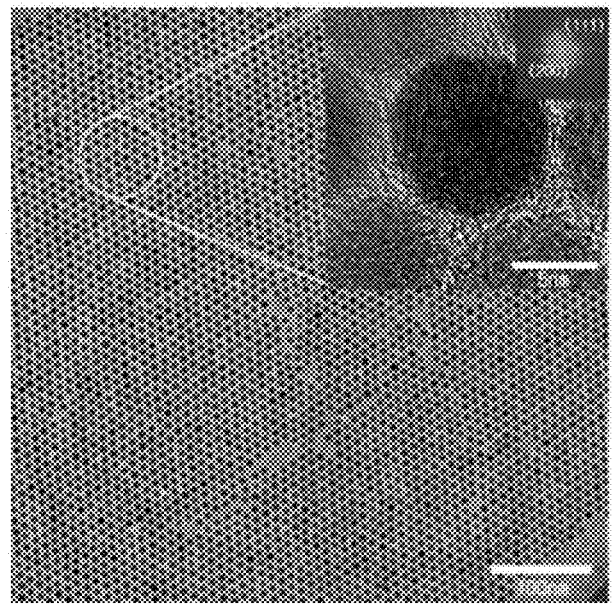
[FIG. 12b]
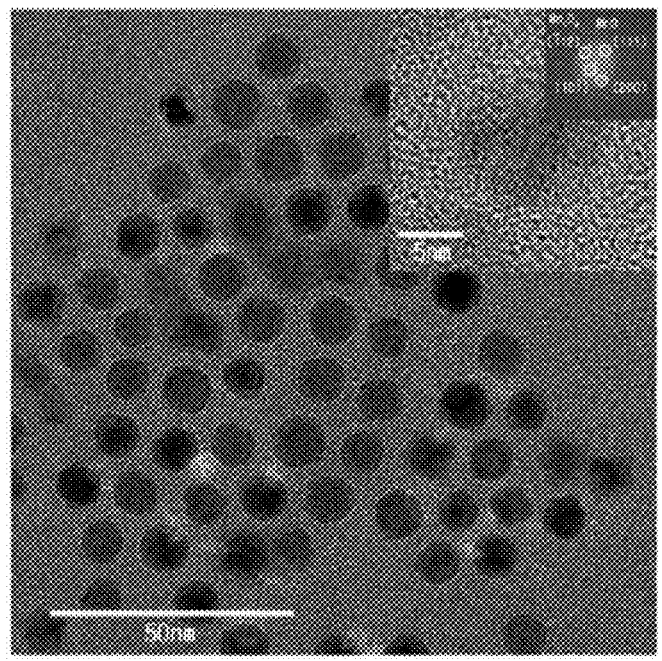

[FIG. 13]
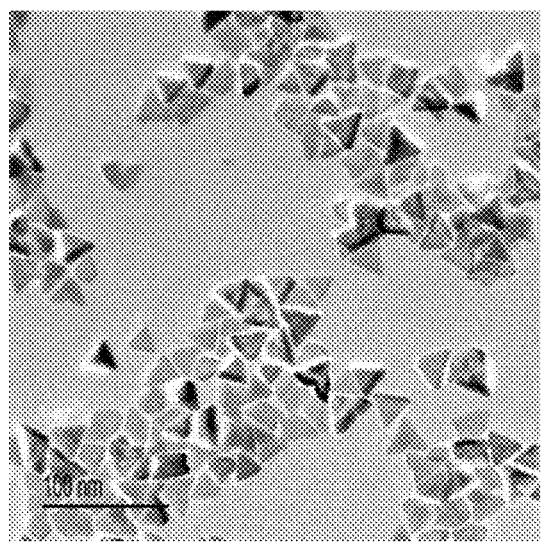

[FIG. 14]
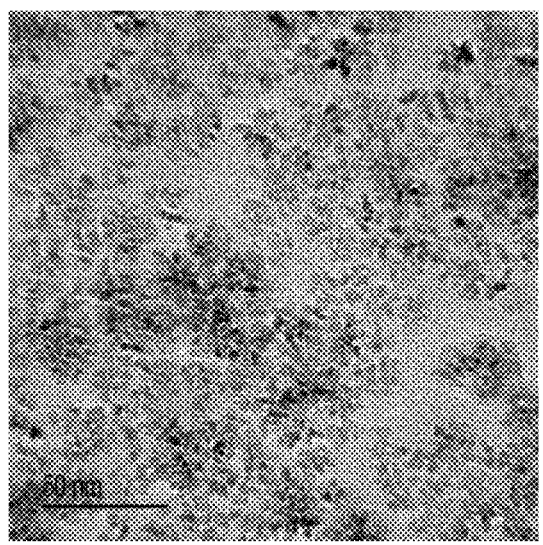

[FIG. 15]
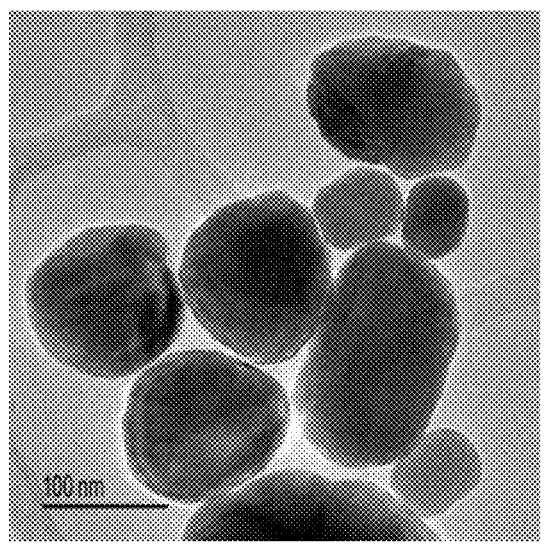

[FIG. 16]
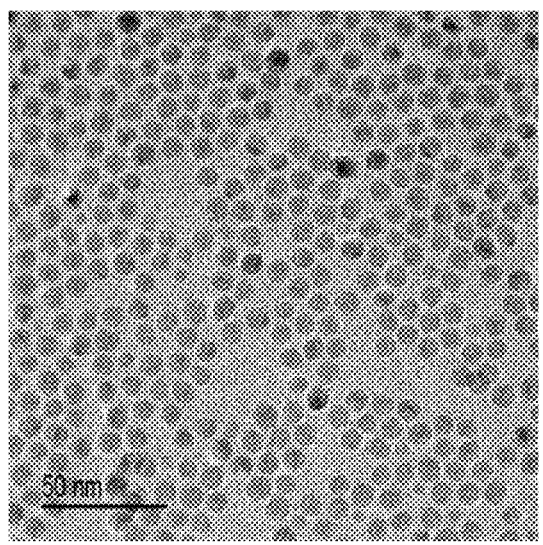

[FIG. 17]
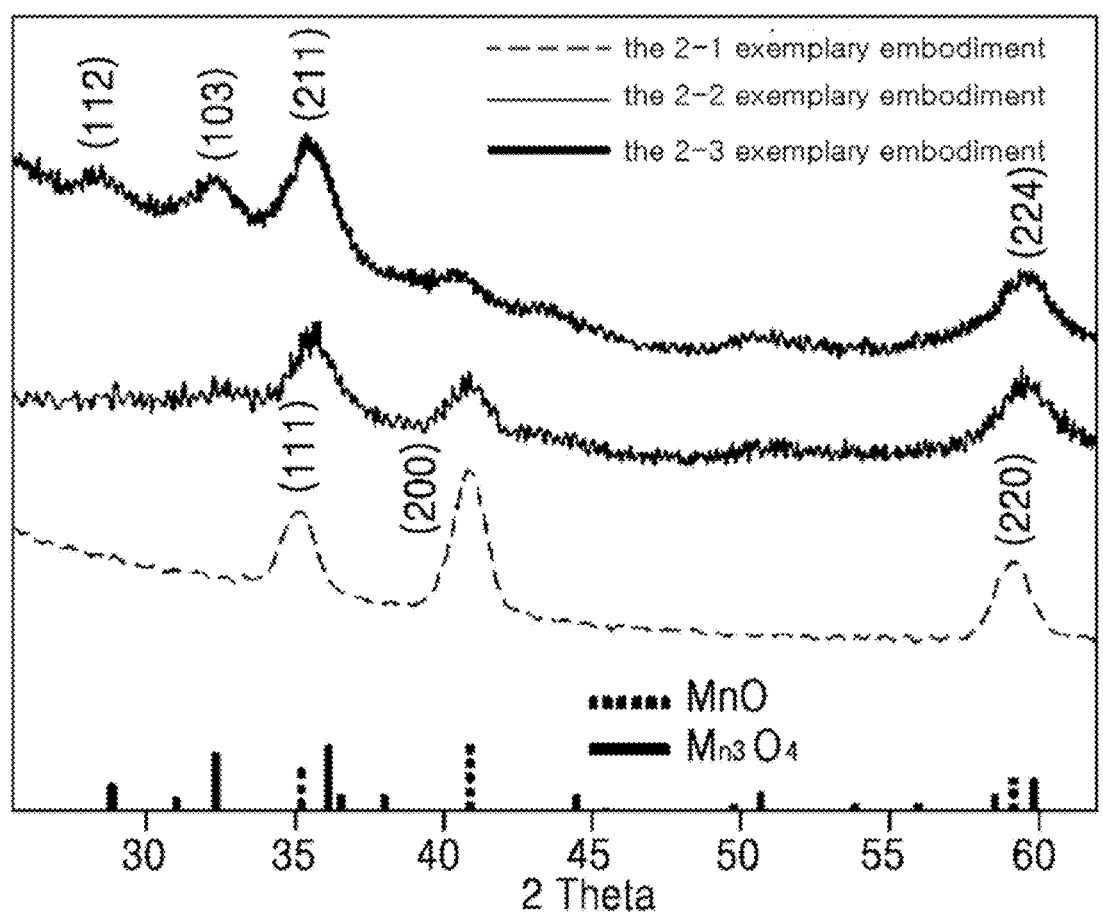

[FIG. 18]
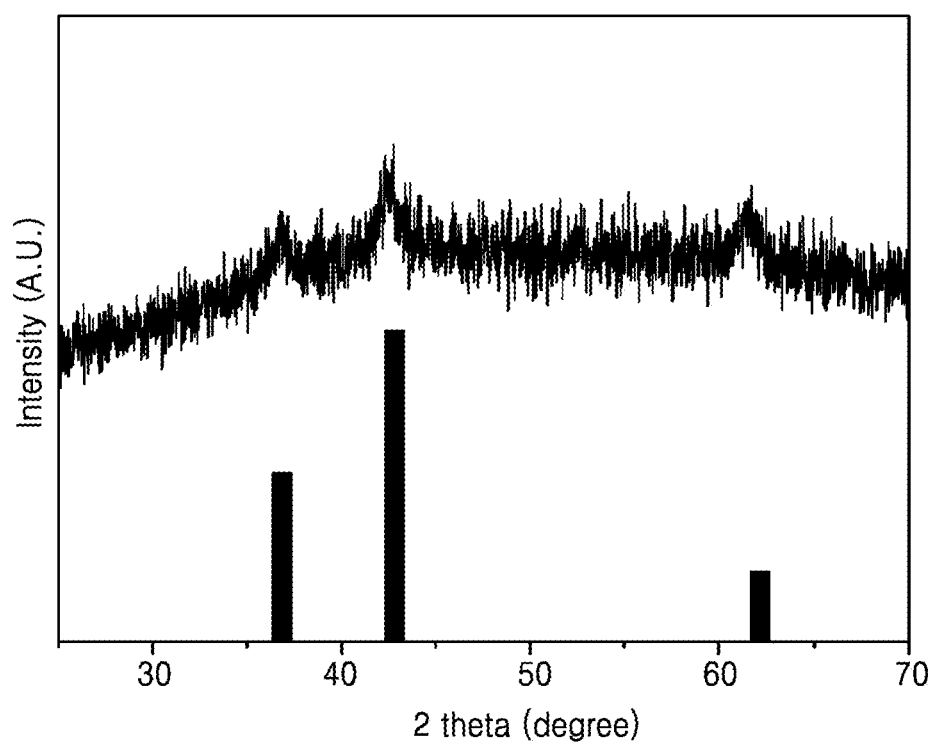

[FIG. 19]
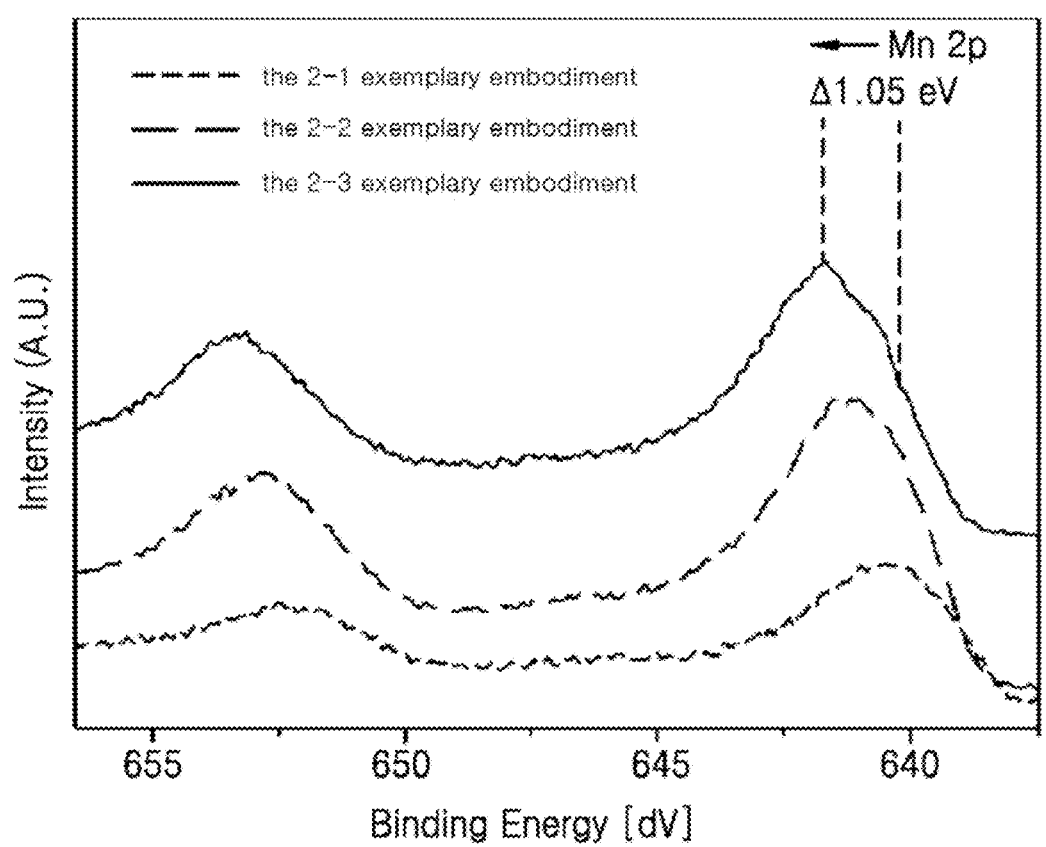

[FIG. 20]
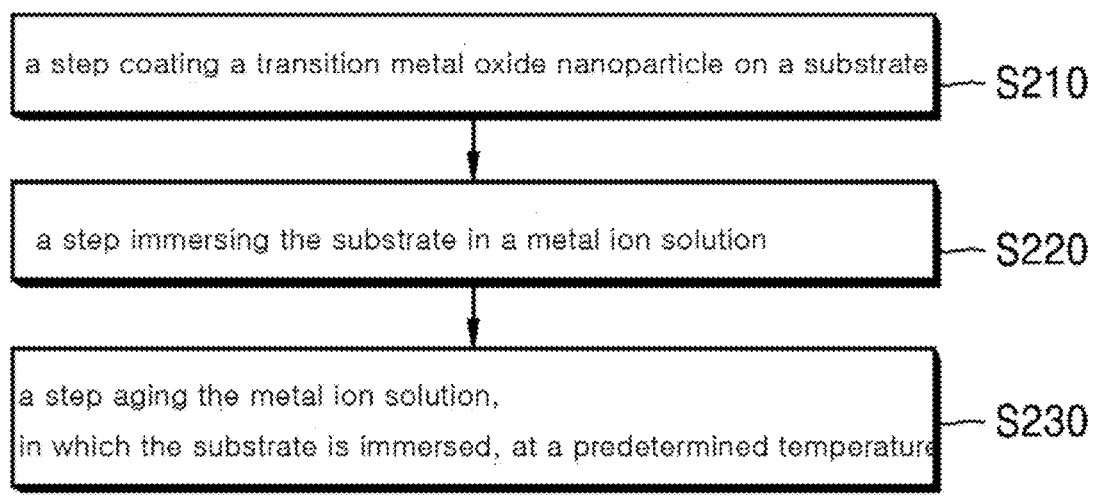

[FIG. 21]
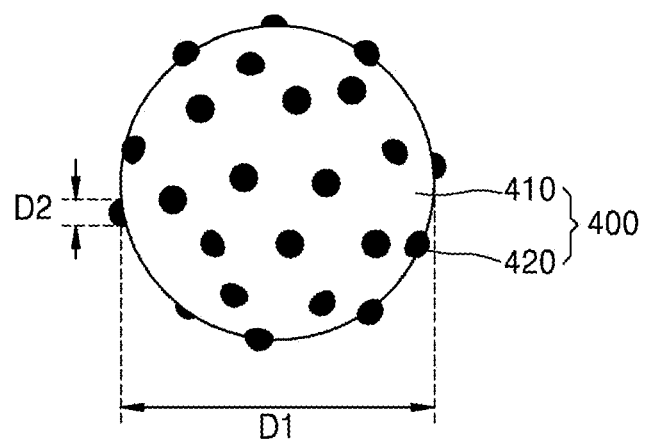

[FIG. 22a]
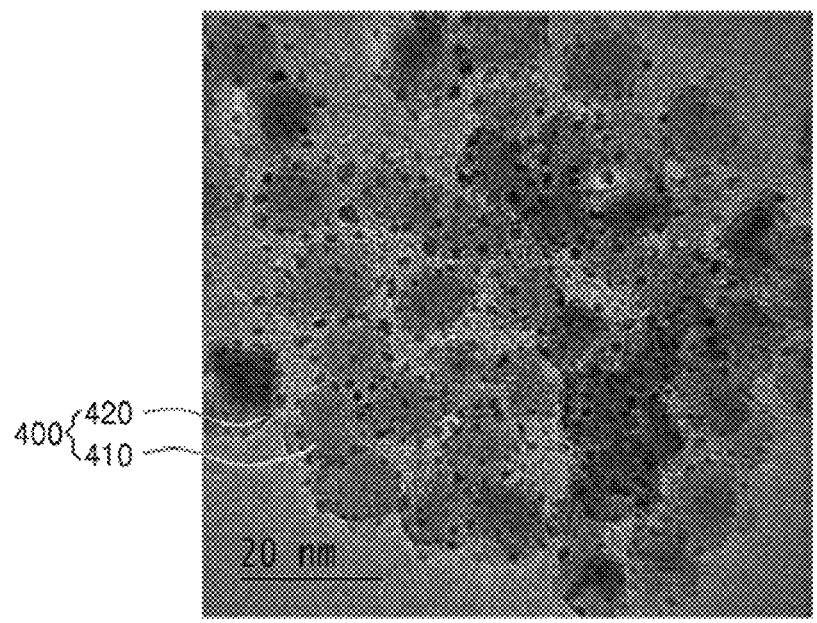

[FIG. 22b]
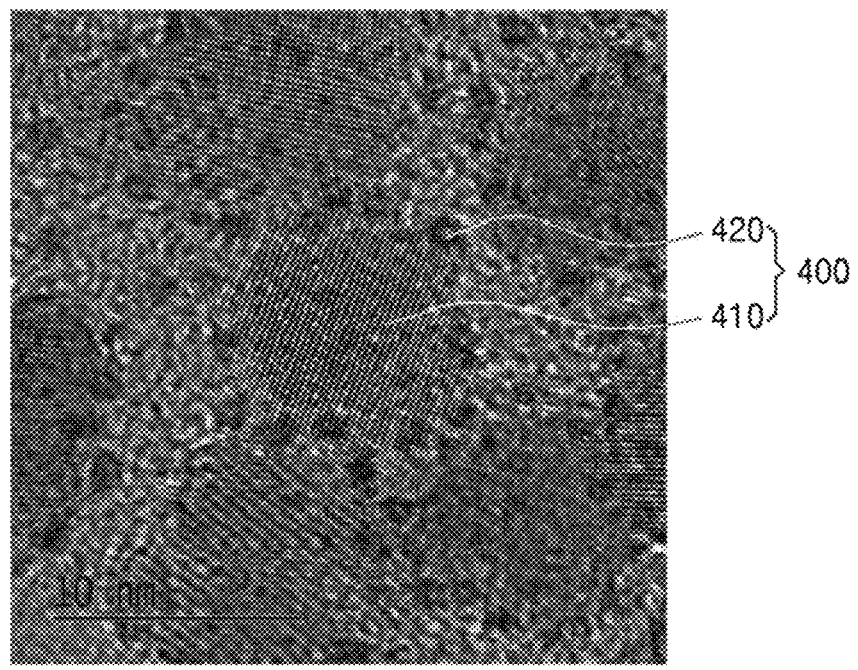

[FIG. 23a]
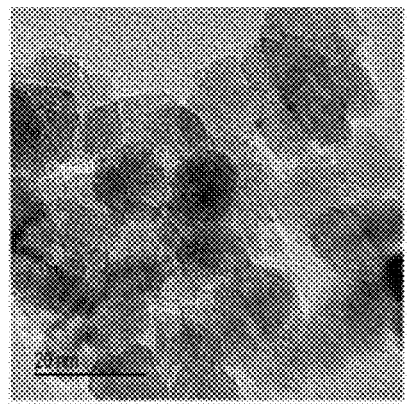
[FIG. 23b]
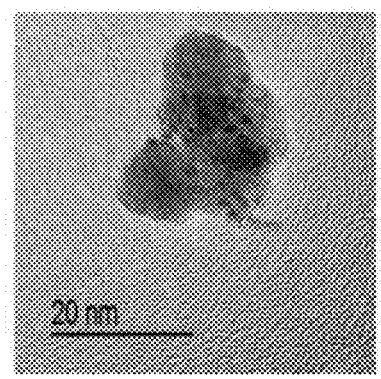
[FIG. 23c]
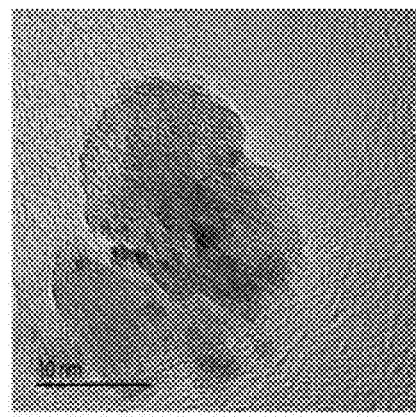

[FIG. 24]
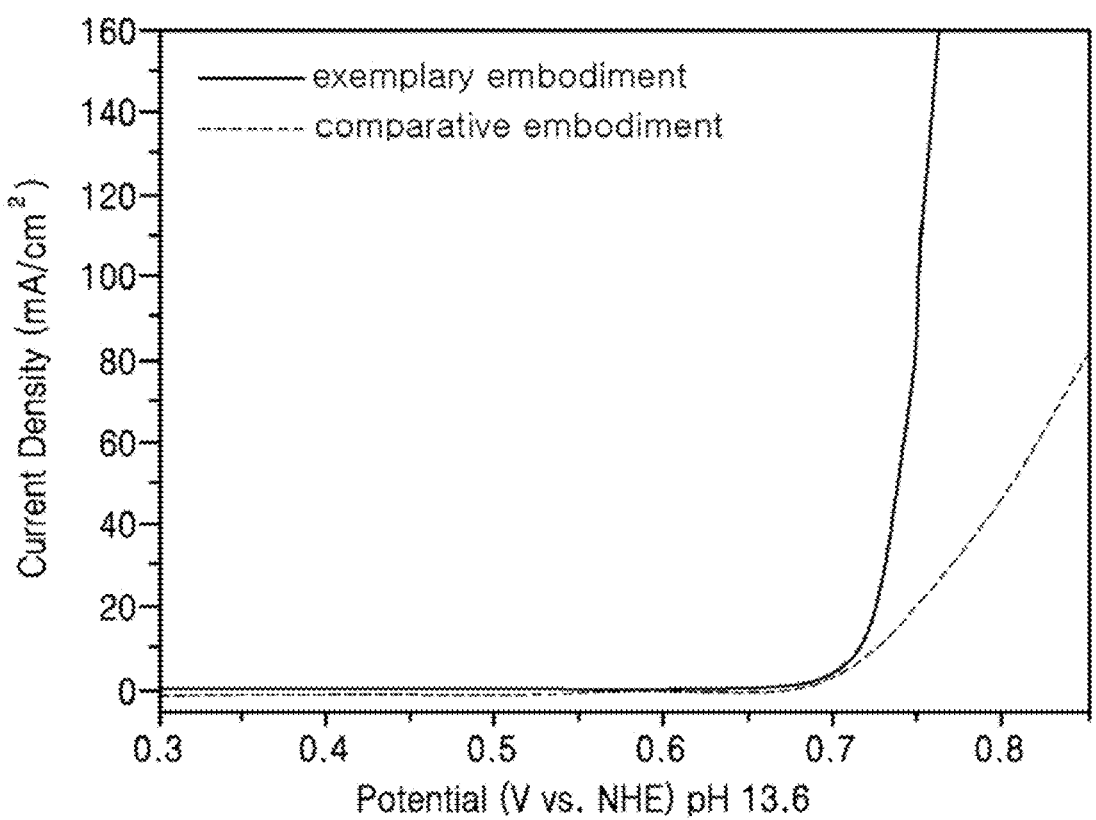

[FIG. 25]
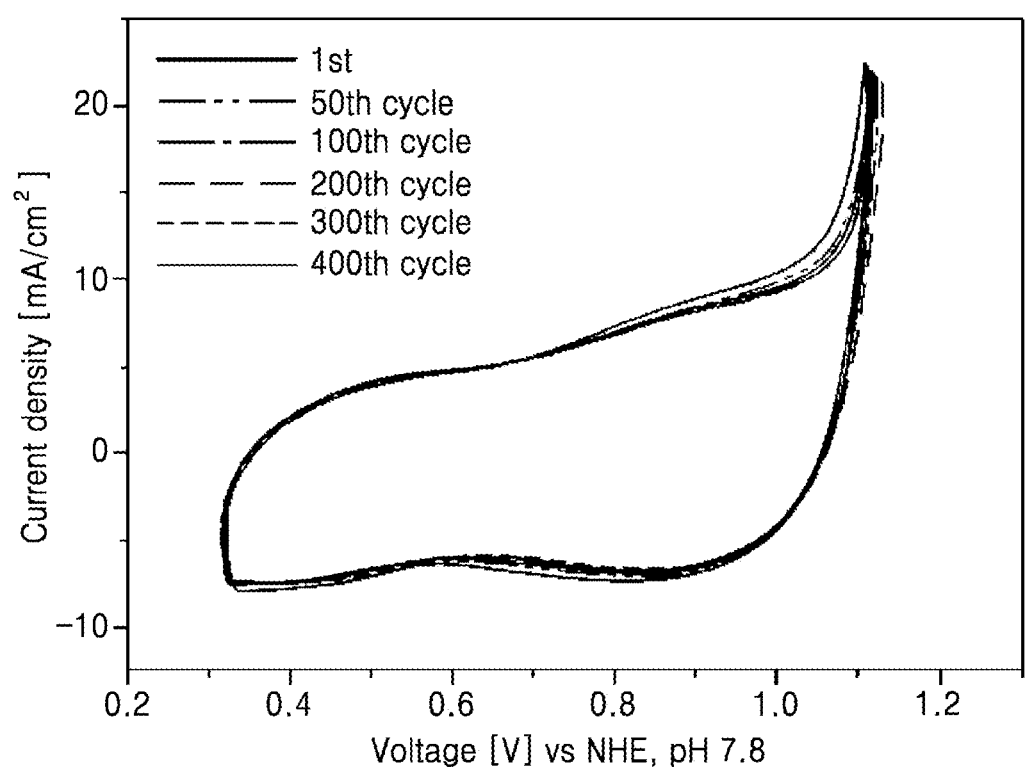

[FIG. 26]
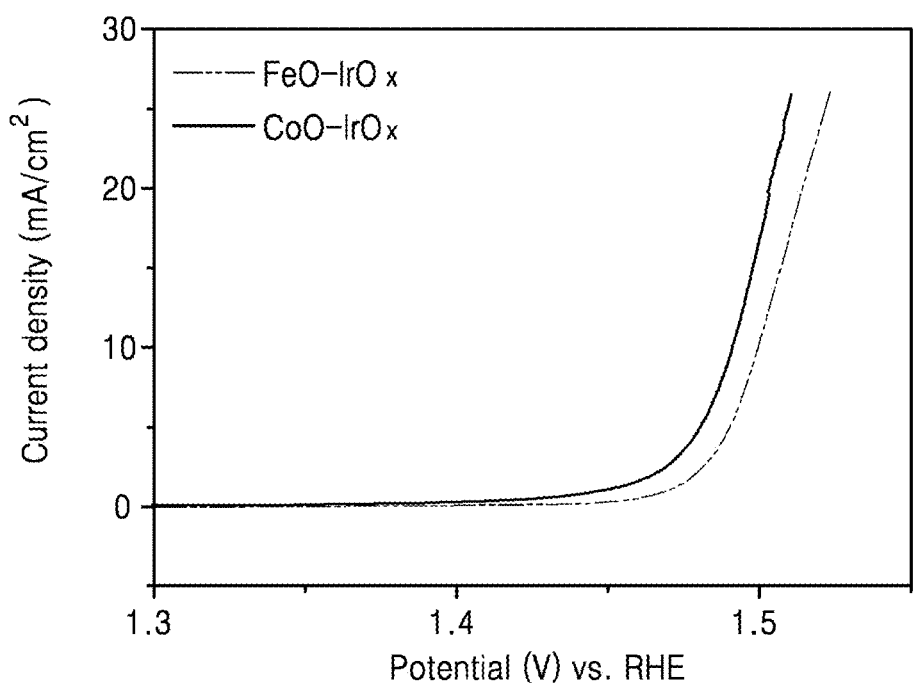

[FIG. 27]
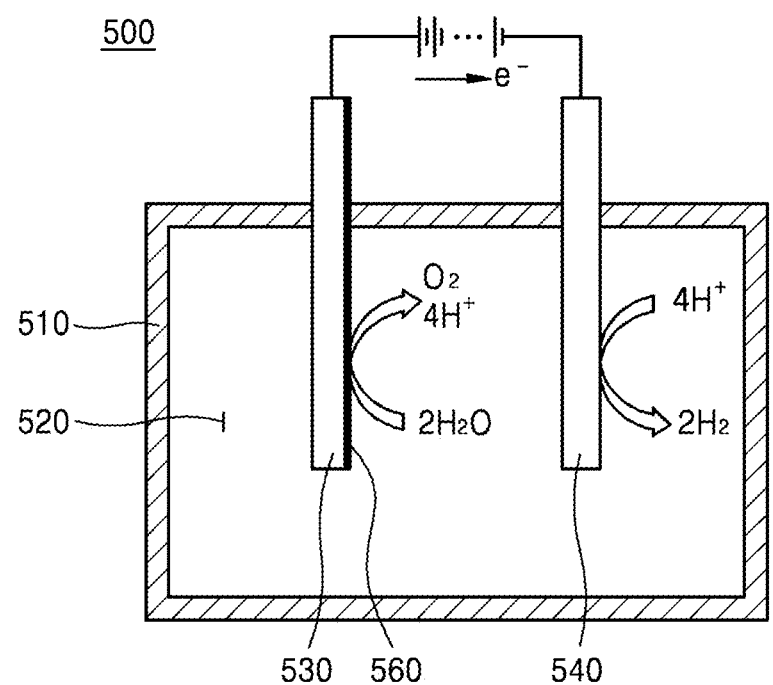

[FIG. 28]
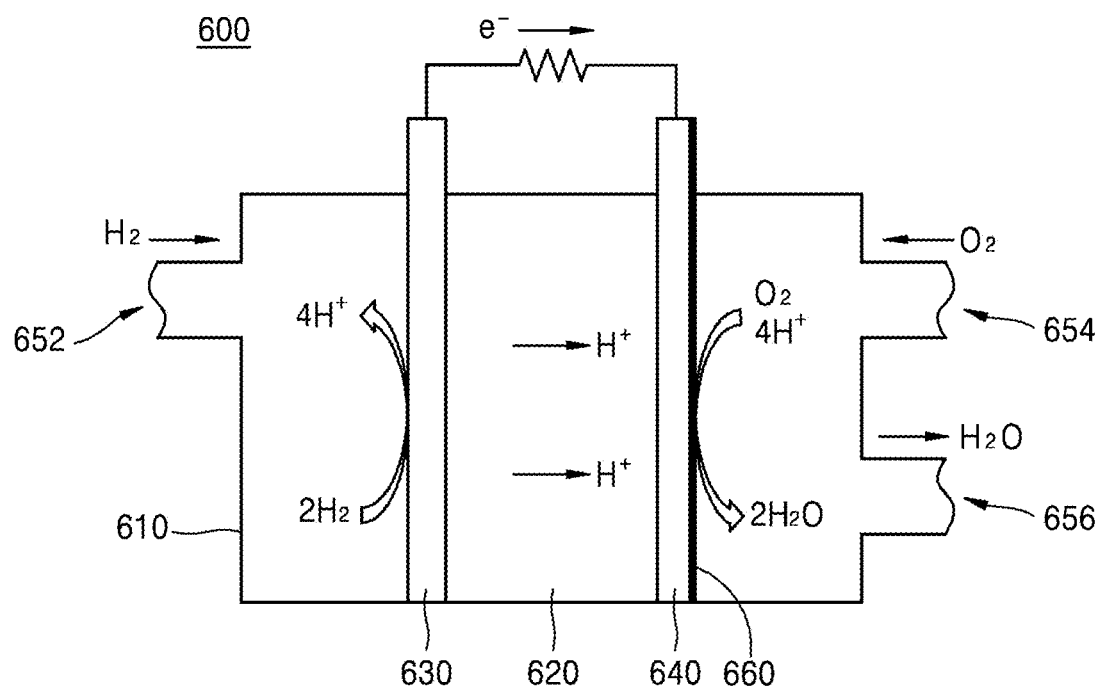

[FIG. 29]
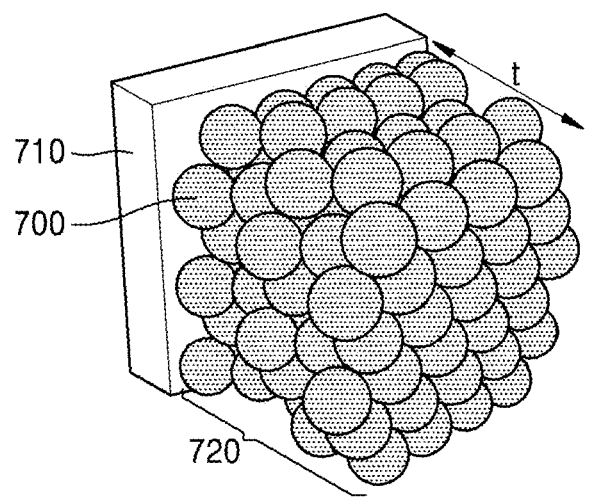

[FIG. 30]
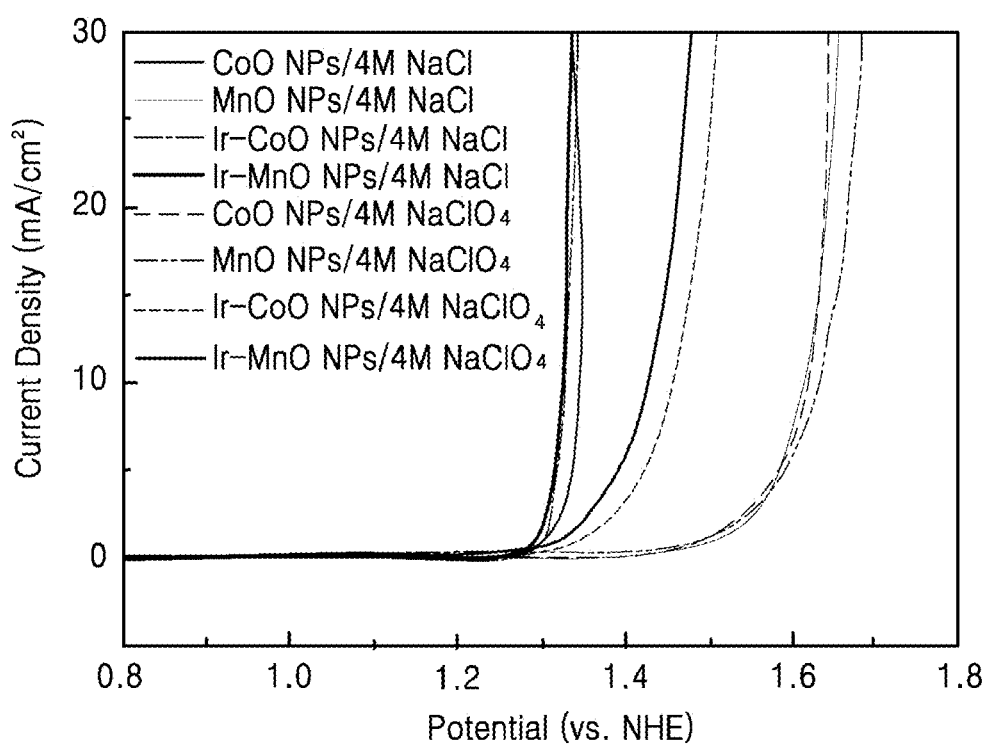

[FIG. 31]
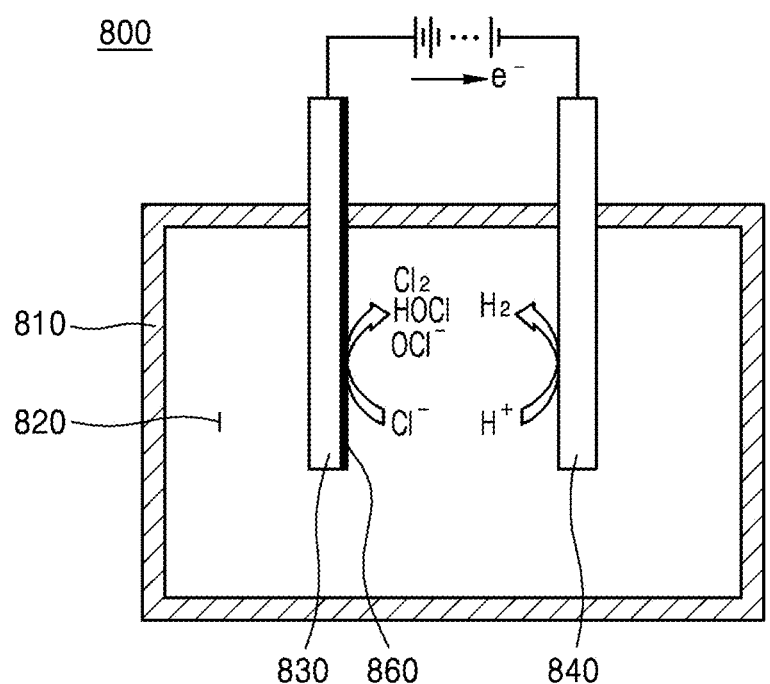

[FIG. 32]
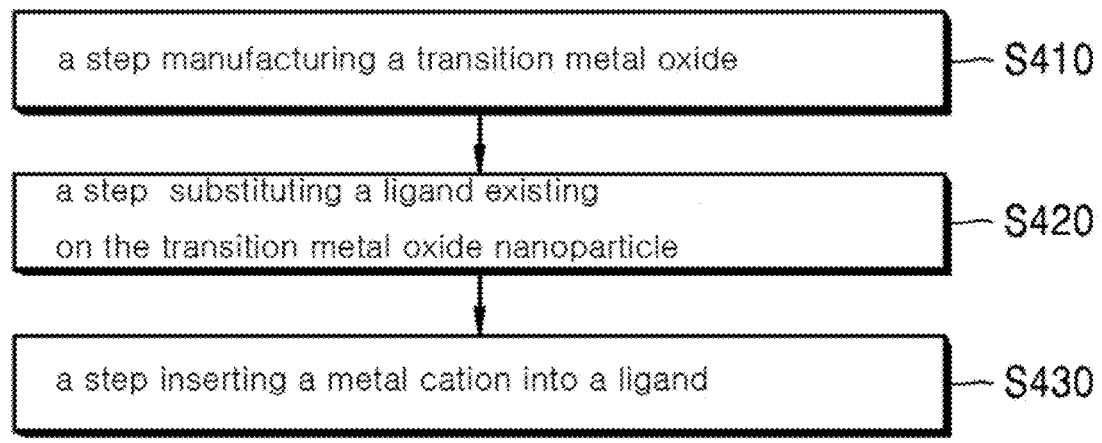

[FIG. 33]
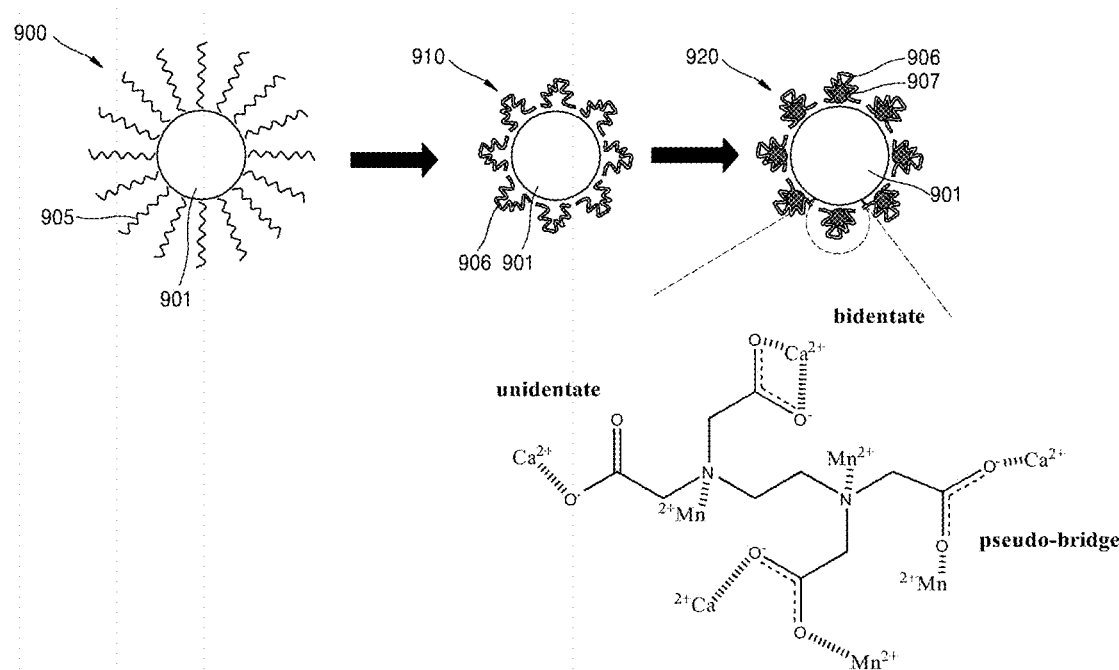

[FIG. 34]
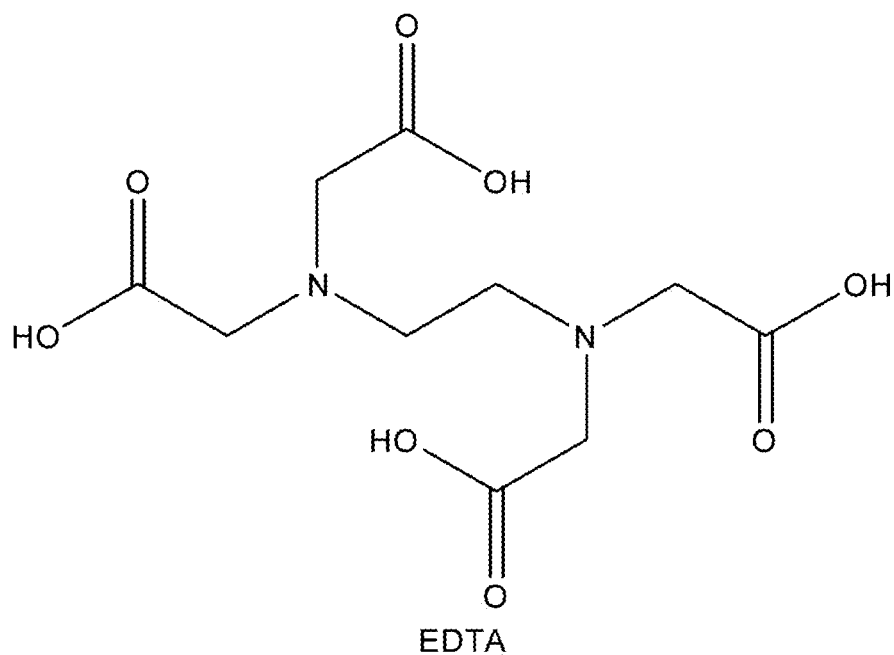
EDTA

[FIG. 35]
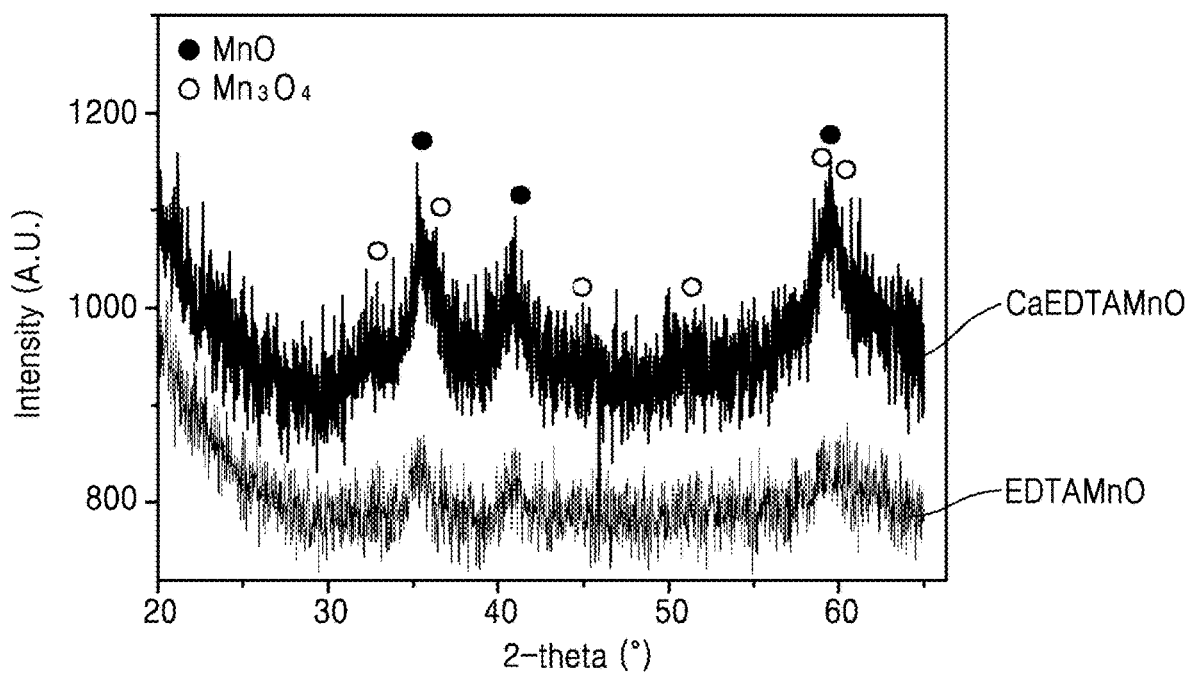

[FIG. 36]
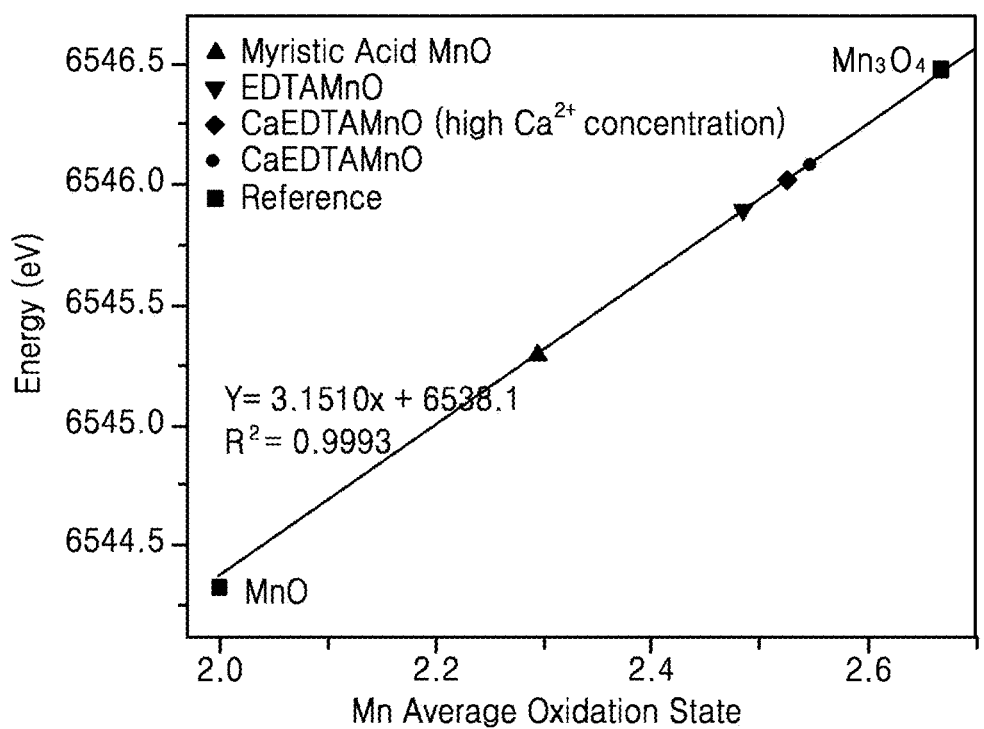

[FIG. 37]
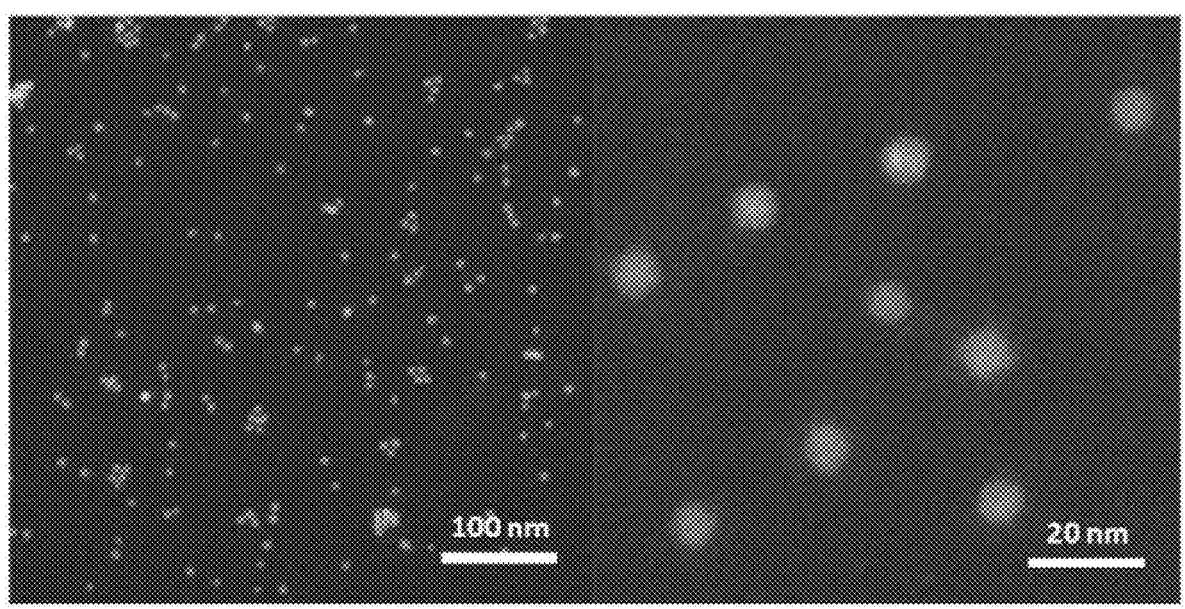

[FIG. 38]
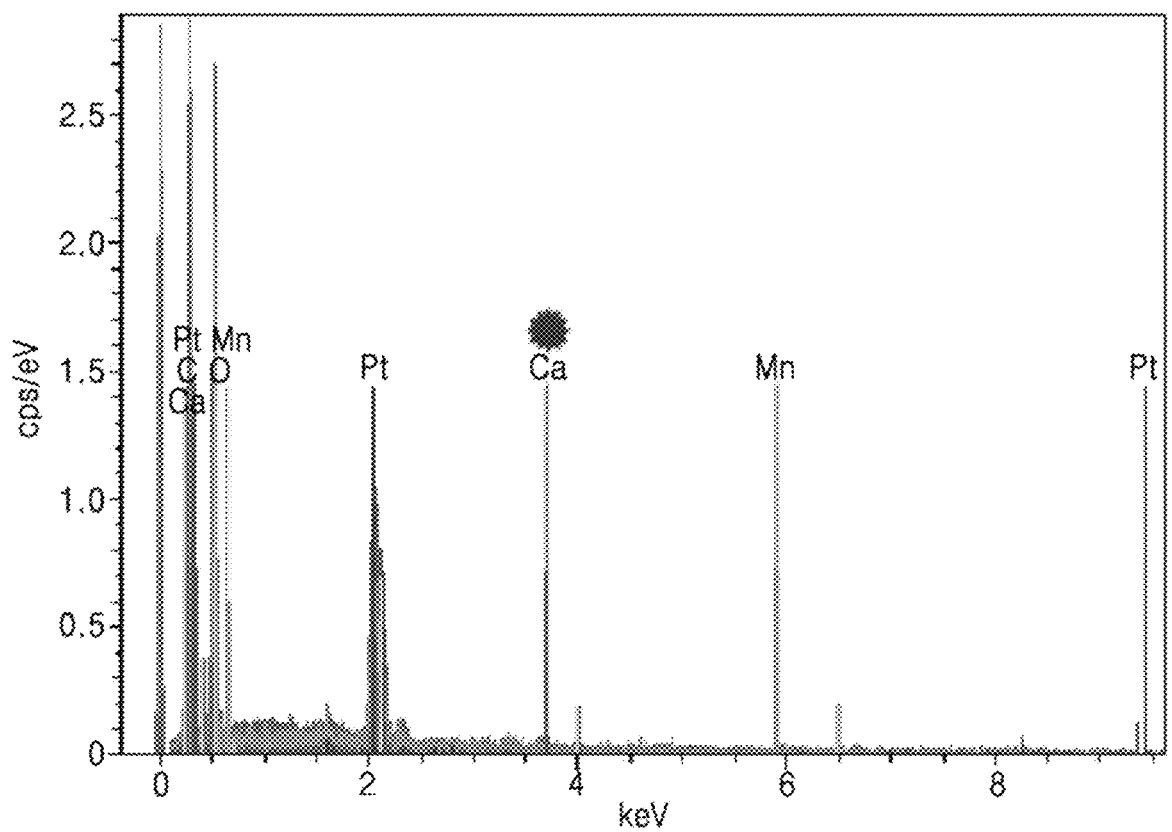

[FIG. 39a]
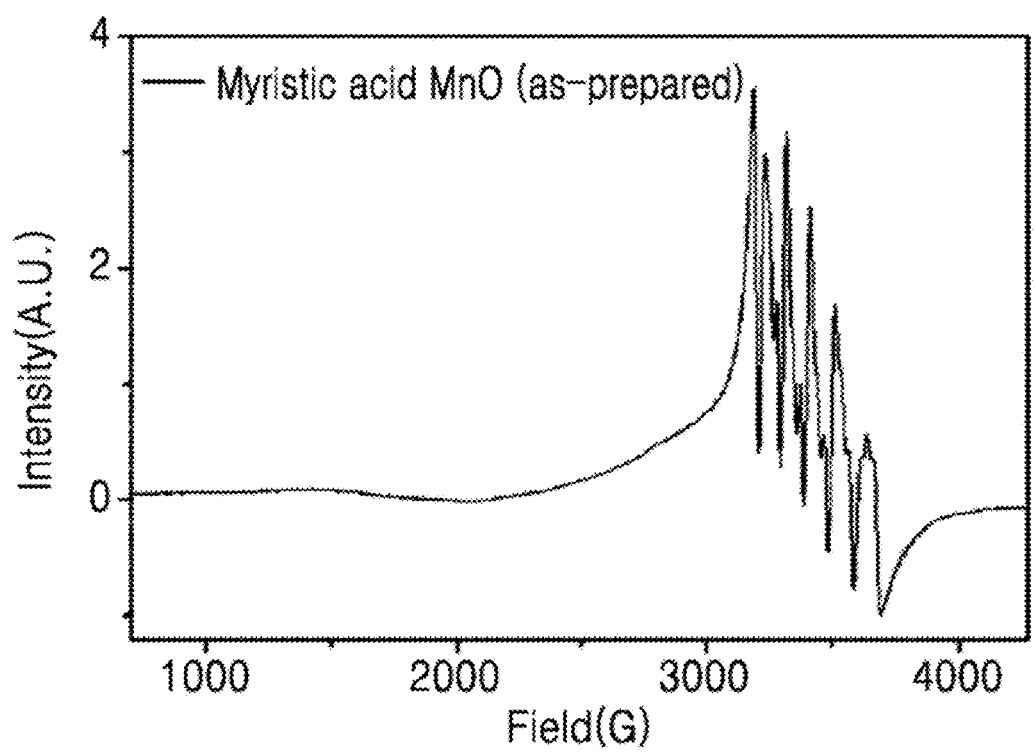

[FIG. 39b]
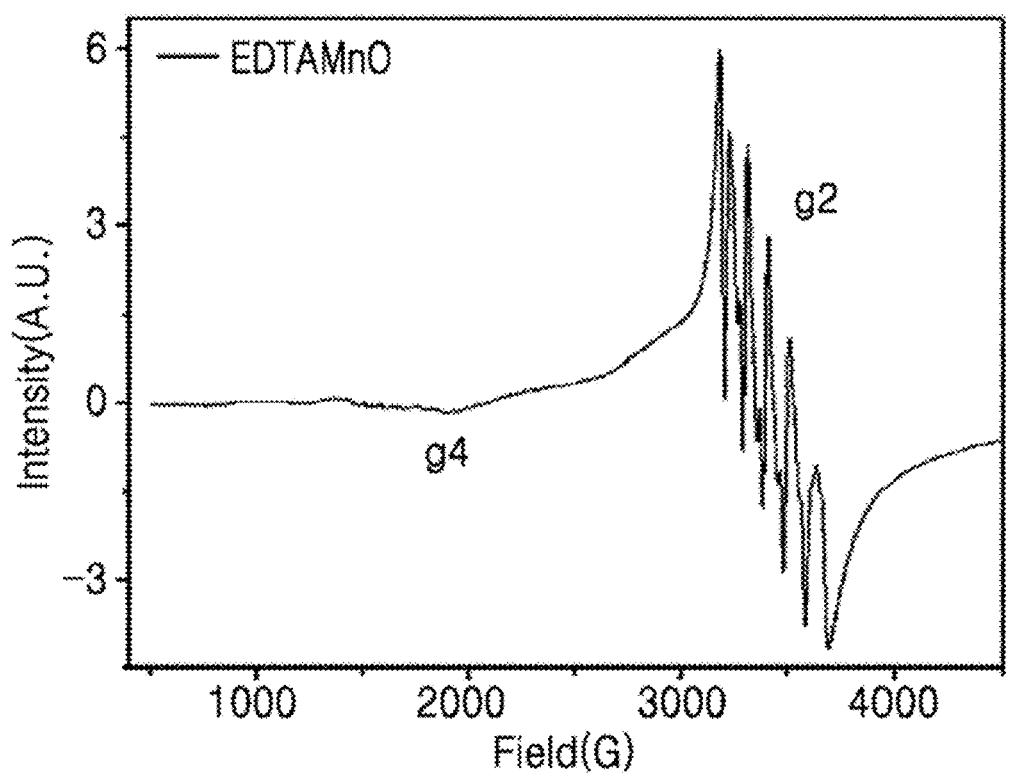

[FIG. 39c]
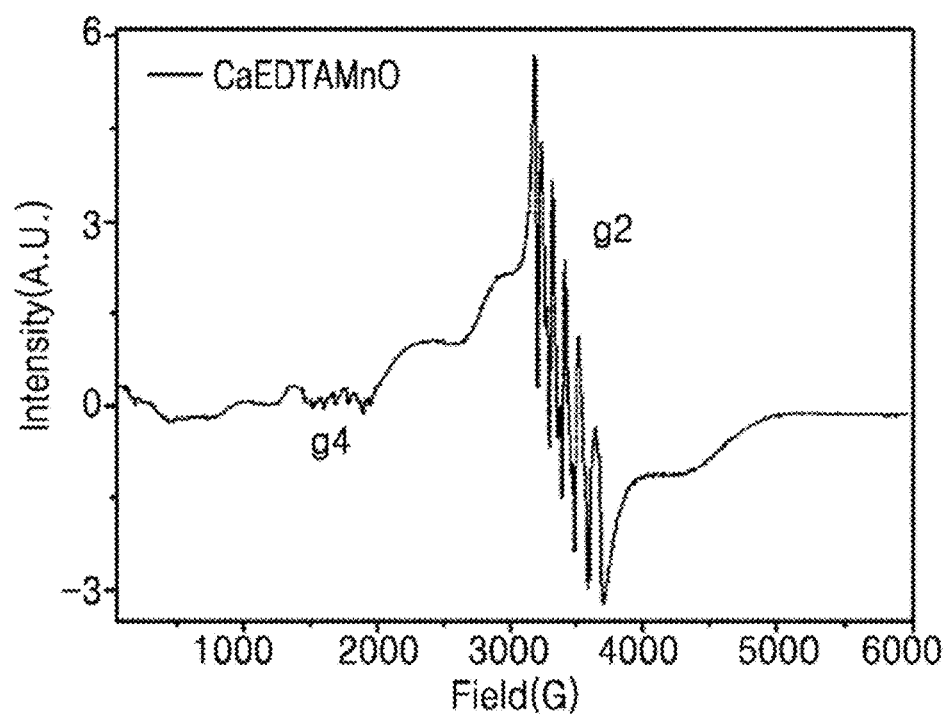

[FIG. 40a]
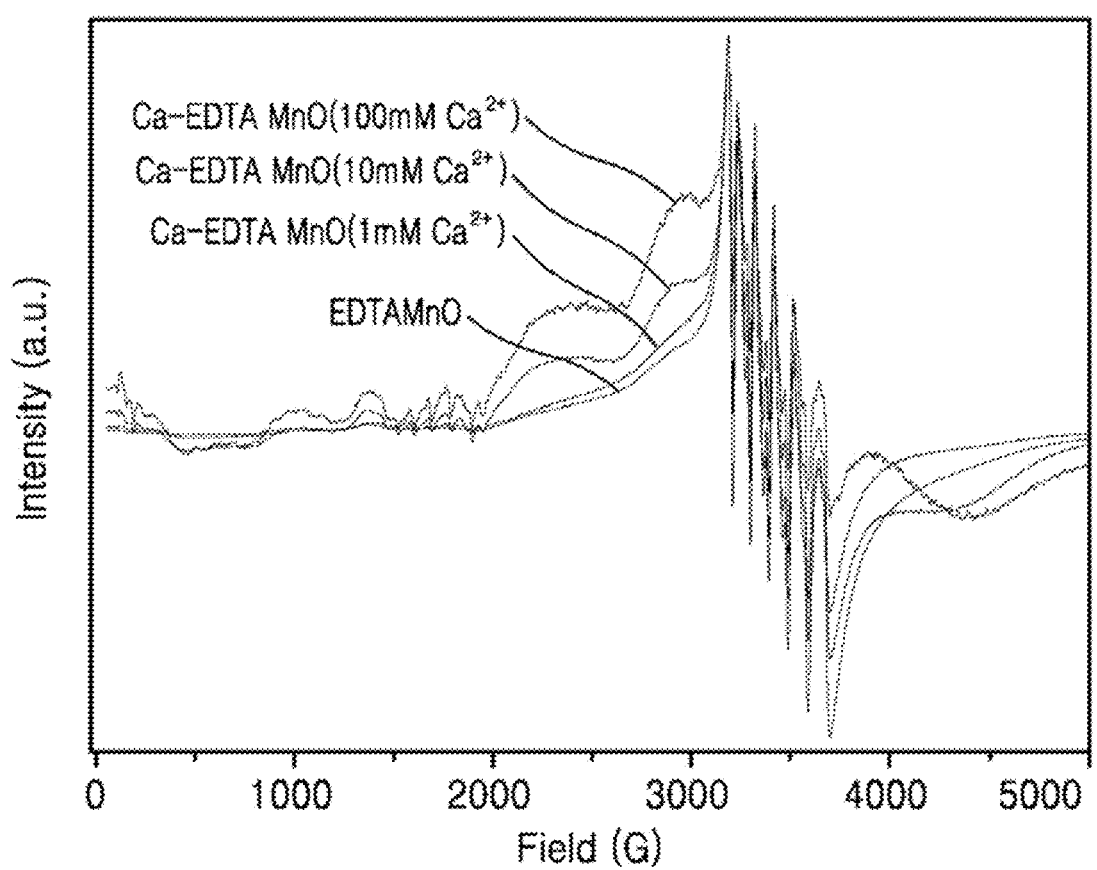

[FIG. 40b]
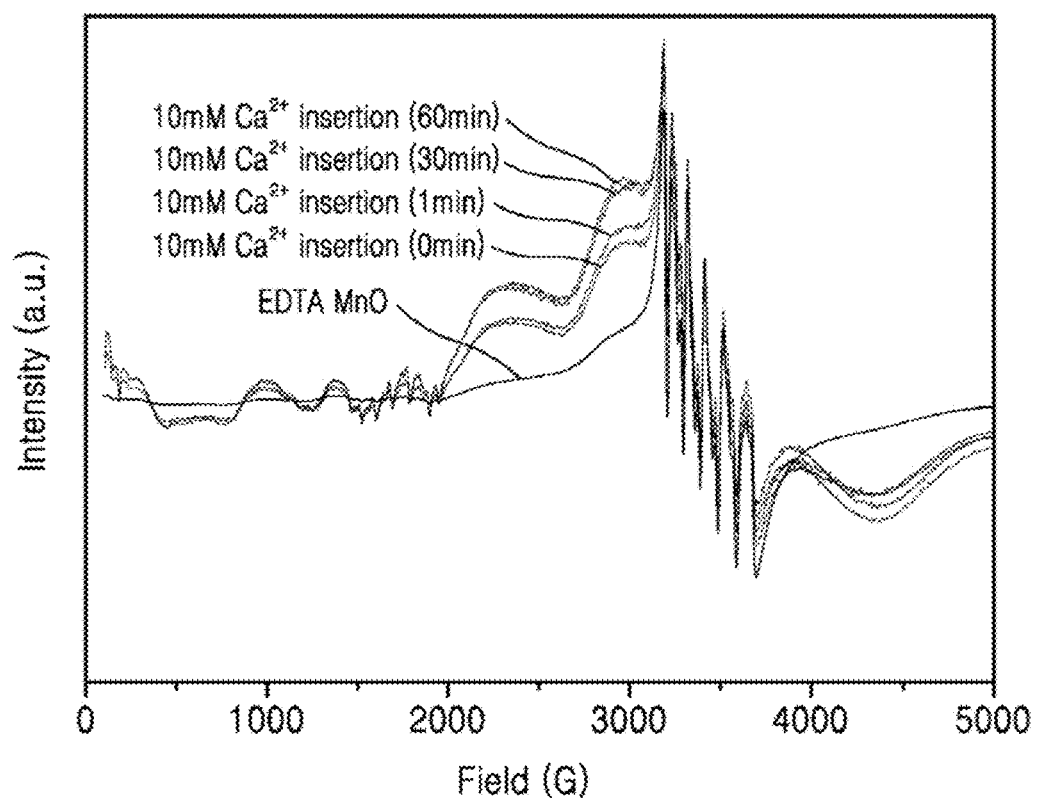

[FIG. 41a]
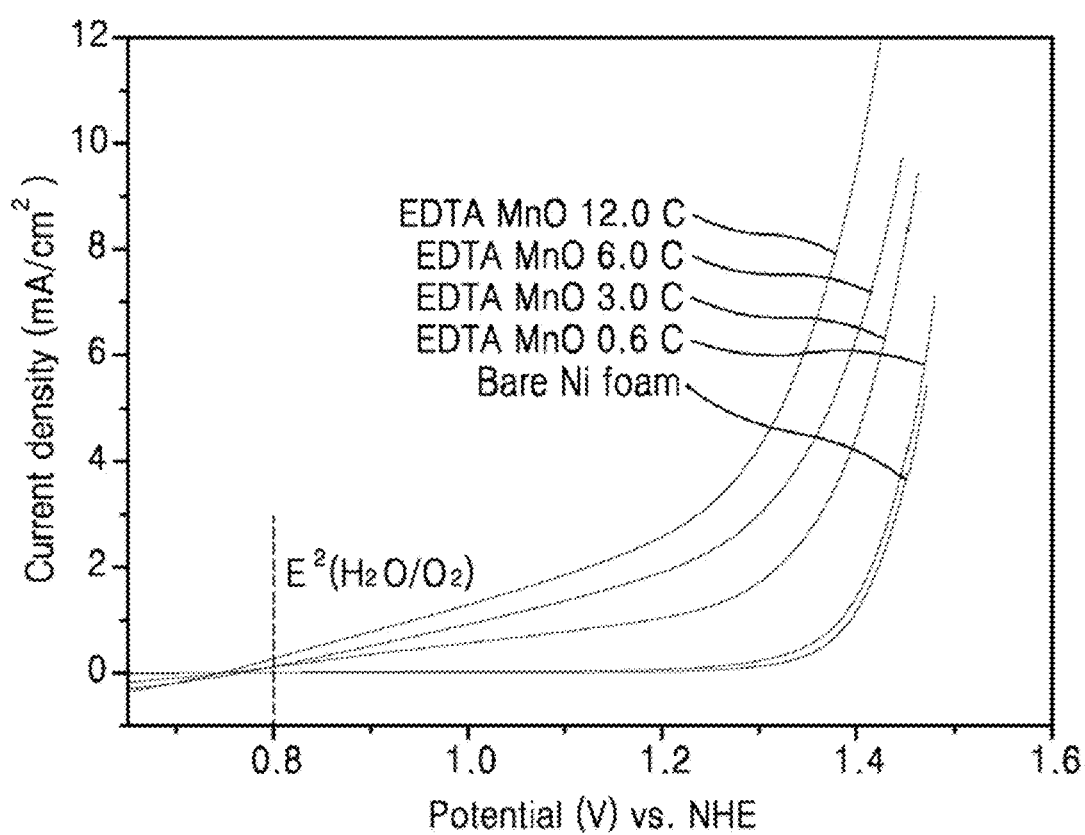

[FIG. 41b]
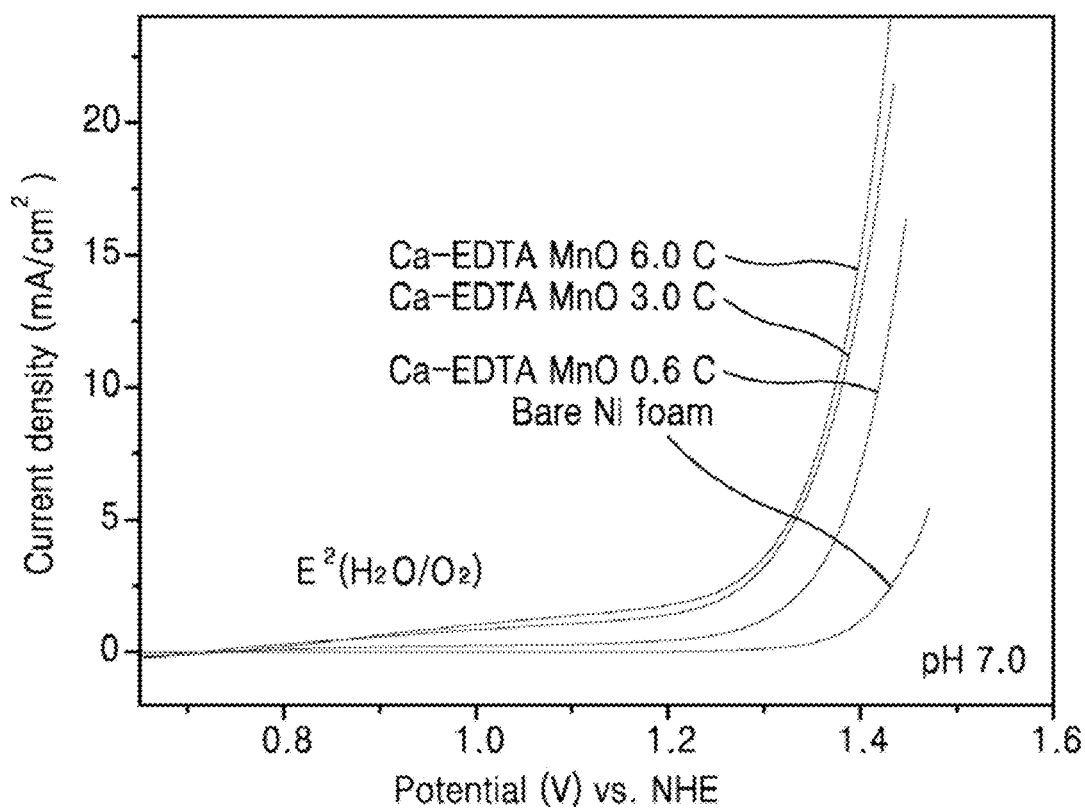

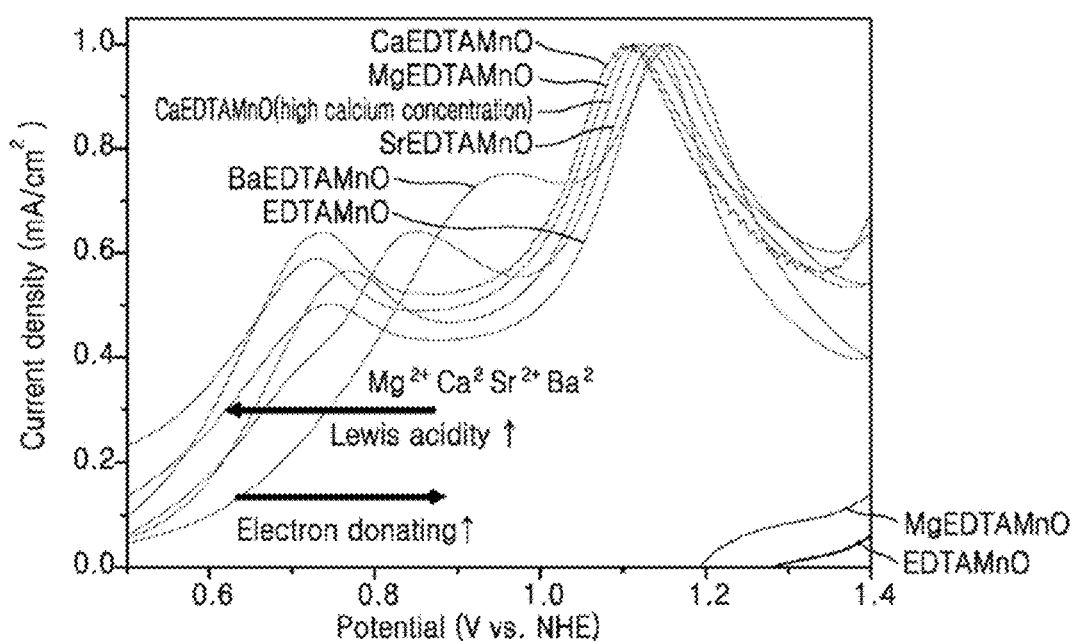
[FIG. 42a]

[FIG. 42b]
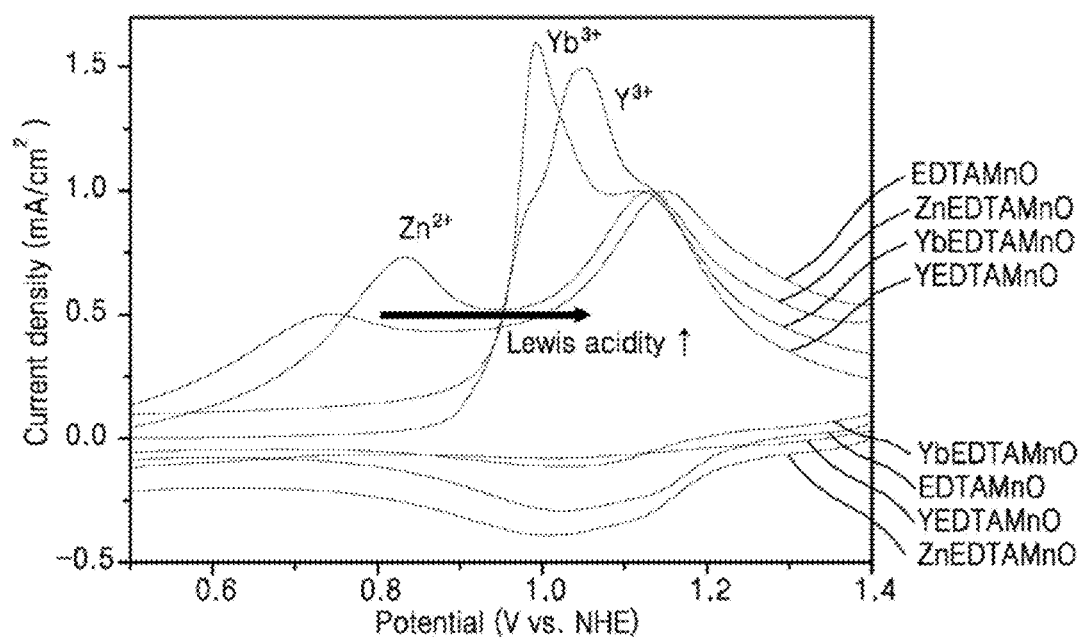

[FIG. 42c]

| | $Ba^{2+}$ | $Sr^{2+}$ | $Ca^{2+}$ | $Mg^{2+}$ | $Mn^{2+}$ | $Zn^{2+}$ | $Yb^{3+}$ | $Y^{3+}$ | $Mn^{3+}$ |
|---|---|---|---|---|---|---|---|---|---|
| Lewis acidity (pKa) | 13.4 | 13.2 | 12.7 | 11.2 | 10.6 | 9.0 | 8.2 | 7.7 | −0.6 |
| Electron configuration | $5p^6$ | $4p^6$ | $3p^6$ | $2p^6$ | $3d^5$ | $3d^{10}$ | $4f^{13}5s^25p^6$ | $4p^6$ | $3d^4$ |

Lewis acidity ↑

[FIG. 43a]
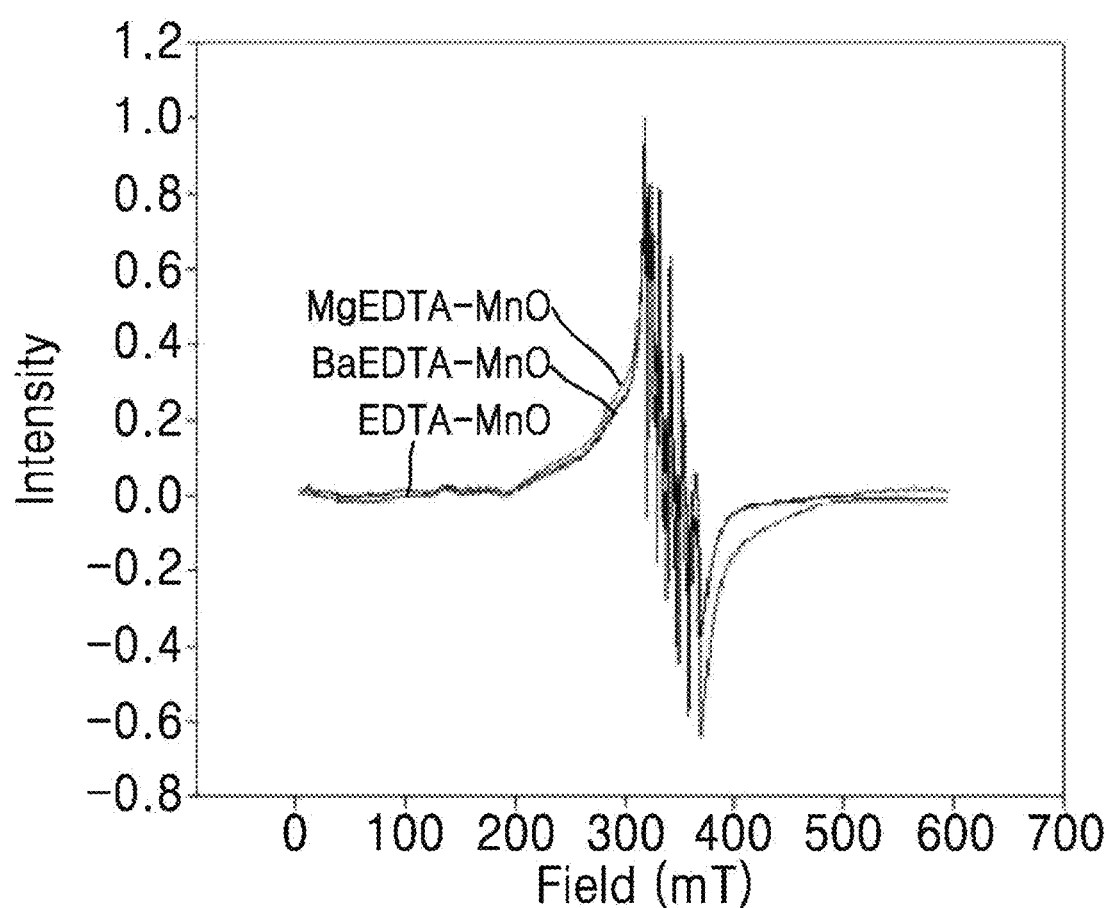

[FIG. 43b]
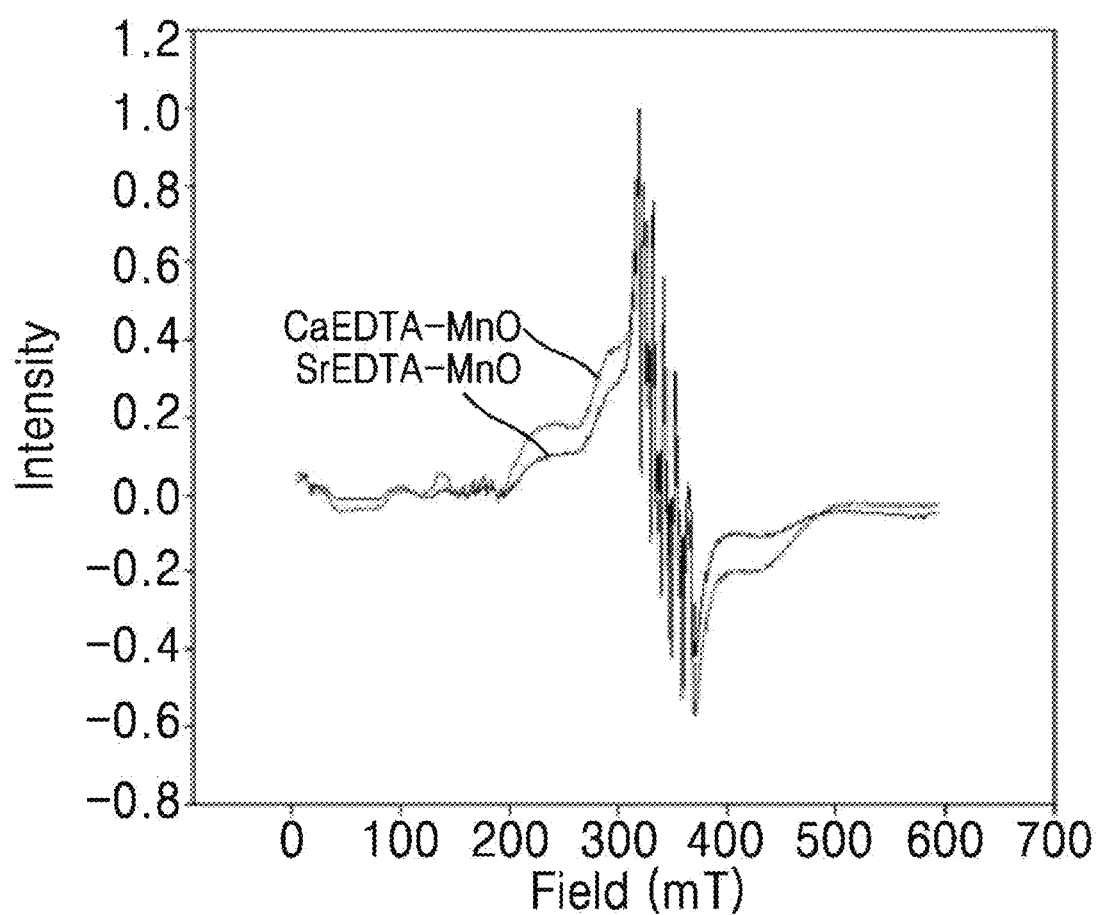

[FIG. 43c]
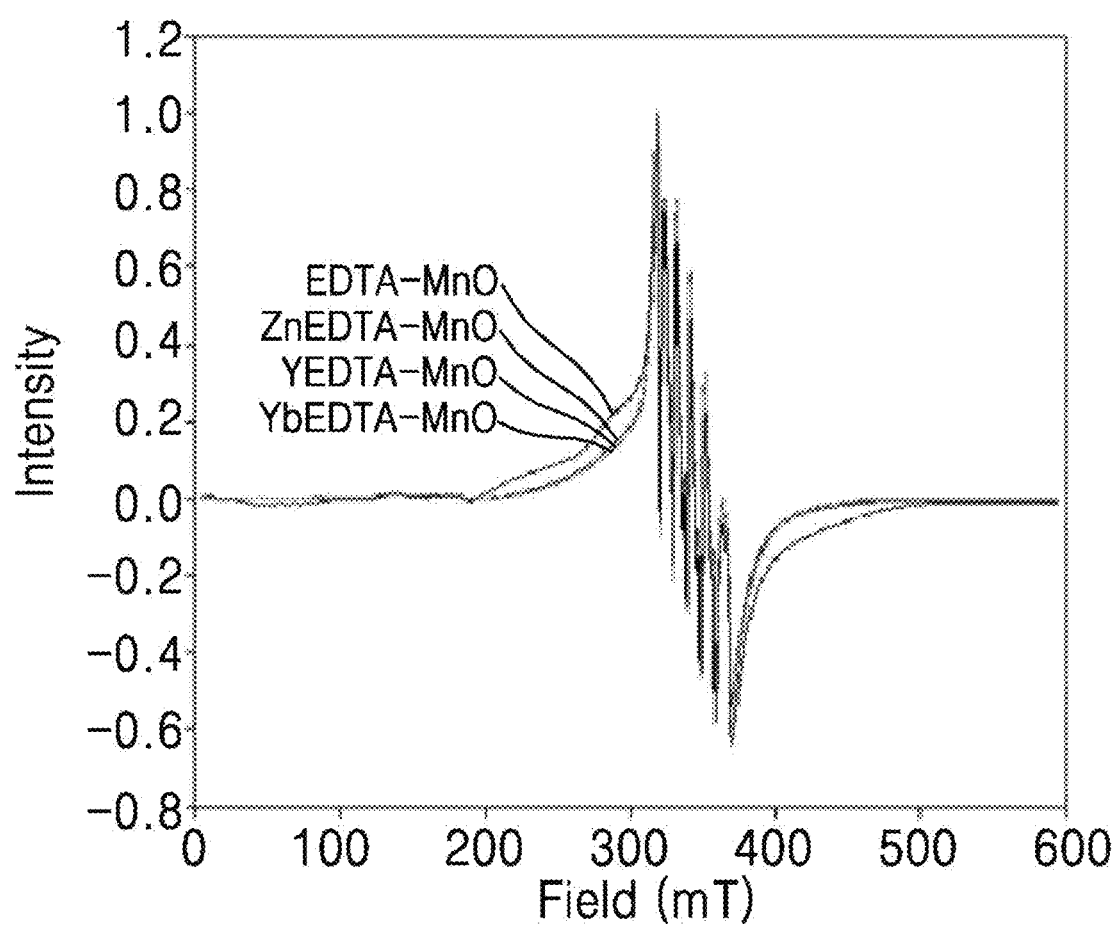

[FIG. 44a]
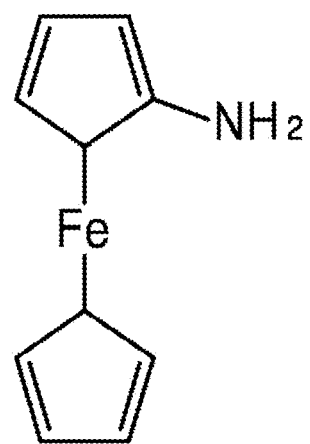

[FIG. 44b]
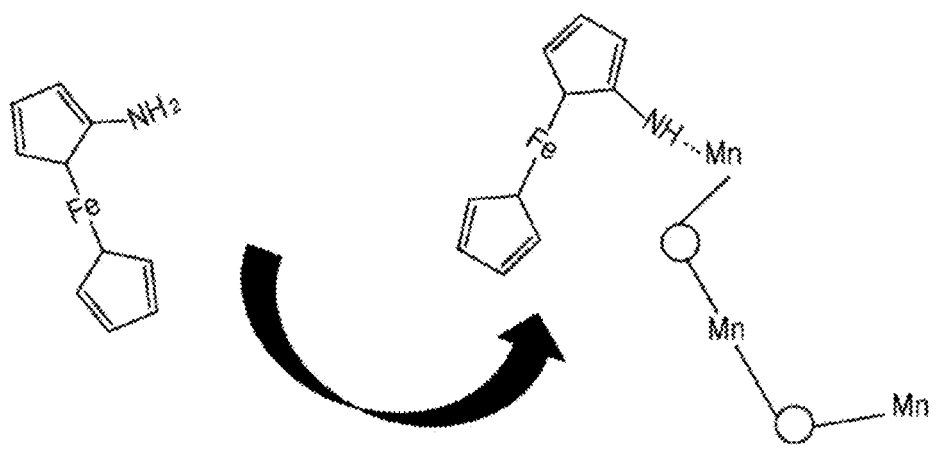

[FIG. 45]
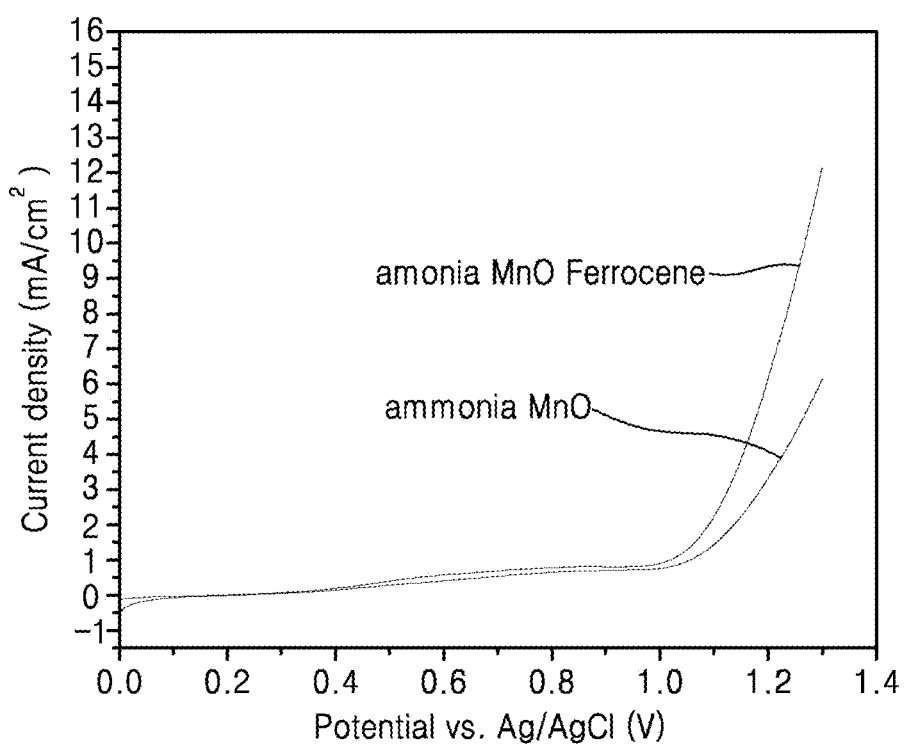

CATALYST AND MANUFACTURING METHOD THEREOF

TECHNICAL FIELD

The present invention relates to a catalyst and a manufacturing method thereof. More specifically, the present invention relates to a catalyst applicable to diverse electrochemical catalyst reactions such as water treatment reaction, an oxidation/reduction reaction, a hydrogen generation reaction, a $CO_2$ reduction reaction or the like, an electrode and an electrochemical reaction.

BACKGROUND ART

Recently, in order to solve environmental problems caused by the depletion of carbon-based energy and emissions from fuel gas, research into methods of saving energy by producing hydrogen and oxygen through water decomposition or obtaining energy through fuel cells has been actively undertaken. In the methods described above, an electrochemical reaction is used. In the cases of an oxygen evolution reaction using water decomposition and an oxygen reduction reaction using a fuel cell, since a reaction rate is slow, the reaction described above acts as a rate determining step. Thus, in order to increase an oxygen generation rate or an oxygen reduction rate, an electrocatalyst is required.

CONTENTS OF THE INVENTION

Problem to be Solved of the Invention

In case of a molecular catalysts, represented by a mononuclear ruthenium complex [Ru(bda) (isoq)$_2$] (H2bda=2,2'-bipyridine-6,6'-dicarboxylic acid; isoq=isoquinoline) reported by Sun group, it typically has disadvantages of low recycling ability, expensive price because of scarcity of noble metal components, and crucially low catalyst stability although it has advantages of excellent characteristics and high synthetic liberty. Also, most of molecular catalysts are hard to be used as a catalyst for an electrochemical reaction because of low workability due to difficulty of being coated on the electrode materials.

In case of a heterogeneous catalyst represented by Co-Pi reported by Nocera group, it has disadvantages of markedly low selectivity as a catalyst compared to a molecular-based catalyst and relatively low catalyst efficiency such as TOF while it has advantages of high stability and applicability in various chemical reactions.

Also, present industrial field uses noble metal-based catalysts such as Ru, Pt, Ir, or the like. an oxide catalyst based on noble metal shows good characteristic, but it forms expensive price because of their rarity. Thus, developing a catalyst manufactured by relatively inexpensive material is required.

The present invention has been made to solve the above-mentioned problems, and the present invention is intended to provide a catalyst having high stability, applicability in various chemical reactions, high catalyst efficiency and excellent economy, and a manufacturing method of the catalyst.

Also, the present invention is intended to provide a catalyst group introducing methodical theory of d-electron energy level control, and is intended to provide a catalyst accomplishing substantial elevation of catalyst activity though control of Oxygen-Oxygen (O—O) bonds during reactions and showing high selectivity at low temperature and reactivity, and a manufacturing method of the catalyst.

However, the above mentioned issues are just some examples and the scope of the present invention is not limited by it.

Means for Solving the Problem

According to an aspect of the present invention for solving the mentioned-above problem, a catalyst, in which a distance between a transition metal of a transition metal oxide nanoparticle and oxygen is controlled by substituting at least a part of surface of the transition metal oxide nanoparticle with an inclusion, is offered.

Also, according to an embodiment of the present invention, the transition metal is one of manganese (Mn), iron (Fe), cobalt (Co), nickel (Ni) and copper (Cu).

Also, according to an embodiment of the present invention, d-orbital of the transition metal may be in a state of low-spin.

Also, according to an embodiment of the present invention, the low-spin state may be $S=\frac{1}{2}$.

Also, according to an embodiment of the present invention, wherein the d-orbital manifold catalyst may form distortion of the transition metal oxide nanoparticle structure while bonding between the transition metal and the oxygen is changed from single bond to double bond.

Also, according to an embodiment of the present invention, wherein the d-orbital manifold catalyst may allow compression in the z-axis direction to take place with forming double bond between the transition metal and the oxygen.

Also, according to an embodiment of the present invention, The metal nanoparticle may comprise at least one of iridium (Ir), cobalt (Co), copper (Cu), nickel (Ni), iron (Fe), chromium (Cr), ruthenium (Ru), gold (Au), platinum (Pt), palladium (Pd), and rhodium (Rh).

Also, according to an embodiment of the present invention, the inclusion may be a ligand.

Also, according to an embodiment of the present invention, the ligand may be one of EDTA (Ethylene Diamine Tetra Acetic acid), ferrocene, ferrocene derivate, pyridine, pyridine derivate and imidazole.

Also, according to an embodiment of the present invention, while tetravalent manganese (Mn) may be located on a surface of the transition metal oxide, and manganese atom and oxygen atom may form double bond, wherein the manganese atom may indicate low-spin state.

Also, according to an embodiment of the present invention, the manganese atom may indicate low-spin state if bonding distance between the manganese atom and the oxygen atom is less than 2.2 Å.

And, according to an aspect of the present invention for solving the mentioned-above problem, manufacturing method of a catalyst, comprising (a) a step forming $M_1(OH)_x$ layer on a substrate; (b) a step coating a transition metal oxide nanoparticle on the $M_1(OH)_x$ layer; and (c) a step performing thermal treatment of the $M_1(OH)_x$ layer and the transition metal oxide nanoparticle, wherein $M_1$ comprises at least one of iridium (Ir), cobalt (Co), copper (Cu), nickel (Ni), iron (Fe), chromium (Cr), ruthenium (Ru), gold (Au), platinum (Pt), palladium (Pd), and rhodium (Rh), and wherein the transition metal oxide is an oxide of one of manganese (Mn), iron (Fe), cobalt (Co), nickel (Ni) and copper (Cu), is offered.

Also, according to an embodiment of the present invention, wherein in the (c) step, temperature of the thermal treatment may be 300° C. to 500° C. and time of the thermal treatment may be 30 min to 12 hr.

Effect of the Invention

According to an embodiment of the present invention consisting of the said mention, effects of high stability, applicability in various chemical reaction and economic feasibility exist.

And, according to an embodiment of the present invention, effects of providing a catalyst group introducing methodical theory of d-electron energy level control not implemented in existing catalysts, accomplishing substantial elevation of catalyst activity though control of oxygen-oxygen (O—O) bonds during reactions, and showing high selectivity at low temperature and reactivity exist.

However, the effects of the present invention are not limited to the above description.

DESCRIPTION OF DRAWINGS

FIG. 1 is a schematic diagram illustrating a manufacturing method of catalyst according to the first exemplary embodiment of the present invention.

FIG. 2a indicates a cross section TEM (Transmission electron microscopy) image of Ni $(OH)_x$.

FIG. 2b indicates a TEM image of monodisperse $Mn_3O_4$ having 10 nm a size according to an experimental example of the present invention.

FIG. 3b indicates a cross section HR-TEM image of Ni—$Mn_3O_4$/NiO from the bottom to the surface according to an experimental example of the present invention.

FIGS. 4a, 4b, 4c and 4d are graphs indicating EPR (Electron Paramagnetic Resonance) results according to an exemplary embodiment of the present invention.

FIG. 5 is a schematic diagram indicating that active sites of surface manganese are compressed in the Z-axis direction because of nickel substitution according to an exemplary embodiment of the present invention.

FIG. 6 is a graph indicating that a distance of manganese-oxygen axis is changed because of nickel substitution at active sites of $Mn_3O_4$ (001) surface according to an exemplary embodiment of the present invention.

FIG. 7 is a crystal-field diagram indicating spin state of Mn(IV) at compression in Z-axis direction according to an exemplary embodiment of the present invention.

FIG. 8 is a graph indicating relative energy about distances of manganese-oxygen axis according to an exemplary embodiment of the present invention.

FIG. 9 is a graph indicating catalyst characteristics of d-orbital manifold catalysts according to an exemplary embodiment of the present invention.

FIG. 10 is also a graph indicating catalyst characteristics of d-orbital manifold catalysts according to an exemplary embodiment of the present invention.

FIGS. 12a and 12b are TEM images of transition metal oxide according to an exemplary embodiment of the present invention.

FIG. 13 is a TEM image of transition metal oxide according to an exemplary embodiment of the present invention.

FIG. 14 is a TEM images of transition metal oxide according to an exemplary embodiment of the present invention.

FIG. 15 is a TEM images of transition metal oxide according to an exemplary embodiment of the present invention.

FIG. 16 is a TEM images of transition metal oxide according to an exemplary embodiment of the present invention.

FIG. 17 is a graph showing X-ray diffraction (XRD) results of manganese oxide according to an exemplary embodiment of the present invention.

FIG. 18 is a graph showing an X-ray diffraction (XRD) result of cobalt oxide according to an exemplary embodiment of the present invention.

FIG. 19 is a graph showing X-ray photoelectron spectroscopy (XPS) of manganese oxide according to an exemplary embodiment of the present invention.

FIG. 20 is a flow chart indicating a manufacturing process of nanostructure catalyst comprising a transition metal oxide according to an exemplary embodiment of the present invention.

FIG. 21 is a sketchy perspective view of a nanostructure comprising transition metal oxides according to an exemplary embodiment of the present invention.

FIGS. 22a and 22b are TEM images of nanostructures comprising manganese oxides according to an exemplary embodiment of the present invention.

FIGS. 23a, 23b, and 23c are TEM images of nanostructures comprising cobalt oxides according to an exemplary embodiment of the present invention.

FIG. 24 is a graph indicating catalyst characteristics of nanostructure comprising manganese oxides according to an exemplary embodiment of the present invention.

FIG. 25 is a graph indicating catalyst characteristics of nanostructure comprising manganese oxides according to an exemplary embodiment of the present invention.

FIG. 26 is a graph indicating catalyst characteristic of nanostructures comprising transition metal oxides according to exemplary embodiments of the present invention.

FIG. 27 is a schematic diagram of water decomposition system comprising a catalyst according to the second exemplary embodiment of the present invention.

FIG. 28 is a schematic diagram of fuel cell system comprising a catalyst according to the second exemplary embodiment of the present invention.

FIG. 29 is a schematic diagram indicating coating of metal oxide nanoparticles on a conductive substrate according to an exemplary embodiment of the present invention.

FIG. 30 is a graph indicating catalyst characteristics of metal oxide nanoparticle layers according to exemplary embodiments of the present invention.

FIG. 31 is a schematic diagram of another exemplary embodiment applying a d-orbital manifold catalyst of the present invention to a chlorine generation electrochemical reaction.

FIG. 32 is a flow chart indicating a manufacturing process of catalyst according to the third exemplary embodiment.

FIG. 33 is a schematic diagram indicating a manufacturing process of catalyst according to the third exemplary embodiment.

FIG. 34 indicates a structural formula of ligand according to an exemplary embodiment of the present invention.

FIG. 35 is a graph indicating XRD (X-ray Diffraction) results of catalysts according to experimental examples of the present invention.

FIG. 36 is a graph indicating XANES (X-ray Absorption Near Edge Structure) results of catalysts according to experimental examples of the present invention.

FIG. 37 is a TEM (Transmission Electron Microscopy) pictures indicating catalyst according to an experimental example of the present invention.

FIG. 38 is a graph indicating a SEM EDS (Scanning Electron Microscopy Energy Dispersive Spectroscopy) result of catalyst according to an experimental example of the present invention.

FIGS. 39a, 39b, and 39c are graphs indicating EPR (Electron Paramagnetic Resonance) results according to various experimental examples in the present invention.

FIGS. 40a and 40b are graphs indicating EPR (Electron Paramagnetic Resonance) results through adjustment of metal cation according to various experimental examples in the present invention.

FIGS. 41A and 41B are graphs indicating catalyst characteristics according to various experimental examples in the present invention.

FIGS. 42a, 42b and 42c are graphs indicating catalyst characteristics by experimental examples applying various metal cations of the present invention.

FIGS. 43a, 43b and 43c are graphs indicating EPR (Electron Paramagnetic Resonance) results according to experimental examples applying various metal cations of the present invention.

FIGS. 44a and 44b indicate structural formulas and bonding relationships of ligand according to another example of the present invention.

FIG. 45 is a graph indicating catalyst characteristics according to other examples of the present invention.

BEST MODE FOR INVENTION

Figure 3A:
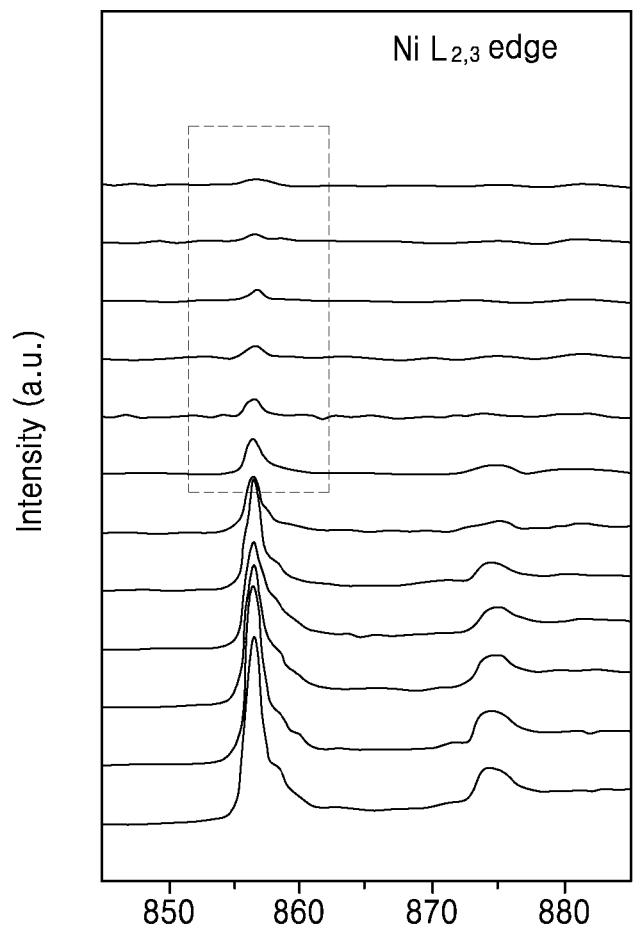
FIG. 3a indicates a HR-TEM(High-resolution transmission electron microscopy) EELS(Electron Energy Loss Spectroscopy) Ni L-edge spectrum of Ni—$Mn_3O_4$/NiO from the bottom to the surface.

The detailed description for the present invention, hereafter to say, refers to accompanying drawing in which specific exemplary embodiments capable of realizing the present invention are drawn as examples. The exemplary embodiments are described enough to enable the skilled person in the art to implement the present invention. Various exemplary embodiments of the present invention are different, but no mutually exclusive need should be understood. For example, specific shape, structure and characteristic recited herein may implement other examples related to an exemplary embodiment not getting out of the idea and scope of the present invention. Also, the fact that position or arrangement of individual constitutions in the each exemplary embodiments disclosed is changed without getting out of the idea and scope of the present invention is understood. Thus, the detailed description for the present invention, hereafter to say, does exist not for limiting the idea and scope of the present invention, and the scope of the present invention could only be limited by claims attached together with all the scope of equivalents to insistence in the present claims attached. Similar referring marks in the drawings indicate same or similar functions over many respects and the length, area, thick, and the shape may be exaggerated for clarity of description.

Hereinafter, preferred exemplary embodiments of the present invention are described with referring to the drawings attached so that the skilled person in the art can implement the present invention easily.

D-Orbital Manifold Catalyst

Most enzymes existing in body retain highly rapid and high substrate selectivity and products selectivity. In detail, active sites of biocatalysts have transition metal atom of two or more, specifically, conformation in which multimer is coordinated by a ligand. enzyme are known as elevating reaction speed and selectivity by easily stabilizing intermediate necessary for a specific chemical reaction through cooperation work of multiple atoms (meta-disorder state).

However, biocatalysts are difficult to apply practical industrial field because it has stability during only a short period of time. Thus, the present invention is intended to propose new concept catalyst having high selectivity and stability by imitating biotic enzymes capable of establishing catalyst works of high selectivity.

The present invention is characterized by inducing energy level of a d-orbital manifold of transition mental to "meta-disorder" state through interaction with intermediate products, and doping of surrounding and surface control. "a d-orbital manifold catalyst" of the present invention may be understood as a catalyst in which meta-disorder state is realized and distortion of surface particle structure is formed. More specifically, "a d-orbital manifold catalyst" may be understood as a catalyst controlling that d-orbital having high-spin state at stable state is changed to stable state of low-spin, or d-orbital having low-spin state at stable state is changed to d-orbital having stable state of high-spin.

In this case, changed d-orbital state may exist as an intermedia of specific electrochemical reaction, or may act as elevating catalyst activity by existing on surface of a synthesized d-orbital manifold catalyst without whether to perform electrochemical reactions or not.

A d-orbital manifold catalyst may be a conformation in which at least a part of surface of transition metal oxide nanoparticle is substituted with an inclusion. Hereat, the term "inclusion" may be understood as a meaning of a metal nanoparticle, a ligand, a cluster or the like, and materials deforming a particle structure by trespassing the particle structure of transition metal oxide nanoparticle. Hereat, it is desirable that the said metal nanoparticle, ligand, cluster are implemented differently from the said transition metal oxide nanoparticle.

Hereinafter, implementing d-orbital manifold catalysts with various ways such as a metal nanoparticle, a ligand, a cluster or the like are explained.

1. A D-Orbital Manifold Catalyst Applying to Diffusion of Dissimilar Metal (The First Exemplary Embodiment)

FIG. 1 is a schematic diagram illustrating a manufacturing method of catalyst according to an exemplary embodiment of the present invention.

The d-orbital manifold catalyst according to an exemplary embodiment of the present invention in characterized that a distance between a transition metal of a transition metal oxide nanoparticle and oxygen is controlled by substituting at least a part of surface of the transition metal oxide nanoparticle with an inclusion.

And, a manufacturing method of the d-orbital manifold catalyst according to an exemplary embodiment of the present invention is characterized by comprising (a) a step forming $M_1(OH)_x$ layer 200 on a substrate 100; (b) a step coating a transition metal oxide nanoparticle 300 on the $M_1(OH)_x$ layer 200; and (c) a step performing thermal treatment of the $M_1(OH)_x$ layer and the transition metal oxide nanoparticle. In an exemplary embodiment, wherein $M_1$ comprises at least one of iridium (Ir), cobalt (Co), copper (Cu), nickel (Ni), iron (Fe), chromium (Cr), ruthenium (Ru), gold (Au), platinum (Pt), palladium (Pd), and rhodium (Rh), and wherein the transition metal oxide may be an oxide of one of manganese (Mn), iron (Fe), cobalt (Co), nickel (Ni) and copper (Cu), is offered.

Referring to FIG. 1(a), a substrate 100 is prepared. The substrate 100 may have conductive quality such that it can use an electrode in an electrochemical reaction system. For example, a FTO (Fluorine doped Tin Oxide) glass substrate may be used.

In the next, referring to FIG. 1(b), a $M_1(OH)_x$ layer 200 may be formed on the substrate 100. As an embodiment, the $M_1(OH)_x$ layer 200 is formed by using electrodeposition method with approximately 300 nm thickness and voltage in the range of −0.5V to −2.0V is added according to the type of a dissimilar metal. $M_1(OH)_x$ layer 200 may have a role of a matrix offering a dissimilar metal to a transition metal oxide nanoparticle.

The $M_1$ may comprise at least one of iridium (Ir), cobalt (Co), copper (Cu), nickel (Ni), iron (Fe), chromium (Cr), ruthenium (Ru), gold (Au), platinum (Pt), palladium (Pd), and rhodium (Rh). The $M_1$ may act as an inclusion substituting apart of surface of a transition metal oxide nanoparticle by thermal treatment performed afterward.

In the next, referring to FIG. 1(c), a transition metal oxide nanoparticle 300 may be coated on the $M_1(OH)_x$ layer 200. The transition metal oxide may be an oxide of one of manganese (Mn), iron (Fe), cobalt (Co), nickel (Ni) and copper (Cu). The transition metal oxide nanoparticle may have a size smaller than monodisperse 10 nm and synthesized by pyrolysis method. Also, it maybe manufactured by a manufacturing method of transition metal oxide nanoparticle after-mentioned. The transition metal oxide nanoparticle 300 may be formed on the $M_1(OH)_x$ layer 200 with forming a thin layer by spin coating method.

In the next, the $M_1(OH)_x$ layer 200 and the transition metal oxide nanoparticle 300 may be thermally treated. The thermal treatment may be performed at a temperature of 300° C. to 500° C. during 30 min to 12 hr.

By the thermal treatment, $M_1$ metal in the $M_1(OH)_x$ layer 200 may be diffused into the agglomerated transition metal oxide nanoparticle 300. And, uniform distribution from $M_1(OH)_x$ layer 200 to a surface of the transition metal oxide nanoparticle 300 [or, a thin layer of the transition metal oxide nanoparticle 300] is accomplished. Thus, $M_1$ metal decorated-transition metal oxide nanoparticle is formed.

On the other hand, a ligand may be used as an inclusion of transition metal oxide nanoparticle instead of metal particle. In the case, the ligand may be one of EDTA (Ethylene Diamine Tetra Acetic acid), ferrocene, ferrocene derivate, pyridine, pyridine derivate and imidazole.

FIG. 2a indicates a cross section TEM (Transmission electron microscopy) image of $Ni(OH)_x$, FIG. 2b indicates a TEM image of monodisperse $Mn_3O_4$ having 10 nm size according to an experimental example of the present invention.

The present experimental example is forming $Ni(OH)_x$ layer 200 as $M_1(OH)_x$ layer 200, and coating a $Mn_3O_4$ nanoparticle 300 as the transition metal oxide nanoparticle on the $Ni(OH)_x$ layer 200. And, the present experimental example is performing thermal treatment at 573K during 5 hr and diffusing Ni which is a dissimilar metal inclusion into $Mn_3O_4$ nanoparticle. Ni—$Mn_3O_4$/NiO structure is implemented after thermal treatment.

Referring to FIG. 2a, it can be confirmed that $Ni(OH)_x$ layer 200 has a thickness of approximately 300 nm and it is formed like matrix. Referring to FIG. 2b, it can be confirmed that the $Mn_3O_4$ nanoparticle having a size smaller than monodisperse 10 nm is arranged. And it can be confirmed that a shape and size of the nanoparticle is maintained after thermal treatment.

FIG. 3a indicates an HR-TEM(High-resolution transmission electron microscopy) EELS (Electron Energy Loss Spectroscopy) Ni L-edge spectrum of Ni—$Mn_3O_4$/NiO from the bottom to the surface, and FIG. 3b indicates a cross section HR-TEM image of Ni—$Mn_3O_4$/NiO from the bottom to the surface according to an experimental example of the present invention. A spot size of EELS spectrum is 10 nm, and the cross mark in (b) corresponds to EELS spectrum.

As a result of spectroscopic analysis using EELS line scan method, Ni species are diffused into the agglomerated transition metal oxide nanoparticle, and it can be confirmed that uniform distribution from inside to surface is accomplished.

Controlling of D-Orbital Characteristic of a Catalyst and Implementing Low-Spin

FIG. 4 is graphs indicating results of EPR (Electron Paramagnetic Resonance) according to an experimental example of the present invention. FIG. 4a,c are spectra of CW-EPR(continuous-wave EPF) at perpendicular mode, b,d are spectra of CW-EPR(continuous-wave EPF) at parallel mode.

In order to exam oxidation number variation of Ni—$Mn_3O_4$/NiO during catalyst reaction process, EPRs are measured by applying voltage differently. Ni—$Mn_3O_4$/NiO indicates a conformation of high-spin Mn(II)/Mn(III) at an initial state. Mn(II) spectrum shows $g_{eff}$~2.0 at a perpendicular mode and Mn(III) shows $g_{eff}$~8.0 at a parallel mode.

As applied potentials increased, intensity of Mn(II) signals is gradually diminished whereas that of Mn(III) increased. The results are consistent with the oxidation-reduction behavior of Ni—$Mn_3O_4$/NiO. Extraordinary spectral behaviors were observed when potentials higher than 1.1V vs. NHE potentials are applied. As drawn by FIG. 4a, the EPR signals at around $g_{eff}$~1.85 are newly generated in perpendicular mode and continuously evolved as more voltage is applied. On the contrary, Mn(III) features keep decreased [referring to FIG. 4(b)]. In the previous research, $g_{eff}$~1.85 centered Mn signal has never been reported in Mn related EPR spectra To analyze the detailed magnetic properties, spectral simulations are performed. Firstly, regarding parallel mode EPR spectra, both Mn signal at initial and during OER catalysis state can be explained with high spin Mn(III), d4, S=2 species. The only marginal difference in hyperfine splitting was observed (See supporting information).

Next, perpendicular mode EPR spectra of the initial state Ni—$Mn_3O_4$/NiO is well described by a characteristic S=5/2, high spin Mn(II) species with six-line hyperfine splittings at g~2. Under the expectation that the six-line new signal at g~1.85 comes from low spin S=1/2 Mn(IV) as suggested above, spectra simulation was conducted. A simulation of the EPR spectrum with g=[1.85, 1.84, 1.82], A=[121, 124, 128] G showed very good agreement with the experimental result.

FIG. c,d indicate EPR experimental value (solid line) and simulation value (dot line) on the state in case of initial state and state applying 1.3V. It may be confirmed that the experimental value is fully consistent with the simulation value.

the observed EPR spectrum centered at $g_{eff}$~1.85 has two distinct spectral features; i) Negatively shifted $g_{eff}$ value and ii) Large hyperfine splitting (A) values. The deviation of g-values from $g_e$ is originated from the orbital mixing and its strong spin-orbit coupling phenomena. As above mentioned, the g-tensor of [1.85, 1.84, 1.82] was obtained from the spectra simulation. Before rate-determining step (RDS) of catalyst reaction, one electron and one proton involved proton concerted electron transfer pathway occurs and thus the formation of the Mn(IV)=O or Mn(IV)-OH species from the oxidation of Mn(III)-OH are expected.

Along with consideration of a minute difference between g1 and g2, the possibility of a broken four-fold symmetry ($C_{4v}$) of Mn(IV) center within the Ni—Mn$_3$O$_4$/NiO intermediate was taken into account for the calculation.

As mentioned above, the prevent invention may find forming manganese material having a changed magnetic property as to voltage applied at d-orbital manifold catalyst, and having low-spin property when voltage is applied over specific voltage. Hereinafter, a process of implementing low-spin is further described.

FIG. 5 is a schematic diagram indicating that active sites of surface manganese are compressed in the Z-axis direction because of nickel substitution according to an exemplary embodiment of the present invention. FIG. 6 a graph indicating that a distance of manganese-oxygen axis is changed because of nickel substitution at active sites of Mn$_3$O$_4$ (001) surface according to an exemplary embodiment of the present invention.

First-principle density functional theory (DFT) study clearly favor the low spin state in Mn(IV)=O configuration. Replacing of the single bond (M—O) in ML6 octahedral geometry into double bond (M=O) configuration makes shorten the bonding distance that destabilizes the $a_1(dz_2)$ and $e(d_{xz}, d_{yz})$ orbital and distorts local octahedral geometry.

From the DFT study, we evaluate whether the energy gap between respective d-orbital becomes dominant over counteractive spin pairing energy in Ni—Mn$_3$O$_4$/NiO structure.

We speculate that the truncated MnO$_6$ active site at Mn$_3$O$_4$ (001) surface (surface pyramid in FIG. 5) would undergo structural isotropization by reduction of Mn—O axial distance ($d_{Mn-O}$(axial)) in the z-axis (z-compression). FIG. 6 indicates Mn—O axial distance ($d_{Mn-O}$(axial)) in z-axis in terms of substitution position and the number of Ni atoms.

FIG. 7 is a crystal-field diagram indicating spin state of Mn(IV) at compression in Z-axis direction according to an exemplary embodiment of the present invention.

During water oxidation catalysis, the Mn active site would possibly have =O or —OH binding moieties as reaction intermediates. Based on the electrochemical data and above described spectroscopic evidences, Mn(IV)=O or Mn(IV)-OH are postulated as candidate species. In simplified view based on crystal field theory, it is expected that the strong double bond single oxygen binding (=O) case has a more strong destabilization effect for the anti-bonding molecular orbitals related with z-axis ($a_1(z^2)\sigma^*$, and $e(xz, yz)\pi^*$) by reducing dMn-O(axial) compared to the weak —OH binding case. Thus, the larger destabilization of $e(xz,yz)\pi^*$ orbital (more energy gap $\Delta$ in FIG. 7) makes the more chance to have low spin state of Mn(IV) active center by z-compression. we figured out the relative stabilities between high and low spin state of Mn(IV) active site with respect to the binding species and $d_{Mn-O}$(axial).

FIG. 8 is a graph indicating relative energy about distance of manganese-oxygen axis according to an exemplary embodiment of the present invention.

The $M_n$(IV)=O model shows transition from high spin (S=3/2) to low spin (S=1/2) in case where $d_{Mn-O}$(axial) is less than 2.2 Å. Namely, the z-compressed geometry of $M_n$ active site by surrounding Ni substitution is the origin of distinctive low spin Mn(IV)=O state by maximally destabilizing anti-bonding molecular orbitals comprising z-axis components.

Namely, referring to FIG. 5 to FIG. 8, it may find that, in case where a part of the transition metal oxide nanoparticle surface is substituted with an inclusion of hetero-materials, generally stable d-orbital at high-spin state may be controlled to be changed to low-spin state through change of electron arrange.

Catalyst Characteristic of a D-Orbital Manifold Catalyst

FIG. 9 and FIG. 10 are graphs indicating catalyst characteristic of d-orbital manifold catalysts according to an exemplary embodiment of the present invention.

Hereinafter, catalyst characteristics are performed by coating a d-orbital manifold catalyst manufactured by manufacturing process of FIG. 1 on a conductive substrate or an electrode, followed by measuring electrochemical property thereof.

The electrochemical property may be measured by using 3-electrode-cell or 2-electrode-cell filled with buffer electrolyte aqueous solution. Specifically, 3-electrode-cell may consist of working electrode coated with a catalyst, counter electrode consisting of Pt wire or Pt plate and reference electrode of Ag/AgCl, and 2-electrode-cell may consist of working electrode and counter electrode without reference electrode. The buffer electrolyte aqueous solution may be used such as sodium phosphate solution of pH 5 to 8, potassium phosphate solution of pH 5 to 8, or NaOH of pH 11 to 14, KOH of pH 11 to 14

Referring to FIG. 9, cyclic voltammogram of a case using a d-orbital manifold catalyst according to an exemplary embodiment is indicated compared to NHE (Normal Hydrogen Electrode).

Catalyst characteristic is indicated in FIG. 9 by using compared examples of partially oxidized MnO, Mn$_3$O$_4$, nanoparticle, NiOx film, Co-Pi film. Mn$_3$O$_4$—NiO of the present invention shows the most excellent catalyst characteristic and it is better than that of partially oxidized MnO.

A graph inserted in FIG. 9 indicates results of Tafel slopes. The Tefel slopes are a standard of electrode activity and indicate necessary voltage for increasing current by a factor of ten. In case of the present exemplary embodiment, the Tafel slopes indicating an electrochemical reaction speed are obtained as 69 mV/decade. This is lower value than other transition metal catalysts and it is found that a d-orbital manifold catalyst of the present invention has a high activity. For example, it is found that current density of a d-orbital manifold catalyst is above 3 times compared to that of other transition metal catalysts when applying 1.3 V.

FIG. 10 indicates an impedance measurement result of a d-orbital manifold catalyst according to an exemplary embodiment, and impedance measurement results of Mn$_3$O$_4$ nanoparticle and NiOx film catalyst according to compared examples. It may be found that Mn$_3$O$_4$—NiO of the present invention shows the lowest impedance because it has a semicircle feature of small diameter.

Referring to FIG. 9 and FIG. 10, a d-orbital manifold catalyst according to an exemplary embodiment indicates excellent electrochemical catalyst performance compared to metal solution existing transition metal catalysts.

2. A D-Orbital Manifold Catalyst Applying Aging of a Dissimilar Metal Solution (The Second Exemplary Embodiment)

Hereinafter, a d-orbital manifold catalyst according to the second exemplary embodiment is described. The catalyst may be a conformation of nanostructure comprising transition metal oxide. A transition metal oxide may be immersed in a solution containing a dissimilar metal followed by aged such that at least a part of surface of the transition metal oxide can be substituted with a dissimilar metal inclusion.

Before describing the catalyst of nanostructure conformation comprising the transition metal oxide, the transition metal oxide is examined.

Figure 11:
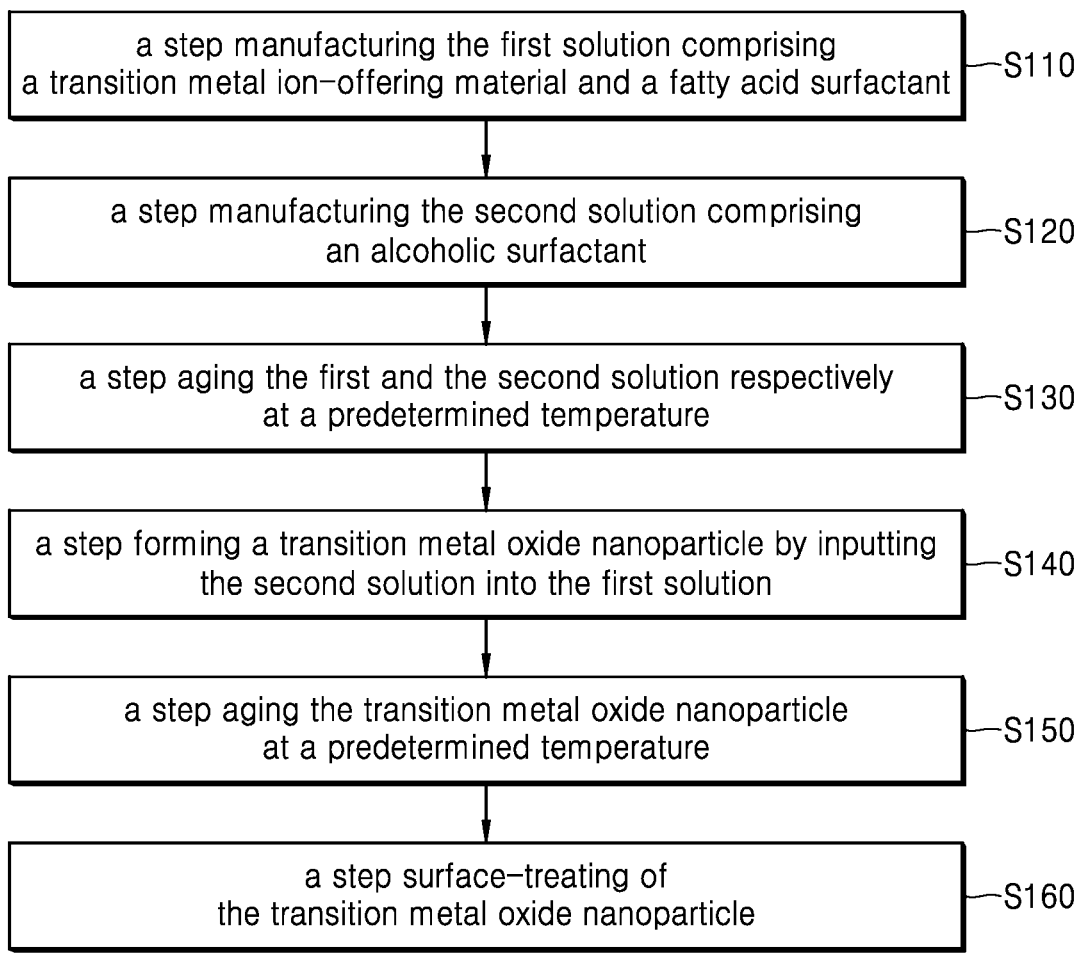
FIG. 11 is a flow chart indicating a manufacturing process of transition metal oxide nanoparticle according to an exemplary embodiment of the present invention.

A Manufacturing of a Transition Metal Oxide and a Transition Metal Oxide Nanoparticle FIG. 11 is a flow chart indicating a manufacturing process of transition metal oxide nanoparticle according to an exemplary embodiment of the present invention.

Referring to FIG. 11, a manufacturing method of transition metal oxide nanoparticle according to an exemplary embodiment of the present invention may comprise a step S110 manufacturing the first solution comprising a transition metal ion-offering material and a fatty acid surfactant, a step S120 manufacturing the second solution comprising an alcoholic surfactant, a step S130 aging the first and the second solution respectively at a predetermined temperature, a step S140 forming a transition metal oxide nanoparticle by inputting the second solution into the first solution and a step S150 aging the transition metal oxide nanoparticle at a predetermined temperature. Also, the manufacturing method of a transition metal oxide nanoparticle according to an exemplary embodiment of the present invention may further comprise a step S160 surface-treating of the transition metal oxide nanoparticle.

The transition metal may one of Mn, Co, Ni, Cu, and Fe.

The transition metal ion-offering material and the fatty acid surfactant at the step S110 manufacturing the first solution comprising a transition metal ion-offering material and a fatty acid surfactant are mixed with an organic solvent and the first solution is made thereby. The fatty acid surfactant may help dissolution of a transition metal ion-offering material and dispersion of the transition metal oxide nanoparticle formed at the following step S140.

The fatty acid surfactant may be, for example, a myristic acid, stearic acid, oleic acid and so on, and be a state of solution having concentration of 0.1M to 0.5M. The transition metal ion-offering material may be transition metal acetate and, for example, the transition metal ion-offering material may offer a manganese ion by using manganese acetate and cobalt ion by using cobalt acetate. The first solution may be a cation solution and concentration of the cation solution may be a 0.5 mM to 2 mM.

The alcoholic surfactant at the step S120 manufacturing the second solution comprising an alcoholic surfactant may be, for example, decanol, myristyl alcohol, stearyl alcohol or the like, and it is mixed with an organic solvent and the second solution is made thereby. The alcoholic surfactant may get involve in nuclear generation and nuclear growth. The organic solvent at the steps S110 and S120 may be octadecene and hexadecylamine.

The step aging the first and the second solution respectively at a predetermined temperature S130 may be performed in a temperature of 250° C. to 300° C. respectively and temperature during aging period may be maintained constantly. The aging time may be, for example, inside and outside of 1 hr respectively.

The transition metal nanoparticle may be formed by hot injection and thermal treatment at the step S140 forming a transition metal oxide nanoparticle by inputting the second solution into the first solution. The step 140 maybe performed in a temperature of 250° C. to 300° C.

The step S150 aging the transition metal oxide nanoparticle at a predetermined temperature may be performed during 1 min to 24 hr after inputting the second solution and a size of the manufactured transition metal oxide nanoparticle may be controlled by adjusting the aging time. The size of the transition metal oxide nanoparticle may be, for example, 1 nm to 100 nm. In an exemplary embodiment, the size of the transition metal oxide nanoparticle may be determined by a ratio of the transition metal ion-offering material and the fatty acid surfactant, and the ratio may be, for example, in the range of 1:2 to 1:6. The lower the ratio the fatty acid surfactant, the smaller the size of transition metal oxide nanoparticle may be.

The step S160 surface-treating of the transition metal oxide nanoparticle may be a step for eliminating a ligand of a surface of the transition metal oxide nanoparticle. The ligand may need to eliminate in order to use nanostructure catalyst comprising the transition metal oxide nanoparticle because the ligand is formed in such a way that a fatty acid surfactant is absorbed on a surface of a transition metal oxide nanoparticle and conductive property is declined. The step S160 may be performed by immersing the manufactured transition oxide metal nanoparticle in a base solution such as $NH_4OH$, NaOH. Also, the step S160 may be performed by thermal treatment. Particularly, a surface of a transition metal oxide nanoparticle may be partially oxidized by the step S160 and the transition metal oxide nanoparticle may comprise a trivalent transition metal [Mn(III), Co(III), Ni(III), Cu(III), Fe(III)] thereby.

The transition metal oxide manufactured by the exemplary embodiment may have a non-stoichiometric composition, and is represented by Chemical formula (1):

$A_{1-\delta}O$            Chemical formula (1)

where A is a transition metal and is one of Mn, Co, Ni, Cu, Fe, and $\delta$ satisfies $0<\delta<0.5$.

In the present specification, the non-stoichiometric composition may be understood as a meaning excluding thermodynamically stable quantitative relationship between transition metal and oxygen in a compound composed of transition metal and oxygen. For one example, a stoichiometric manganese oxide may comprise MnO, $Mn_3O_4$, $Mn_2O_3$, and $MnO_2$. For another example, a stoichiometric cobalt oxide may comprise CoO, $Co_3O_4$, $Co_2O_3$ and $CoO_2$. Thus, the transition metal oxide, specifically, maybe a composition except for the case in which $\delta$ is 0.25 and 1/3. In other words, $\delta$ may satisfy the range of $0<\delta<0.25$, $0.25<\delta<1/3$, and $1/3<\delta<0.5$.

The transition metal oxide may comprise a trivalent transition metal (as examples, trivalent Mn(III), trivalent Co(III) and so one) and the trivalent transition metal may be located on a surface of the transition metal oxide. The trivalent transition metal located on the surface of the transition metal oxide may be in a thermodynamically unstable state. In addition, the trivalent transition metal located on the surface of the transition metal oxide may have the form of a type of defect not located inside a lattice structure. All of trivalent transition metal and divalent transition metal may be located on the surface of the transition metal oxide.

In the case of an exemplary embodiment illustrated in FIG. 11, a method of preparing the transition metal oxide as nanoparticle is illustrated, but the present invention is not limited thereto. For example, the transition metal oxide may be prepared to have the form of a thin film. In this case, transition metal oxide maybe prepared using a method of coating a transition metal oxide nanoparticle described above, a deposition method such as electrodeposition or sputtering, or the like.

Structure of Transition Metal Oxide Nanoparticle and Composition Analysis Thereof FIGS. 12 to 16 are TEM images of transition metal oxide according to exemplary embodiments of the present invention. FIG. 12 indicates an image of Mn-Oxide, FIG. 13 indicates an image of Co-Oxide, FIG. 14 indicates an image of Ni-Oxide, FIG. 15 indicates an image of Cu-Oxide, FIG. 16 indicates an image of Fe-Oxide.

With reference to FIGS. 12 to 16, the transition metal oxide nanoparticle, having been prepared in S110 to S160 of an exemplary embodiment illustrated in FIG. 11, is analyzed by a transmission electron microscope (TEM).

According to FIG. 12(a), the manganese oxide nanoparticle has a size of 10 nm or less. In addition, according to a diffraction pattern analysis result of TEM, a (200) plane and a (111) plane, a crystal plane of manganese oxide having a composition of MnO, may be indexed.

The transition metal oxide nanoparticle used for analysis is treated with ammonia water ($NH_4OH$) for 1 hour in S160. Referring to FIGS. 12 to 16, the transition metal oxide nanoparticle may have a size of 10 nm or less and, for example, a manganese oxide nanoparticle may have a size of 10 nm or less, a cobalt oxide nanoparticle may have a size of 20 nm or less, a nickel oxide nanoparticle and ferrous oxide nanoparticle may have a size of 10 nm or less, copper oxide nanoparticle may have a size of 100 nm or less. Also, according to a diffraction pattern analysis, a crystal plane of transition metal oxide having a composition of $A_3O_4$ (A is a transition metal, and is one of Mn, Co, Ni, Cu Fe) may be indexed together with a crystal plane of transition metal oxide having a composition of AO. For example, a (10-1) plane and a (-112) plane which are a crystal plane of manganese oxide having a composition of $Mn_3O_4$ may be indexed together with a (200) plane and a (111) plane which is a crystal plane of manganese oxide having a composition of MnO. Thus, it is confirmed that, in S160, a surface of the transition metal oxide nanoparticle having been prepared is partially oxidized.

FIG. 17 is a graph illustrating an X-ray diffraction (XRD) result of manganese oxide according to an exemplary embodiment.

With reference to FIG. 17, crystal structure analysis results of manganese oxide nanoparticle(the 2-1 exemplary embodiment) manufactured by S110 to S150 illustrated in FIG. 11, and crystal structure analysis results of manganese oxide nanoparticle (the 2-2 and 2-3 exemplary embodiments) manufactured by S110 to S160 illustrated in FIG. 11 are shown. In the case of the 2-2 exemplary embodiment, a treatment in S160 was performed using ammonia water ($NH_4OH$) for 1 hour. In the case of the third exemplary embodiment, a treatment in S160 was performed using ammonia water ($NH_4OH$) for 24 hours.

The manganese oxide nanoparticle according to the 2-1 exemplary embodiment has a composition of MnO having a rock salt structure, and thus, signals of a (111) plane, a (200) plane, and a (220) plane of MnO may be shown. The manganese oxide nanoparticle according to the 2-3 exemplary embodiment has a composition of $Mn_3O_4$ having a spinel structure or a composition similar thereto, and thus, signals of a (211) plane and a (103) plane of $Mn_3O_4$ maybe shown. In the case of the second exemplary embodiment, a surface of manganese oxide nanoparticle is partially oxidized. Thus, all signals of a (111) plane, a (200) plane, and a (220) plane of MnO, in addition to a (211) plane and a (103) plane of $Mn_3O_4$ are shown, and a level of a signal of the (200) plane of MnO may appear to be lower than that according to the 2-1 exemplary embodiment FIG. 18 is a graph illustrating an X-ray diffraction (XRD) result of cobalt oxide according to an exemplary embodiment.

With reference to FIG. 18, crystal structure analysis results of cobalt oxide nanoparticle manufactured by S110 to S160 illustrated in FIG. 11, and cobalt oxide nanoparticle has CoO, and thus, signals of a (111) plane(36°), a (200) plane) (42°), and a (220) plane) (62°) of CoO may be shown.

FIG. 19 is a graph illustrating an analysis result of X-ray photoelectron spectroscopy (XPS) of manganese oxide according to an exemplary embodiment.

With reference to FIG. 19, in a manner similar to FIG. 17, composition analysis results of manganese oxide nanoparticles according to the 2-1 to 2-3 exemplary embodiments are shown. When the 2-1 exemplary embodiment is compared to the 2-3 exemplary embodiment, it is confirmed that binding energy of manganese 2p orbital is increased by about 1.05 eV. In this regard, like the 2-3 exemplary embodiment, in case of S160 is performed and a surface of a manganese oxide nanoparticle is partially oxidized, it is confirmed that trivalent manganese (Mn(III)) is formed. Thus, it is confirmed that manganese oxide nanoparticle according to the 2-3 exemplary embodiment has all of divalent manganese (Mn(II)) and trivalent manganese (Mn (III)) formed on a surface thereof.

In addition, through an X-ray absorption near-edge structure (XANES), manganese oxide nanoparticle according to the 2-2 exemplary embodiment is determined to have an oxidation state of 2.3296, and thus, it is confirmed that the manganese oxide nanoparticle has all of divalent manganese (Mn(II)) and trivalent manganese (Mn(III)) formed on a surface thereof. In addition, it is found that manganese oxide nanoparticle according to the 2-1 exemplary embodiment has an oxidation state of 2.188, and manganese oxide nanoparticle according to the 2-3 exemplary embodiment has an oxidation state substantially the same as in the case of a composition of $Mn_3O_4$.

Manufacturing of Nanostructure Catalyst Comprising Transition Metal Oxide

FIG. 20 is a flow chart illustrating a manufacturing method of nanostructure catalyst comprising transition metal oxide according to an exemplary embodiment. FIG. 21 is a schematic perspective view of a nanostructure 400 comprising transition metal oxide according to the secondary embodiment.

With reference to FIG. 20, a manufacturing method of nanostructure 400 comprising transition metal oxide according to the secondary embodiment may comprise, according to an exemplary embodiment illustrated in FIG. 11, a step coating S210 a transition metal oxide nanoparticle on a substrate, a step S220 immersing the substrate in a metal ion solution, and a step S230 aging the metal ion solution, in which the substrate is immersed, at a predetermined temperature The step S210 coating a transition metal oxide nanoparticle on a substrate may use a method such as spin-coating, drop-casting, or the like. The substrate may be, for example, glassy carbon, but is not limited thereto.

In the step S220 immersing the substrate in a metal ion solution, the metal ion solution may comprise at least one cation of iridium (Ir), cobalt (Co), copper (Cu), nickel (Ni), iron (Fe), chromium (Cr), ruthenium (Ru), gold (Au), platinum (Pt), palladium (Pd), and rhodium (Rh). The metal ion solution may comprise at least one of acetate, nitrate, and chlorine. A concentration of a metal cation inside the metal ion solution may be 1 mM to 50 mM.

In the step S230 aging the metal ion solution, in which the substrate is immersed, at a predetermined temperature, a metal nanoparticle 420 may be formed on the surface of the transition metal oxide nanoparticle 410. The aging may be performed at a temperature of 60° C. to 100° C. In addition, aging time maybe 30 minutes to 24 hours. Depending on the aging time, a size of the metal nanoparticle formed on the surface of the transition metal oxide nanoparticle 410 may be controlled.

In an exemplary embodiment, the transition metal oxide nanoparticle 410, in the step S210 coating the transition metal oxide nanoparticle on a substrate, may be a transition metal oxide nanoparticle, in which S160 illustrated in FIG. 11 is not performed. In this case, S160 may be performed immediately after a step 210 coating a transition metal nanoparticle on a substrate.

With reference to FIG. 21, in an exemplary embodiment, a nanostructure 400 comprising a nanocore 410 which is a transition metal oxide nanoparticle containing trivalent transition metal, and a metal nanoparticle 420 adsorbed on a surface of the nanocore 410, may be manufactured.

The nanocore 110 may have a non-stiochiometric composition, and may be represented by Chemical formula (1). As one example, the nanocore 410 may comprise trivalent manganese (Mn(III)), trivalent cobalt (Co(III)), or the like. In detail, the nanocore 410 maybe a transition metal oxide having a structure, corresponding to an exemplary embodiment illustrated in FIGS. 12 to 16

The metal nanoparticles 420 may be at least one of iridium (Ir), cobalt (Co), copper (Cu), nickel (Ni), iron (Fe), chromium (Cr), ruthenium (Ru), gold (Au), platinum (Pt), palladium (Pd), rhodium (Rh), and alloys thereof.

Aplurality of metal nanoparticles 420 may be formed on a surface of a single nanocore 410. A size D1 of the nanocore 410 may be, as to transition metal, 20 nm or less, in detail, 10 nm or less (manganese oxide nanoparticle), 20 nm or less (cobalt oxide nanoparticle), 10 nm or less (nickel oxide nanoparticle, ferrous oxide nanoparticle), 100 nm or less (copper oxide nanoparticle), and a size D2 of the metal nanoparticle 420 may be 1 nm to 10 nm, in detail, 3 nm or less.

Structure of Nanostructure Comprising a Transition Metal Oxide

FIG. 22 is a TEM image of nanostructures comprising manganese oxides according to an exemplary embodiment of the present invention.

With reference to FIGS. 22a and 22b, nanostructure 400 comprising manganese oxide 410, prepared in an exemplary embodiment illustrated in FIG. 20, is analyzed by TEM. The nanostructure 400 may comprise the nanocore 410 of manganese oxide and the metal nanoparticles 420 adsorbed on the nanocore 410. The metal nanoparticles 420 may be substantially uniformly adsorbed on a surface of the nanocore 410. In detail, in an exemplary embodiment, the metal nanoparticles 420 may comprise iridium (Ir).

FIG. 23 are TEM images of nanostructure 400 comprising cobalt oxide according to an exemplary embodiment of the present invention.

With reference to FIG. 23, nanostructure 400 comprising cobalt oxide 410, prepared in an exemplary embodiment illustrated in FIG. 20, is analyzed by TEM. The nanostructure 400 may comprise the nanocore 410 of cobalt oxide and the metal nanoparticles 420 adsorbed on the nanocore 410. The metal nanoparticles 420 may be substantially uniformly adsorbed on a surface of the nanocore 410. In detail, in an exemplary embodiment, the metal nanoparticles 420 may comprise iridium (Ir). Metal nanoparticle 420 indicating black color spot on the nanocore 410 indicating gray color may be confirmed.

Catalyst Characteristics of Nanostructure Comprising Transition Metal Oxide

FIGS. 24 and 25 are graphs illustrating catalyst characteristics of nanostructure comprising manganese oxide according to an exemplary embodiment of the present invention.

Catalyst characteristics are provided by measuring electrochemical characteristics of an electrode manufactured by mixing nanostructure according to an exemplary embodiment described with reference to FIGS . 20 to 22 with a carbon additive and drying it to form a powder, followed by coating the powder on a conductive substrate. In an exemplary embodiment, metal nanoparticles inside the nanostructure comprise iridium (Ir).

Hereinafter, catalyst characteristics are provided by measuring electrochemical characteristics of an electrode manufactured by mixing a transition metal oxide according to an exemplary embodiment with a carbon additive and drying it to form a powder, followed by coating the powder on a conductive substrate.

The powder may be, for example, coated on the conductive substrate by spin coating method, and in the case, speed of revolution may be in the range of 2000 rpm to 4000 rpm. Also, coating time may be in the range of 10 sec to 60 sec. the electrochemical characteristics may be measured by using 3-electrode cell or 2-electrode-cell filled with buffer electrolyte aqueous solution. Specifically, 3-electrode-cell may consist of working electrode coated with a catalyst, counter electrode consisting of Pt wire or Pt plate and reference electrode of Ag/AgCl, and 2-electrode-cell may consist of working electrode and counter electrode without reference electrode. The buffer electrolyte aqueous solution may be used such as sodium phosphate solution of pH 5 to 8, potassium phosphate solution of pH 5 to 8, or NaOH of pH 11 to 14, KOH of pH 11 to 14.

With reference to FIG. 24, catalyst characteristics with respect to nanostructure according to an exemplary embodiment of the present invention and an iridium oxide ($IrO_x$) nanoparticle as a comparative example are illustrated. The iridium oxide ($IrO_x$) nanoparticle has a size of about 1 nm to 2 nm. In the case of an exemplary embodiment of the present invention, more excellent catalyst characteristics are shown, as compared to the comparative example, and a Tafel slope is measured in the range of about 40 mV/decade to about 60 mV/decade.

When an overpotential value, which is a value obtained by subtracting an equilibrium potential of a reaction from an electrode potential in an electrochemical reaction, is calculated, in the case of nanostructure according to an exemplary embodiment, a value of about 280 mV or less at an electrode current density of 10 mA/cm$^2$ or more is shown. When compared to the case in which iridium oxide ($IrO_x$), nickel iron oxide ($NiFeO_x$), cobalt iron oxide ($CoFeO_x$), nickel cobalt oxide ($NiCoO_x$), or the like has a value of 320 mV to 400 mV, it is confirmed that the nanostructure according to an exemplary embodiment has excellent catalyst characteristics.

With reference to FIG. 25, a catalyst stability measurement result is illustrated. As a cyclic potential is repeatedly scanned, a change due to an increase in the number of cycles is analyzed. As illustrated in FIG. 25, it is confirmed that loss of an electrochemical surface area (ECSA) is insignificant after potential scanning 400 times. Thus, it is confirmed that nanostructure according to an exemplary embodiment may stably function as a catalyst.

FIG. 26 is a graph illustrating catalyst characteristic of nanostructure comprising transition metal oxide according to exemplary embodiments of the present invention.

With reference to FIG. 26, cyclic voltammogram, in case where a catalyst of nanostructure 400 comprising iridium (Ir)-formed cobalt oxide nanocore 410, iridium(Ir)-formed ferrous oxide nanocore 410 according to exemplary embodiments is used, is illustrated compared with Normal Hydrogen Electrode (NHE).

In detail, nanocore 410 [or, nanostructure 400] in which metal nanoparticle 420 is formed on a surface shows further excellent catalyst characteristics. That may be because trivalent transition metal of unstable state [as one example, cobalt (Co(III))] existing in transition metal oxide nanoparticle surface gets involved with catalysis. Also, when an overpotential value, which is a value obtained by subtracting an equilibrium potential of a reaction from an electrode potential in an electrochemical reaction, is calculated, in the case of a metal nanoparticle-formed cobalt oxide nanoparticle, a value of about 300 mV or less at an electrode current density of 10 mA/cm$^2$ or more is shown. As other examples, a value of 600 mV or less in case of Mn, Co, Ni, a value of 800 mV or less in case of Cu, Fe are shown. This shows high activity of the present invention compared to Mn, Co, Ni, Cu and Fe-based solid catalysts. Transition metal oxide nanoparticle indicates much lower catalyst characteristics than nanostructure 400 and it may be because conductivity is decreased by a ligand surrounding transition metal nanoparticle.

And, at a step S160 of FIG. 11, an exemplary embodiment treated by NH$_4$OH during 1 hr indicates much higher catalyst characteristic than an exemplary embodiment treated by NH$_4$OH during 24 hr. it may be understood as resulting from a stoichiometric transition metal oxide and a close state thereof because a surface of transition metal oxide is perfectly oxidized and stable state is formed by making surface-treating time longer. Additional experiments indicate that the best catalyst characteristics are shown in a case that treating-time by NH$_4$OH is inside and outside 1 hr, the lower catalyst characteristics than above is shown in a case that the treating-time is 3 min and 2 hr, and the catalyst characteristics are gradually decreased as treating-time is over 2 hr. this optimized treating-time may merely be changed by changing a size of transition metal oxide nanoparticle, process condition or the like.

Electrochemical Reaction System Application Example (Water Decomposition System)

FIG. 27 is a schematic view of a water decomposition system comprising catalyst according to an the secondary exemplary embodiment.

With reference to FIG. 27, a water decomposition system 500 may comprise an electrolytic bath 510, a buffer electrolyte aqueous solution 520, a first electrode (an anode) 530, and a second electrode (a cathode) 540. The first electrode 530 and the second electrode 540 may be connected to a power supply. In an exemplary embodiment, in the water decomposition system 500, an ion exchange unit maybe further disposed between the first electrode 530 and the second electrode 540.

Each of the first electrode 530 and the second electrode 540 may be formed of a semiconductor or conductive material. An oxygen evolution catalyst 560 may be disposed on at least one side of the first electrode 530, and the oxygen evolution catalyst 560 may comprise transition metal oxide 410 or nanostructure 400 comprising the same.

In the electrolytic bath 510, an inlet and an outlet such as an inlet pipe and a drain pipe may be further formed.

The buffer electrolyte aqueous solution 520 may serve as a supply source of water, used for a water decomposition reaction, and an acceptor of a proton, generated in a water decomposition reaction. The buffer electrolyte aqueous solution 520 may comprise, for example, at least one of potassium phosphate such as KH$_2$PO$_4$, K$_2$HPO$_4$, K$_3$PO$_4$ or a mixture thereof, and sodium phosphate. A pH of the buffer electrolyte aqueous solution 220 may be 2 to 14. In detail, when the oxygen evolution catalyst 560 according to the present invention is used, the buffer electrolyte aqueous solution 520 may have neutral conditions. To serve as an acceptor of the proton, the buffer electrolyte aqueous solution 520 may comprise a proton-accepting anion. Thus, even when a production amount of a proton (H$^+$) increases as a water decomposition reaction is carried out, the proton-accepting anion accepts at least a portion of the proton, thereby reducing a pH reduction rate of the buffer electrolyte aqueous solution 520. The proton-accepting anion may comprise at least one of a phosphate ion, an acetate ion, a borate ion, and a fluoride ion.

When a voltage is applied between the first electrode 530 and the second electrode 540 in the water decomposition system 500, a reaction, in which oxygen is generated in the first electrode 530 and hydrogen is generated in the second electrode 540, may occur. Each half reaction is represented by reaction formulas 1 and 2.

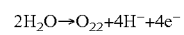   [Reaction formula 1]

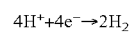   [Reaction formula 2]

The oxygen evolution catalyst 560 according to an exemplary embodiment may be involved in a reaction in the first electrode 530, represented by reaction formula 1. Thus, a water decomposition reaction may be carried out at a low overpotential even under neutral conditions.

FIG. 28 is a schematic view of a fuel cell system comprising a catalyst according to the secondary exemplary embodiment.

With reference to FIG. 28, a fuel cell system 600 may comprise an electrolyte membrane 620, a first electrode (an anode) 630, and a second electrode (a cathode) 640. In addition, the fuel cell system 600 may comprise a cover portion 610 having first to third inlets/outlets 652, 654 and 656, and in which the first electrode 630 and the second electrode 640 in addition to the electrolyte membrane 620 are disposed.

The fuel cell system 600 according to an exemplary embodiment may be a solid oxide fuel cell (SOFC), but is not limited thereto. The first electrode 630 and the second electrode 640 in addition to the electrolyte membrane 620 may form a single unit cell, and a plurality of unit cells may be stacked to form a fuel cell.

In the fuel cell system 600, an electrochemical reaction may be carried out in a reverse direction to the water decomposition system 500 illustrated in FIG. 27.

A cation may be generated by an oxidation reaction of hydrogen in the first electrode 630, and water may be generated by a reduction reaction of oxygen in the second electrode 640. In this case, since an electron is generated in the first electrode 630 and the electron is consumed in the second electrode 640, when two electrodes are connected to each other, electricity may flow therein.

Each of the first electrode 630 and the second electrode 640 may be consists of a semiconductor or conductive material. At least one side of the second electrode 640 may be coated with transition metal oxide 410 or nanostructure 400 comprising the same according to an exemplary embodiment as an oxygen reduction reaction catalyst 660. The oxygen reduction reaction catalyst 660 according to an exemplary embodiment may be a material the same as the oxygen evolution catalyst 660 according to an exemplary embodiment illustrated in FIG. 31, but may be differently referred since the oxygen reduction reaction catalyst is involved in a reverse direction. Thus, the oxygen evolution catalyst of the present invention may serve as a catalyst of an oxygen evolution reaction and a reverse reaction thereof.

The electrolyte membrane 620 may have the form of a proton conducting polymer membrane, and may allow a side of the first electrode 630 and a side of the second electrode 630 to be separated from each other and may allow a proton to flow therebetween, at the same time. The proton conducting polymer membrane may be, for example, NAFION®.

In the fuel cell system 600, an oxidation reaction and a reduction reaction are carried out at a useful rate, and the oxygen reduction reaction catalyst 660 according to an exemplary embodiment may be used to allow a reaction to occur at a reduced potential.

As a system comprising an oxygen evolution catalyst according to an exemplary embodiment, a water decomposition system and a fuel cell system have been exemplarily described, but the present invention is not limited thereto. In addition, an oxygen evolution catalyst or an oxygen reduction reaction catalyst according to an exemplary embodiment may be used for various electrochemical reaction systems.

Electrochemical Reaction System Application Example (Chlorine Oxidation Reaction)

Hereinafter, an exemplary embodiment, in which a d-orbital manifold catalyst applying aging of a dissimilar metal solution to chlorine is applied to oxidation reaction, is described. The catalyst has a conformation laminating a layer plurally consisting of transition metal oxide, a conformation laminating a layer plurally consisting of nanostructure comprising transition metal oxide, and it facilitates a chlorine oxidation reaction.

Chlorine is used as an essential raw material in the many kinds of field such as plastic, chemical material, pulp generation, water disinfection or the like, and a chemical raw material having a huge market size around world. Especially, ballast water treatment facility is essential for preventing distortion and disconcertion of marine ecosystem due to movement of ballast water, and ballast water treatment market of billons dollar size would be newly formed and the method of treating ballast water using chlorine would be predict to leads to the ballast water treatment market, and importance of generating chlorine is coming to the fore.

At the present industrial field, chlorine is generated by oxidizing brine electrochemically. Because a Chlorine oxidation reaction has a relationship of competition with oxygen evolution reaction, an invention on catalyst inhibiting oxygen evolution reaction and facilitating chorine oxidation reaction at the same time is essential for generating chlorine effectively and safely.

A Manufacturing of Transition Metal Oxide, Catalyst

FIG. 29 is a schematic diagram indicating coating of metal oxide nanoparticles on a conductive substrate according to an exemplary embodiment of the present invention.

The manufacturing method of catalyst according to an exemplary embodiment of the present invention, is characterized by comprising (a) a step manufacturing a transition metal oxide nanoparticle 700, (b) a step stacking 720 a layer consisting of the transition metal oxide nanoparticle 700 plurally on a conductive substrate 710, (c) a step immersing the conductive substrate 710 into a metal ion solution and (d) a step aging the metal ion solution, in which the substrate is immersed, at a predetermined temperature. And the present invention is characterized by generating chlorine through electrochemical reaction system using the catalyst manufactured by above method.

First of all, (a) step manufacturing a transition metal oxide nanoparticle 700 is performed.

Specific description of a process of manufacturing a transition metal oxide nanoparticle 700, because of the same as a manufacturing process of a step S100 to a step S160 illustrated in FIG. 11, is omitted.

As next step, with reference to FIG. 29, (b) a transition metal oxide nanoparticle 700 is manufactured and the transition metal oxide nanoparticle 700 may be coated on a conductive substrate 710. In this case, layers consisting of transition metal oxide nanoparticle 700 may be stacked p plurally.

The process of stacking layers consisting of transition metal oxide nanoparticle 700 plurally, may comprise (b1) a step manufacturing a catalyst mixing by mixing the transition metal oxide nanoparticle 700, and a carbon addictive and a polymer binder, (b2) a step manufacturing the third solution in which the catalyst mixture and organic solution are dispersed, and (b3) a step coating the third solution on a conductive substrate 710.

In a step manufacturing a catalyst mixture by mixing the transition metal oxide nanoparticle 700, and a carbon addictive and a polymer binder, a carbon addictive comprising at least one of graphene, carbon nanotube, carbon fiber, artificial graphite, carbon black, activated carbon, or the like may be used. It is desirable that the carbon addictive consists of nano-dimension particle. And the polymer binder may be used as PVDF (polyvinylidene fluoride) or the like.

The catalyst mixture is manufactured by mixing the transition metal nanoparticle 100, carbon addictive, polymer binder with a ratio of X:Y:Z respectively. In this case, the mixing is performed such that it satisfied with an equation of $2X+Y=1$ and Y value of 0.1 to 0.9.

In a step S322 manufacturing the third solution in which the catalyst mixture and organic solution are dispersed, the catalyst mixture maybe dispersed into an organic solution such as NMP (N-methyl-2-prrolidone), ethanol, methanol, or the like.

In a step coating the third solution on a conductive substrate 710, using a spin coating method is desirable. Other than this method, a method of coating a catalyst mixture produced as a state of paste, a method of dropcasting a catalyst mixture produced as an ink or the like may be used. Layers consisting of the transition metal oxide nanoparticle 700 may be stacked 720 plurally by coating the third solution on a conductive substrate 710. The transition metal oxide nanoparticle 700 may be stacked with consisting of close packing.

In this case, stacking thickness (t) may be 70 nm to 600 nm. Stacking thickness (t) maybe controlled by adjusting concentration of the transition metal oxide nanoparticle 700 comprised in the third solution. The concentration may be adjusted in the range of 0.01 g/ml to 50 g/ml.

An electron at a laminate 700 of the transition metal oxide nanoparticle 700 may be moved along with a surface of transition metal oxide nanoparticles 700. And, an electron and a hydrogen cation particle existing in electrolyte may be coupled and moved together during catalyst reaction. In this way, a combination of the conductive substrate 700 and transition metal oxide nanoparticle layers stacked plurally on the conductive substrate 710 is used as a catalyst.

In the next step, (c) a step immersing the conductive substrate 710 into a metal ion solution and (d) a step aging the metal ion solution, in which the substrate is immersed, at a predetermined temperature are further performed.

In an immersing step of the conductive substrate into a metal ion solution, the metal ion solution may comprise at least one cation of Ir, Co, Cu, Ni, Fe, Cr, Ru, Au, Pt, Pd and Rh. The metal ion solution may comprise at least one of acetate, nitrate and chloride material. A concentration of metal ion in the metal ion solution may be 1 mM to 50 mM.

Through a step aging the metal ion solution, in which the substrate is immersed, at a predetermined temperature are further performed, as illustrated in FIG. 21, a metal nanoparticle may be formed on a surface of a transition metal oxide nanoparticle (or, a surface of a transition metal oxide nanoparticle combination).

In the next step, chlorine may be generated in an electrochemical reaction system using a catalyst of nanostructure form comprising a transition metal oxide.

A catalyst having a plurally stacked form of layers formed on a conductive substrate 710 and consisting of a transition metal oxide nanoparticle 700 may be used as an electrode in an electrochemical reaction system, and the electrode may function as an anode. Electrolyte may consist of mixing solution containing Cl such as NaCl, NaClO$_4$ or the like. As one example, Electrolyte may consists of a mixing solution of NaCl(xM) and NaClO$_4$(4-xM) and where x may be 10 mM to 6M.

Oxidation reaction occurs in an anode and Cl$_2$, HOCl, OCl$^-$ or the like may be generated and reduction reaction occurs in a cathode and hydrogen may be generated. The above reactions are below.

$$2Cl^- \rightarrow Cl_2 + 2e^- \quad (i)$$

$$Cl_2 + H_2O \rightarrow H^+ + HOCl + Cl^- \quad (ii)$$

$$HOCl + H_2O \rightarrow OCl^- + H_3O^+ \quad (iii)$$

Chlorine (Cl$_2$), hypochlorous acid (HOCl), hypochlorite (OCl$^-$) generated by the above (i), (ii), (iii) may induce a disinfection action.

On the other hand, OH$^-$ may be produced as by-product with generating hydrogen in a cathode. It may have a role of elevating pH of electrochemical cells and may cause a phenomenon inhibiting Cl$_2$ generation. Thus, the electrochemical reaction system of the present invention must have membrane positioned between a cathode and an anode. The constitution of membrane may be Nafion, Cation exchange membrane or the like.

Other than above, the catalyst of the present invention may be used as a catalyst in diverse electrochemical reactions.

FIG. 30 is a graph indicating catalyst characteristics of metal oxide nanoparticle layers according to exemplary embodiments of the present invention.

Nanostructure 400 catalyst [referring to FIG. 21], in which Ir as a metal nanoparticle 420 is formed on a surface of a transition metal oxide, is prepared. It is stacked on the conductive substrate 710 such as FTO, ITO, Carbon paper or the like by spin-coating method. 4M NaCl is used as an electrolyte for generating Cl$_2$ while NaClO$_4$ is used as a comparison. Operating machine uses H-cell, and membrane uses Nafion.

With reference to FIG. 30, it is confirmed that most measured values show high activity compared to Mn, Fe, Co, Ni and Cu-based solid catalyst. In detail, it is confirmed that nanostructure 400 in which a metal nanoparticle 420 is formed on a surface of transition metal oxide nanoparticle 410 has higher activity.

FIG. 31 is a schematic diagram of another exemplary embodiment applying a d-orbital manifold catalyst of the present invention to a chlorine generation electrochemical reaction.

With reference to FIG. 31, brine decomposition system 800, may comprise electrolyte membrane 810, buffer electrolyte aqueous solution 820, the first electrode (an anode) 830, and the second electrode (a cathode) 840. Each constitutions of brine decomposition system 800 are the same as water decomposition system above-stated in FIG. 27 and thus, specific descriptions thereof are omitted and differences are only described below.

Buffer electrolyte aqueous solution 820 may perform a role as a source of brine used to a brine decomposition reaction and a brine decomposition reaction and a role as acceptor of proton generated while brine decomposition reaction occurs. Buffer electrolyte aqueous solution 820 may comprise, for example, at least one of potassium phosphate and sodium phosphate such as KH$_2$PO$_4$, K$_2$HPO$_4$, K$_3$PO$_4$ or the mixture thereof. pH of Buffer electrolyte aqueous solution 820 may be 2 to 14. In detail, in case of using chlorine generation catalyst 860, buffer electrolyte aqueous solution 820 may have neutral conditions. Buffer electrolyte aqueous solution 820 may comprise proton-accepting anion for a role as acceptor of proton. In this way, even though generation of proton (H$^+$) is increased as to proceeding to brine decomposition reaction, pH reduction ratio of buffer electrolyte aqueous solution 820 may be lowered by accepting at least some parts of the above proton by proton-acceptable anion. The proton-acceptable anion may comprise at least one of phosphate ion, acetate ion, borate ion and fluoride ion.

In case of applying voltage between the first and the second electrode 830, 840 in brine decomposition system 800, reactions in which chlorine is generated in the first electrode 830 and hydrogen is generated in the second electrode 840 occur. Each half reaction may be represented by following reaction equation 1 and 2.

$$2Cl^- \rightarrow Cl_2 + 2e^- \quad \text{[reaction formula 1]}$$

$$Cl_2 + H_2O \rightarrow H^+ + HOCl + Cl^- \quad \text{[reaction formula 2]}$$

$$2H^+ + 2e^- \rightarrow H_2$$

Chlorine generation catalyst 860 according to an exemplary embodiment of the present invention may be involved in a reaction which occurs in the first electrode 830 represented by above reaction formula 1. Thus, a brine decomposition reaction may be carried out at a low overpotential even under neutral conditions. Voltage used for generating chlorine in brine decomposition is 1.36V, voltage used for generating oxygen in water decomposition is 1.23V, but four electrons are involved so as to generate oxygen in water decomposition. Thus, a possibility of generating chlorine is increased in thermodynamic competition of chlorine and oxygen reaction and the present invention may offer a catalyst capable of generating chlorine in competition reaction.

Brine decomposition system which is a system comprising chlorine generation catalyst according to an exemplary embodiment of the present invention is described as one example, but the present invention is not limited to this, various electrochemical systems may be used.

3. A D-Orbital Manifold Catalyst Applying a Ligand (The Third Exemplary Embodiment)

Hereafter, a catalyst according to the third exemplary embodiment is described. A catalyst may have a conformation comprising a ligand existing on a surface of transition metal oxide nanoparticle, a conformation comprising a metal cation inserted-ligand existing on a surface of transition metal oxide nanoparticle.

Manufacturing of Transition Metal Oxide, Catalyst

FIG. 32 is a flow chart indicating a manufacturing process of a catalyst according to the third exemplary embodiment. And FIG. 33 is a schematic diagram indicating a manufacturing process of a catalyst according to the third exemplary embodiment.

The manufacturing method of catalyst according to an exemplary embodiment of the present invention, is characterized by comprising (a) a step 410 manufacturing transition metal oxide nanoparticle 900, and (b) a step S420 substituting (905→906) a ligand 905 existing on a surface of transition metal oxide nanoparticle 900.

First of all, (a) a step 410 manufacturing a transition metal oxide nanoparticle 900 is performed.

The process of manufacturing a transition metal oxide nanoparticle 900, because of the same of manufacturing process of S110 to S150 illustrated in FIG. 11, is omitted. Meanwhile, the process of surface-treating transition metal oxide nanoparticle does not be performed.

In the next steps, with reference to FIG. 32 and FIG. 33, after manufacturing the transition metal oxide nanoparticle, (b) a step S420 substituting (905→906) a ligand 905 existing on a surface of transition metal oxide nanoparticle 900 is performed.

The process of substituting (905→906) a ligand 905 existing on a surface of transition metal oxide nanoparticle 900, may comprise (b1) a step S421 manufacturing the third solution in which the transition metal oxide nanoparticle 900 is dispersed, (b2) a step S422 manufacturing the fourth solution in which a ligand 906 capable of being substituted at a surface of the transition metal oxide nanoparticle, and (b3) a step 423 substituting (905→906) a ligand 905 existing on a surface of transition metal oxide nanoparticle.

In a step S421 manufacturing the third solution in which the transition metal oxide nanoparticle 900 is dispersed, the transition metal oxide nanoparticle 900 may be mixed with an organic solvent such as octane or the like, and the third solution is manufactured by mixing transition metal oxide nanoparticle 900 with concentration of 1 mM to 500 mM.

In a step S422 manufacturing the fourth solution in which a ligand 906 capable of being substituted at a surface of the transition metal oxide nanoparticle, the ligand may be dispersed in an organic solvent. The ligand may be one of EDTA (Ethylene Diamine Tetra Acetic acid), ferrocene, ferrocene derivatives, pyridine, pyridine derivatives, imidazole and hereinafter, EDTA is described as a main example. FIG. 34 illustrates structural formula of EDTA. And the fourth solution may be manufactured by dissolving EDTA into an organic solvent such as methanol or the like.

Through a step S423 substituting (905→906) a ligand 905 existing on a surface of transition metal oxide nanoparticle, the ligand 905 existing a surface of transition metal oxide nanoparticle may be substituted with EDTA 906. Afterward, through the process of washing and centrifugation, or the like, a transition metal oxide nanoparticle 910 having the substituted ligand 906 is obtained.

Meanwhile, a manufacturing method of catalyst according to another exemplary embodiment of the present invention is characterized by comprising (a) a step S410 manufacturing a transition metal oxide nanoparticle 900, (b) a step S420 substituting (905→906) a ligand 905 existing on the transition metal oxide nanoparticle 900, and (c) a step S430 inserting a metal cation 907 into a ligand 906. Because the steps (a) and (b) are the same as a process of obtaining above transition metal oxide nanoparticle, specific description thereof is omitted.

In a step S430 inserting a metal cation 907 into a ligand 906, the metal cation 907 may coordinate at the ligand. With reference to magnified FIG. 33, the metal cation 907 may be inserted into the ligand 906 as a conformation of monodentate, bi-dentate, psedo-bridge. The metal cation 907 may form a conformation of pseudo-bridge, and nitrogen atom may act as a chelate with respect to transition metal ion.

The metal cation 907 may be inactive in redox reactions. The metal ion may maintain inactive state in redox reactions because it has no electron or electron entirely closed at d-orbital, and is very stable by itself. the metal cation may be one of $Ca^{2+}$, $Ba^{2+}$, $Sr^{2+}$, $Mg^{2+}$, $Zn^{2-}$, $Yb^{3+}$, $Y^{3+}$.

A transition metal oxide nanoparticle having the inserted metal cation 907 and the substituted ligand 906 may be obtained through the process of washing and centrifugation, or the like after mixing a metal chloride ethanol solution with a ligand substituted-transition metal oxide.

Because of a surface of transition metal oxide nanoparticles 910,920 is functionalized in such a conformation that a ligand 905 is substituted with a ligand 906 or the metal cation 907 is inserted into the substituted ligand 906, they are called as "surface-functionalized transition metal oxide nanoparticle" or "surface-functionalized multimer". They are used as a catalyst in diverse electrochemical reactions such as a water decomposition redox reaction, a hydrogen generation reaction, a $CO_2$ reduction reaction, or the like.

Analysis of Transition Metal Oxide, Catalyst

In experimental examples hereinafter, a transition metal oxide nanoparticle 910 is described by postulating manganese oxide 901 disposed on a surface of an EDTA ligand as the transition metal oxide nanoparticle 910. And, the transition metal oxide nanoparticle 920 is described by postulating manganese oxide 901 disposed on a surface of an EDTA ligand into which $Ca^{2+}$ 907 is inserted as the transition metal oxide nanoparticle 920.

FIG. 35 is a graph indicating XRD (X-ray Diffraction) result of a catalyst according to an experimental example of the present invention. FIG. 36 is a graph indicating XANES (X-ray Absorption Near Edge Structure) result of a catalyst according to an experimental example of the present invention.

With reference to FIG. 35, it is confirmed that EDTA MnO 910 and CaEDTA MnO 920 in XRD pattern have same main peaks of MnO and $Mn_3O_4$ phase. And, with reference to FIG. 36, linear fitting results of XANES shows that EDTA MnO 910 and CaEDTA MnO 920 are in the state of being further oxidized compared to MnO 900 before substituting a ligand (or, Myristic acid MnO). It means that all signals of MnO, $Mn_3O_4$ side are shown by partially oxidizing a surface of manganese oxide nanoparticle. Thus, it is confirmed that, as MnO 900 before substituting a ligand, EDTA MnO 910 and CaEDTA MnO 920 satisfy $Mn_{1-\delta}O$ (where δ is 0<δ<0.5). Because oxidation state illustrated in FIG. 36 is that MnO 900 is 2.29, EDTA MnO 910 is 2.48, CaEDTA MnO 920 is 2.55, (high concentration $Ca^{2+}$) CaEDTA MnO 920 is 2.53, it indicates that they have divalent manganese and trivalent manganese altogether.

FIG. 37 is a TEM (Transmission Electron Microscopy) picture indicating a catalyst according to an experimental example of the present invention.

With reference to FIG. 37, it is confirmed that CaEDTA-functionalized MnO nanoparticle 920 maintains a round shape. According to FIG. 37, CaEDTA MnO nanoparticle

920 may have a size of 10 nm or less. And this size is the same as that of MnO 900 before substituting a ligand (or, Myristic acid MnO).

FIG. 38 is a graph indicating SEM EDS (Scanning Electron Microscopy Energy Dispersive Spectroscopy) result of a catalyst according to an experimental example of the present invention.

As a result performing SEM EDS analysis by mixing CaEDTA MnO 920 with methanol, followed by spin-coating it on FTO glass, It if confirmed that Ca peaks is shown. Therefore, it is confirmed that EDTA is an appropriate ligand capable of decorating a surface of manganese oxide nanoparticle with dissimilar metal such as calcium FIG. 39 is a graph indicating EPR (Electron Paramagnetic Resonance) result according to various experimental examples in the present invention. FIG. 39a illustrates EPR spectrum of MnO 900 (or Myristic Acid MnO), FIG. 39b illustrates EPR spectrum of EDTA MnO 910, FIG. 39c illustrates EPR spectrum of CaEDTA MnO 920.

With reference to FIG. 39a, MnO 900 shows typical six finely separate peaks of $Mn^{2+}$, and distorted electron structure of Mn cation does not be shown.

With reference to FIG. 39b, EDTA MnO 910 also shows typical six finely separate peaks of $Mn^{2-}$, and distorted electron structure of Mn cation does not be shown.

With reference to FIG. 39c, CaEDTA MnO 920 shows a distorted spectrum as half-field transition pattern near g=4. In contrast with existing Mn cation spectrum, it is confirmed that inserted calcium cation adds bump near 2<g<4 and g=4.

FIG. 40 is a graph indicating EPR (Electron Paramagnetic Resonance) result through adjustment of metal cation according to various experimental examples in the present invention.

With reference to FIG. 40a, it is confirmed that bump is further added near 2<g<4 and g=4 by increasing concentration of inserted calcium cation. With reference to FIG. 40b, bump is further added near 2<g<4 and g=4 by increasing the time inserting calcium cation in EDTA.

The structures indicated in FIG. 39 and FIG. 50 have EPF spectrum similar with existing dimeric Mn enzyme oxalate decarboxylase.

FIG. 41 is a graph indicating catalyst characteristics according to various experimental examples in the present invention. FIG. 42 is a graph indicating catalyst characteristics according to experimental examples applying various metal cations of the present invention.

Hereinafter, catalyst characteristics are provided by measuring electrochemical characteristics of an electrode manufactured by mixing a transition metal oxide according to an exemplary embodiment with a carbon additive and drying it to form a powder, followed by coating the powder on a conductive substrate.

The powder may be, for example, coated on the conductive substrate by spin coating method, and in the case, speed of revolution may be in the range of 2000 rpm to 4000 rpm. Also, coating time may be in the range of 10 sec to 60 sec. the electrochemical characteristics may be measured by using 3-electrode cell or 2-electrode-cell filled with buffer electrolyte aqueous solution. Specifically, 3-electrode-cell may consist of working electrode coated with a catalyst, counter electrode consisting of Pt wire or Pt plate and reference electrode of Ag/AgCl, and 2-electrode-cell may consist of working electrode and counter electrode without reference electrode. The buffer electrolyte aqueous solution may be used such as sodium phosphate solution, potassium phosphate solution of pH 7.8.

With reference to FIG. 41, cyclic voltammogram, in case of using surface-functionalized transition metal oxide nanoparticle 910, 920 catalyst, is shown compared to Normal Hydrogen Electrode (NHE).

With reference to FIG. 41a, excellent catalyst properties are shown by increasing concentration of EDTA MnO 910. Also, the lowest 0.6 C EDTA MnO 910 shows catalyst properties equal or excellent to Ni which is solid catalyst.

With reference to FIG. 41b, excellent catalyst properties are shown by increasing concentration of CaEDTA MnO 920. Also, the lowest 0.6 C CaEDTA MnO 920 shows catalyst properties fairly excellent compared to Ni which is solid catalyst.

With reference to FIG. 42, the metal cation 907 inserted into a ligand 906 may further considered in one of $Ca^{2+}$, $Ba^{2+}$, $Sr^{2+}$, $Mg^{2+}$, $Zn^{2+}$, $Yb^{3+}$, $Y^{3+}$ instead of $Ca^{2+}$. It is confirmed that BaEDTA MnO, SrEDTA MnO, MgEDTA MnO, ZnEDTA MnO, YbEDTA MnO and YEDTA MnO show similar catalyst characteristics with CaEDTA MnO. It is confirmed that two define oxidation-reduction peaks are shown in FIG. 42a and FIG. 42b. In this case, oxidation-reduction position shifts as to a species of metal cation 907 inserted into EDTA ligand 906, and it is confirmed that negative shift is done by increasing Lewis acidity as shown in FIG. 42a and positive shift is done in case of lanthanum-based metal (Yb, Y) or Zn as shown in FIG. 42b. This may mean that as inserting of a metal cation 907 inactive to oxidation-reduction, it is affected to redox of Mn having activity and existing around the metal cation, and the two is hybridized.

FIG. 43 is a graph indicating EPR (Electron Paramagnetic Resonance) result according to experimental examples applying various metal cations of the present invention.

MgEDTA MnO, BaEDTA MnO, SrEDTA MnO, ZnEDTA MnO, YbEDTA MnO and YEDTA MnO show similar EPR spectra with EDTA MnO 910 or CaEDTA MnO 920. In detail, it is confirmed that SrEDTA MnO shows further clearly distorted spectrum as half-field transition pattern near g=4 and others show similar behaviors though intention difference of hybridization relatively exists.

FIG. 44 indicates structural formulas and bonding relationships of a ligand according to another example of the present invention. FIG. 45 is a graph indicating catalyst characteristic according to other examples of the present invention. FIG. 44 and FIG. 45 postulate that a ligand 120 is ferrocene, not EDTA.

FIG. 44a is a structural formula of amino Ferrocene. Myristic acid ligand is eliminated by spin-coating a solution comprising MnO and Hexane on a FTO, followed by immersing an ammonium hydroxide solution during approximately 1 hr. the next thing, it is dipped into a solution comprising amino ferrocene and EtOH, and washed and dried afterward.

FIG. 44b shows a relationship of combining amino ferrocene with MnO. It is considered that $-NH_2$ of Amino ferrocene turns into —NH— and it is combined with MnO, and a transition of ferrous oxide from Fe(II) to Fe(III) provokes a transition of divalent manganese and trivalent manganese.

With reference to FIG. 45, it is confirmed that Ammonia MnO combined with a ferrocene ligand shows excellent catalyst characteristics compared to ammonia MnO.

Application to Electrochemical Reaction System

Specific descriptions regarding a water decomposition system and a fuel cell system comprising a catalyst according to the third exemplary embodiment of the present invention, because it is the same as constitutions illustrated in FIG. 27 and FIG. 28, are omitted.

Meanwhile, an oxygen generation catalyst 560 may be configured on at least one side of the first electrode 530 in the water decomposition system 500 [referring to FIG. 27], and the oxygen generation catalyst 560 may comprise a transition metal oxide nanoparticle, a surface-functionalized multimer 910, 920 or nanostructure comprising thereof according to the third exemplary embodiment of the present invention stated by referring to FIG. 32 to FIG. 45.

When voltage between the first and the second electrode 530, 540 is applied in the water decomposition system, the reaction, in which oxygen is generated in the first electrode 530 and hydrogen is generated in the second electrode 540, occurs. And the half-reactions respectively are represented by below reaction formula 1 and 2.

$$2H_2O \rightarrow O_2 + 4H^+ + 4e^-$$ [reaction formula 1]

$$4H^+ + 4e^- \rightarrow 2H_2$$ [reaction formula 2]

The oxygen-generation catalyst 560 according to an exemplary embodiment of the present invention may be involved in a reaction in the first electrode 530, represented by reaction formula 1. Thus, a water decomposition reaction may be carried out at a low overpotential even under neutral conditions.

An electrochemical reaction in a fuel cell system 600 [referring to FIG. 28] may proceed to reverse direction of the water decomposition system 500 illustrated in FIG. 27. transition metal oxide nanoparticle, surface-functionalized multimer 910, 920 or nanostructure comprising thereof according to the third exemplary embodiment of the present invention stated by referring to FIG. 32 to FIG. 45 may be coated on at least one side of the second electrode 640 as an oxygen reduction reaction catalyst 660 in the fuel cell system 600 [referring to FIG. 28]. The oxygen reduction catalyst 660 of the present exemplary embodiment may the same as the oxygen generation catalyst 560 of the exemplary embodiment illustrated in FIG. 27, but maybe differently referred since the oxygen reduction reaction catalyst is involved in the reverse direction. Thus, the oxygen generation catalyst of the present invention may serve as a catalyst of an oxygen generation reaction and a reverse reaction thereof.

Oxidation reactions and reduction reactions in the fuel cell system 600 are performed in practical speed, and the oxygen reduction reaction catalyst 660 according to an exemplary embodiment of the present invention may be used to make a reaction in a state of reduced potential As a system comprising an oxygen generation catalyst according to an exemplary embodiment, a water decomposition system and a fuel cell system have been exemplarily described, but the present invention is not limited thereto. In addition, an oxygen generation catalyst or an oxygen reduction reaction catalyst according to an exemplary embodiment may be used for various electrochemical reaction systems.

While the present invention has been particularly shown and described with reference to exemplary embodiments thereof, but is not limited thereto. It will be apparent to those skilled in the art that various changes and modifications thereof may be made within the spirit and scope of the present invention, and therefore to be understood that such changes and modifications belong to the scope of the appended claims.

The invention claimed is:

1. A d-orbital manifold catalyst in which a distorted surface structure by inclusion of hetero nanoparticles are generated on a surface by substituting at least a part of a surface of a transition metal oxide nanoparticle with an inclusion, wherein the transition metal oxide nanoparticle is a nanoparticle having particular chemical and electronic states detected by EPR analysis,
   wherein the transition metal oxide nanoparticle has a non-stoichiometric composition and is represented by Chemical formula (1), $$A_{1-\delta}O$$ Chemical formula (1)

where A is a transition metal and is one of manganese (Mn), iron (Fe), cobalt (Co), Nickel (Ni) and copper (Cu) and δ satisfies 0<δ<0.5, exclusive of 0.25 and ⅓, wherein d-orbital of the transition metal is in a state of low-spin and the low-spin state is S=½.

2. The d-orbital manifold catalyst of claim 1, wherein the d-orbital manifold catalyst forms distortion of the transition metal oxide nanoparticle structure while bonding between the transition metal and the oxygen is changed from single bond to double bond.

3. The d-orbital manifold catalyst of claim 2, wherein the d-orbital manifold catalyst allows compression in the z-axis direction to take place with forming double bond between the transition metal and the oxygen.

4. The d-orbital manifold catalyst of claim 1, wherein the inclusion is a metal nanoparticle.

5. The d-orbital manifold catalyst of claim 4, wherein the metal nanoparticle comprise at least one of iridium (Ir), ruthenium (Ru), platinum (Pt), palladium (Pd), and rhodium (Rh).

6. The d-orbital manifold catalyst of claim 1, wherein the inclusion is a ligand.

7. The d-orbital manifold catalyst of claim 6, wherein the ligand is one of EDTA (Ethylene Diamine Tetra Acetic acid), ferrocene, ferrocene derivate, pyridine, pyridine derivate and imidazole.

8. The d-orbital manifold catalyst of claim 1, while tetravalent manganese (Mn) is located on a surface of the transition metal oxide, and manganese atom and oxygen atom form double bond, wherein the manganese atom indicates low-spin state.

9. The d-orbital manifold catalyst of claim 8, wherein the manganese atom indicates low-spin state if bonding distance between the manganese atom and the oxygen atom is less than 2.2 Å.

10. A manufacturing method of forming the d-orbital manifold catalyst of claim 1, catalyst, comprising:
   (a) A step forming $M_1(OH)_x$ layer on a substrate;
   (b) A step coating a transition metal oxide nanoparticle on the $M_1(OH)_x$ layer; and
   (c) A step performing thermal treatment of the $M_1(OH)_x$ layer and the transition metal oxide nanoparticle,
   wherein $M_1$ comprises at least one of iridium (Ir), (chromium (Cr), ruthenium (Ru), gold (Au), platinum (Pt), palladium (Pd), and rhodium (Rh), and wherein the transition metal oxide is an oxide of one of manganese (Mn), iron (Fe), cobalt (Co), nickel (Ni) and copper (Cu).

11. The manufacturing method of catalyst of claim 10, wherein in the (c) step, temperature of the thermal treatment is 300° C. to 500° C. and time of the thermal treatment is 30 min to 12 hr.

* * * * *

UNITED STATES PATENT AND TRADEMARK OFFICE
CERTIFICATE OF CORRECTION

PATENT NO. : 11,332,834 B2
APPLICATION NO. : 15/493288
DATED : May 17, 2022
INVENTOR(S) : Ki-Tae Nam et al.

It is certified that error appears in the above-identified patent and that said Letters Patent is hereby corrected as shown below:

On the Title Page

Item (73) should read as follows:
(73) Assignees: SEOUL NATIONAL UNIVERSITY R&DB FOUNDATION, Seoul (KR); GLOBAL FRONTIER CENTER FOR MULTISCALE ENERGY SYSTEMS, Seoul (KR)

Signed and Sealed this
Twenty-fourth Day of October, 2023

Katherine Kelly Vidal
*Director of the United States Patent and Trademark Office*